United States Patent
Liu et al.

(10) Patent No.: US 11,690,080 B2
(45) Date of Patent: Jun. 27, 2023

(54) RESOURCE SCHEDULING METHOD AND APPARATUS

(71) Applicant: HUAWEI TECHNOLOGIES CO., LTD., Guangdong (CN)

(72) Inventors: Fengwei Liu, Chengdu (CN); Lei Chen, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 40 days.

(21) Appl. No.: 17/140,431

(22) Filed: Jan. 4, 2021

(65) Prior Publication Data

US 2021/0127389 A1    Apr. 29, 2021

Related U.S. Application Data

(63) Continuation of application No. PCT/CN2019/093653, filed on Jun. 28, 2019.

(30) Foreign Application Priority Data

Jul. 5, 2018 (CN) .......................... 201810731379.1
Nov. 2, 2018 (CN) .......................... 201811302743.9

(51) Int. Cl.
*H04W 72/27* (2023.01)
*H04W 76/11* (2018.01)
(Continued)

(52) U.S. Cl.
CPC ....... *H04W 72/27* (2023.01); *H04W 72/0446* (2013.01); *H04W 72/1263* (2013.01);
(Continued)

(58) Field of Classification Search
CPC ........... H04W 72/0426; H04W 72/042; H04W 72/0446; H04W 72/1263; H04W 76/11; H04W 88/14; H04B 7/1542

See application file for complete search history.

(56) References Cited

U.S. PATENT DOCUMENTS 9,014,082 B2 *  4/2015  Kim ..................... H04L 5/0044
                                                      370/315
10,123,346 B1 *  11/2018  Liu ................... H04W 28/0278
(Continued)

FOREIGN PATENT DOCUMENTS

CN        101800762 A    8/2010
CN        101951411 A    1/2011
(Continued)

OTHER PUBLICATIONS

Huawei, HiSilicon, Consideration on IAB physical layer enhancement. 3GPPTSG RAN WGI Meeting #91, Reno, USA, Nov. 27-Dec. 1, 2017, R1-1720606, 7 pages.
(Continued)

*Primary Examiner* — Jael M Ulysse
(74) *Attorney, Agent, or Firm* — Womble Bond Dickinson (US) LLP

(57) ABSTRACT

This application provides a resource scheduling method and apparatus. The resource scheduling method includes: receiving, by a second node, resource configuration information sent by a first node, where the resource configuration information is used to indicate a time domain position of a backhaul resource set, and the backhaul resource set includes a fixed backhaul resource and a plurality of dynamic backhaul resources; receiving, by the second node on the fixed backhaul resource, first indication information sent by the first node, where the first indication information is used to indicate information about scheduled dynamic backhaul resources in the plurality of dynamic backhaul resources; and receiving, by the second node, a signal on the scheduled dynamic backhaul resources.

20 Claims, 11 Drawing Sheets

(51) Int. Cl.
*H04W 72/0446* (2023.01)
*H04W 72/1263* (2023.01)
*H04W 88/14* (2009.01)
*H04W 72/23* (2023.01)

(52) U.S. Cl.
CPC ............ *H04W 72/23* (2023.01); *H04W 76/11* (2018.02); *H04W 88/14* (2013.01)

(56) References Cited

U.S. PATENT DOCUMENTS

| | | | | |
|---|---|---|---|---|
| 11,523,384 | B2* | 12/2022 | Zhang | H04B 7/0617 |
| 2006/0034438 | A1* | 2/2006 | O'Neill | H04L 47/762 |
| | | | | 379/114.07 |
| 2011/0103292 | A1* | 5/2011 | Pasad | H04W 88/04 |
| | | | | 370/329 |
| 2011/0310789 | A1* | 12/2011 | Hu | H04L 5/0053 |
| | | | | 370/315 |
| 2012/0069790 | A1* | 3/2012 | Chung | H04L 5/0053 |
| | | | | 370/329 |
| 2012/0069795 | A1* | 3/2012 | Chung | H04L 5/001 |
| | | | | 370/315 |
| 2012/0114021 | A1* | 5/2012 | Chung | H04B 7/15557 |
| | | | | 375/211 |
| 2012/0140726 | A1* | 6/2012 | Moon | H04W 28/26 |
| | | | | 370/329 |
| 2012/0147794 | A1* | 6/2012 | Chung | H04L 5/0057 |
| | | | | 370/280 |
| 2012/0163288 | A1* | 6/2012 | Kim | H04L 5/0037 |
| | | | | 370/315 |
| 2012/0170510 | A1* | 7/2012 | Kim | H04L 5/0053 |
| | | | | 370/315 |
| 2012/0281614 | A1* | 11/2012 | Deng | H04W 88/04 |
| | | | | 370/315 |
| 2013/0010684 | A1* | 1/2013 | Park | H04L 5/0003 |
| | | | | 370/315 |
| 2013/0034043 | A1* | 2/2013 | Yu | H04W 72/542 |
| | | | | 370/315 |
| 2013/0034072 | A1* | 2/2013 | Kim | H03M 13/6536 |
| | | | | 370/329 |
| 2013/0163485 | A1* | 6/2013 | Wan | H04W 72/0446 |
| | | | | 370/280 |
| 2013/0273926 | A1* | 10/2013 | Peng | H04B 7/15528 |
| | | | | 455/450 |
| 2013/0336198 | A1* | 12/2013 | Kim | H04L 5/0053 |
| | | | | 370/315 |
| 2013/0343261 | A1* | 12/2013 | Gonsa | H04W 76/25 |
| | | | | 370/315 |
| 2017/0064731 | A1 | 3/2017 | Wang et al. | |
| 2017/0196015 | A1* | 7/2017 | Lu | H04W 72/541 |
| 2017/0208574 | A1* | 7/2017 | Ramakrishna | H04B 7/155 |
| 2017/0303183 | A1* | 10/2017 | Pasad | H04W 40/22 |
| 2018/0076839 | A1* | 3/2018 | Baghel | H04W 52/283 |
| 2019/0014500 | A1* | 1/2019 | Abedini | H04W 28/085 |
| 2019/0132807 | A1* | 5/2019 | Abedini | H04W 52/34 |
| 2019/0349079 | A1* | 11/2019 | Novlan | H04B 7/15592 |
| 2020/0245220 | A1* | 7/2020 | Pasad | H04L 5/0053 |
| 2020/0374873 | A1* | 11/2020 | Tiirola | H04W 84/047 |
| 2021/0022136 | A1* | 1/2021 | Kimba Dit Adamou | |
| | | | | H04L 5/14 |
| 2021/0036765 | A1* | 2/2021 | Keskitalo | H04W 72/0446 |
| 2021/0160861 | A1* | 5/2021 | You | H04W 28/16 |

FOREIGN PATENT DOCUMENTS

| | | | | |
|---|---|---|---|---|
| CN | 104284440 | A | 1/2015 | |
| CN | 105376748 | A | 3/2016 | |
| CN | 107682935 | A | 2/2018 | |
| WO | WO-2015117499 | A1 * | 8/2015 | ........... H04L 5/0094 |

OTHER PUBLICATIONS

LG Electronics,"Resource Allocation and Downlink Control Channel Structure for Relay Backhaul Link",3GPP TSG RAN WG1 Meeting #57 San Francisco, USA, May 4 8, 2009,R1-092115,total 7pages.

3GPP TS 38.321 V15.2.0 (Jun. 2018);3rd Generation Partnership Project;Technical Specification Group Radio Access Network;NR;Medium Access Control (MAC) protocol specification(Release 15),total 73 pages.

LG Electronics,"Discussions on NR IAB support",3GPP TSG RAN WG1 Meeting #92bis R1-1804583,Sanya, China, Apr. 16-20, 2018,total 9 pages.

3GPP TS 38.213 V15.2.0 (Jun. 2018);3rd Generation Partnership Project;Technical Specification Group Radio Access Network;NR;Physical layer procedures for control(Release 15);total 99 pages.

3GPP TS 38.214 V15.2.0 (Jun. 2018);3rd Generation Partnership Project;Technical Specification Group Radio Access Network;NR;Physical layer procedures for data (Release 15);total 95 pages.

3GPP TS 38.331 V15.2.1 (Jun. 2018);3rd Generation Partnership Project;Technical Specification Group Radio Access Network;NR-;Radio Resource Control (RRC) protocol specification(Release 15);total 303 pages.

3GPP TS 38.473 V15.2.1 (Jul. 2018);3rd Generation Partnership Project;Technical Specification Group Radio Access Network; NG-RAN;F1 application protocol (F1AP)(Release 15);total 161 pages.

* cited by examiner

| | 0 | 1 | 2 | 3 | 4 | 5 | 6 | 7 | 8 | 9 |
|---|---|---|---|---|---|---|---|---|---|---|
| Unavailable-access-resource indication | { 0 | 1 | 1 | 1 | 0 | 0 | 0 | 0 | 0 | 0 } |
| Fixed/dynamic-access-resource indication | { 1 | 0 | 0 | 0 | 1 | 1 | 0 | 0 | 0 | 0 } |
| Access resource type | Dynamic | Unavailable | Unavailable | Unavailable | Fixed | Fixed | Dynamic | Dynamic | Dynamic | Dynamic |

FIG. 19

| | 0 | 1 | 2 | 3 | 4 | 5 | 6 | 7 | 8 | 9 |
|---|---|---|---|---|---|---|---|---|---|---|
| Access resource character string indication | S | U | U | U | H | H | S | S | S | S |
| Access resource type | Dynamic | Unavailable | Unavailable | Unavailable | Fixed | Fixed | Dynamic | Dynamic | Dynamic | Dynamic |

FIG. 20

| | 0 | 1 | 2 | 3 | 4 | 5 | 6 | 7 | 8 | 9 |
|---|---|---|---|---|---|---|---|---|---|---|
| Access resource indication | 01 | 10 | 10 | 10 | 01 | 01 | 00 | 00 | 00 | 00 |
| Access resource type | Dynamic | Unavailable | Unavailable | Unavailable | Fixed | Fixed | Dynamic | Dynamic | Dynamic | Dynamic |

FIG. 21

RESOURCE SCHEDULING METHOD AND APPARATUS

CROSS-REFERENCE TO RELATED APPLICATIONS

This application is a continuation of an International patent application No. PCT/CN2019/093653, filed on Jun. 28, 2019, which claims priority to Chinese Patent Application No. 201810731379.1, filed on Jul. 5, 2018 and Chinese Patent Application No. 201811302743.9, filed on Nov. 2, 2018. The disclosures of the aforementioned applications are hereby incorporated by reference in their entireties.

TECHNICAL FIELD

This application relates to the communications field, and more specifically, to a resource scheduling method and apparatus.

BACKGROUND

With continuous development of mobile communications technologies, spectrum resources become increasingly insufficient. To improve spectrum utilization, base stations will be deployed more densely in the future. In addition, dense deployment can avoid coverage holes. In a conventional cellular network architecture, a base station is connected to a core network through an optical fiber. However, fiber deployment is costly in many scenarios. A wireless relay node (RN) is connected to a core network through a wireless backhaul link, to save some optical fiber deployment costs.

Generally, a relay node establishes a wireless backhaul link with one or more upper-level nodes, and accesses a core network via the upper-level nodes. The upper-level node may control (for example, perform data scheduling, timing modulation, or power control on) the relay node by using a plurality of types of signaling. In addition, the relay node may serve a plurality of lower-level nodes. An upper-level node of the relay node may be a base station or another relay node. A lower-level node of the relay node may be a terminal or another relay node.

A link on which the relay node communicates with an upper-level node is referred to as a backhaul link, and a link on which the relay node communicates with a lower-level node is referred to as an access link. A relay node whose backhaul link and access link are in a same frequency band is referred to as an in-band relay. To ensure that the in-band relay works properly, the upper-level node needs to configure a backhaul resource for the in-band relay. Generally, the backhaul resource is semi-statically configured by using higher layer signaling such as radio resource control (RRC). Then, the upper-level node further dynamically configures a scheduling parameter of the backhaul link by using signaling such as downlink control information (DCI). In a long term evolution (LTE) system, because an upper-level node semi-statically configures a backhaul resource, the upper-level node cannot dynamically adjust a quantity of actually scheduled backhaul resources based on a change in an amount of data on a backhaul link. Consequently, system flexibility may be poor.

SUMMARY

In view of this, this application provides a resource scheduling method and apparatus, to improve system flexibility by dynamically configuring a backhaul resource.

According to a first aspect, a resource scheduling method is provided. The method includes:

A second node receives resource configuration information sent by a first node, where the resource configuration information is used to indicate a time domain position of a backhaul resource set, and the backhaul resource set includes a fixed backhaul resource and a plurality of dynamic backhaul resources.

The second node receives, on the fixed backhaul resource, first indication information sent by the first node, where the first indication information is used to indicate information about scheduled dynamic backhaul resources in the plurality of dynamic backhaul resources.

The second node receives, on the scheduled dynamic backhaul resources, a signal sent by the first node.

In an embodiment, the first node is a network device, or the first node is a relay device.

In an embodiment, the second node is a relay device, the second node is a terminal having a relay device function, or the second node is a terminal.

In an embodiment, the resource configuration information is further used to indicate a frequency domain position of the backhaul resource set.

In an embodiment, that the signal is received on the scheduled dynamic backhaul resources includes:

receiving a physical downlink shared channel (physical downlink share channel, PDSCH) on the scheduled dynamic backhaul resources.

In an embodiment, the resource configuration information is generated by a control node, and is sent to the second node via the first node, where the control node is a network device or a relay node different from the first node.

In an embodiment, the resource configuration information is generated by the first node and is sent by the first node to the second node.

According to the resource scheduling method in this embodiment of this application, the first node dynamically schedules the backhaul resource set. This helps improve system flexibility, and helps avoid excessive switching overheads on the second node while ensuring backhaul resource allocation.

In an embodiment, the second node receives, on a first scheduled dynamic backhaul resource, first downlink control information DCI sent by the first node, where the first DCI is used to indicate a downlink scheduling parameter of the first scheduled dynamic backhaul resource, and the scheduled dynamic backhaul resources include the first scheduled dynamic backhaul resource.

In this embodiment of this application, the first scheduled dynamic backhaul resource is a dynamic backhaul resource on which a physical downlink control channel (PDCCH) and a PDSCH are multiplexed in a same time unit, and the second node determines, based on the first indication information, to detect the PDCCH that is on the first scheduled dynamic backhaul resource.

In an embodiment, the second node receives DCI on each of the scheduled dynamic backhaul resources, where the DCI is used to indicate a downlink scheduling parameter of each scheduled dynamic backhaul resource. The method further includes:

The second node receives, on each dynamic backhaul resource based on the DCI received on each scheduled dynamic backhaul resource, the signal sent by the first node.

In an embodiment, if the scheduled dynamic backhaul resources include a second scheduled dynamic backhaul resource, where the second scheduled dynamic backhaul resource and the fixed backhaul resource are located in a same time unit or in adjacent time units, the first indication information further includes information used to indicate a receive beam for a third scheduled dynamic backhaul resource, and the third scheduled dynamic backhaul resource is at least a part, other than the second scheduled dynamic backhaul resource, of the scheduled dynamic backhaul resources.

In an embodiment, if the scheduled dynamic backhaul resources do not include a dynamic backhaul resource, where the dynamic backhaul resource and the fixed backhaul resource are located in a same time unit or in adjacent time units, the first indication information further includes information used to indicate a receive beam for a third scheduled dynamic backhaul resource, and the third scheduled dynamic backhaul resource is at least a part of the scheduled dynamic backhaul resources.

In an embodiment, the first indication information is DCI, and the DCI carries a TCI to indicate the information about the receive beam for the third scheduled dynamic backhaul resource.

According to the resource scheduling method in an embodiment of this application, whether a dynamic backhaul resource is scheduled is indicated in advance, to avoid excessive switching overheads while ensuring system flexibility. In addition, scheduling information of each dynamic backhaul resource is sent on the dynamic backhaul resource. This helps reduce complexity of the second node and improve scheduling flexibility.

In an embodiment, that the second node receives, on the fixed backhaul resource, first indication information sent by the first node includes:

The second node receives, on the fixed backhaul resource, DCI that is of each of the scheduled dynamic backhaul resources and that is sent by the first node, where the DCI of each scheduled dynamic backhaul resource is used to indicate a downlink scheduling parameter of each scheduled dynamic backhaul resource. That the second node receives a signal on the scheduled dynamic backhaul resources includes:

The second node receives the signal on each scheduled dynamic backhaul resource based on the DCI of each scheduled dynamic backhaul resource.

In an embodiment, the DCI of each scheduled dynamic backhaul resource carries a TCI to indicate information about a receive beam for each scheduled dynamic backhaul resource.

According to the resource scheduling method in this embodiment of this application, the second node receives DCI of a plurality of dynamic backhaul resources on the fixed backhaul resource, to avoid excessive switching overheads while ensuring system flexibility.

According to the resource scheduling method in this embodiment of this application, the second node receives, on the fixed backhaul resource, a downlink scheduling parameter of a dynamic backhaul resource, where the dynamic backhaul resource and the fixed backhaul resource are located in a same time unit or in adjacent time units. This helps further reduce switching overheads on the second node.

In an embodiment, the second node receives, on the fixed backhaul resource, information that is sent by the first node and that is about a receive beam for a third scheduled dynamic backhaul resource, where the scheduled dynamic backhaul resources include the third scheduled dynamic backhaul resource.

In an embodiment, if the scheduled dynamic backhaul resources include a second scheduled dynamic backhaul resource, where the second scheduled dynamic backhaul resource and the fixed backhaul resource are located in a same time unit or in adjacent time units, the first indication information further includes information used to indicate a receive beam for a third scheduled dynamic backhaul resource, and the third scheduled dynamic backhaul resource is at least a part, other than the second scheduled dynamic backhaul resource, of the scheduled dynamic backhaul resources.

In an embodiment, if the scheduled dynamic backhaul resources do not include a dynamic backhaul resource, where the dynamic backhaul resource and the fixed backhaul resource are located in a same time unit or in adjacent time units, the first indication information further includes information used to indicate a receive beam for a third scheduled dynamic backhaul resource, and the third scheduled dynamic backhaul resource is at least a part of the scheduled dynamic backhaul resources.

In an embodiment, the fixed backhaul resource is a fixed downlink backhaul resource, the plurality of dynamic backhaul resources are a plurality of dynamic downlink backhaul resources, the backhaul resource set further includes at least one dynamic uplink backhaul resource, and the at least one dynamic uplink backhaul resource is scheduled by using the fixed backhaul resource or the plurality of dynamic downlink backhaul resources.

In an embodiment, the fixed backhaul resource is a fixed downlink backhaul resource, the plurality of dynamic backhaul resources are a plurality of dynamic downlink backhaul resources, and the backhaul resource set further includes a fixed uplink backhaul resource. The method further includes:

The second node receives, on the fixed downlink backhaul resource, DCI that is of the fixed uplink backhaul resource and that is sent by the first node.

In an embodiment, the second node sends, HARQ feedback information of the fixed downlink backhaul resource to the first node on the fixed uplink backhaul resource.

In an embodiment, the fixed backhaul resource is a fixed downlink backhaul resource, the plurality of dynamic backhaul resources are a plurality of dynamic downlink backhaul resources, and the backhaul resource set further includes a fixed uplink backhaul resource and a plurality of dynamic uplink backhaul resources. The method further includes:

The second node receives, on the fixed downlink backhaul resource, DCI that is of the fixed uplink backhaul resource and that is sent by the first node.

The second node receives, on the first scheduled dynamic backhaul resource, DCI that is of a first dynamic uplink backhaul resource and that is sent by the first node, where the first dynamic uplink backhaul resource is any dynamic uplink backhaul resource in the plurality of dynamic uplink backhaul resources.

In an embodiment, the second node sends, HARQ feedback information of the fixed downlink backhaul resource to the first node on the fixed uplink backhaul resource.

The second node sends, HARQ feedback information of the first scheduled dynamic backhaul resource to the first node on the first dynamic uplink backhaul resource.

According to a second aspect, a resource scheduling method is provided. The method includes:

A second node receives resource configuration information sent by a first node, where the resource configuration information is used to indicate a time domain position of a backhaul resource set, and the backhaul resource set includes a fixed backhaul resource and a plurality of dynamic backhaul resources.

The second node receives, on the fixed backhaul resource, second DCI sent by the first node, where the second DCI is used to indicate a downlink scheduling parameter of a fourth scheduled dynamic backhaul resource, and the second DCI is used to indicate that a fifth scheduled dynamic backhaul resource is scheduled. The plurality of dynamic backhaul resources include the fourth scheduled dynamic backhaul resource and the fifth scheduled dynamic backhaul resource, and the fixed backhaul resource and the fourth scheduled dynamic backhaul resource are located in a same time unit, or the fixed backhaul resource and the fourth scheduled dynamic backhaul resource are located in adjacent time units.

The second node receives a signal on the fourth scheduled dynamic backhaul resource and the fifth scheduled dynamic backhaul resource based on the second DCI.

In some possible implementations, the first node is a network device, or the first node is a relay device.

In an embodiment, the second node is a relay device, the second node is a terminal having a relay device function, or the second node is a terminal.

In an embodiment, the resource configuration information is further used to indicate a frequency domain position of the backhaul resource set.

According to the resource scheduling method in this embodiment of this application, a backhaul resource is scheduled in advance through level-by-level indication. This helps avoid excessive switching overheads while ensuring system flexibility, and can reduce DCI indication overheads.

In an embodiment, the second node receives, on the fifth scheduled dynamic backhaul resource, third DCI sent by the first node, where the third DCI is used to indicate a downlink scheduling parameter of the fifth scheduled dynamic backhaul resource, and the third DCI is used to indicate that a sixth scheduled dynamic backhaul resource is scheduled. The plurality of dynamic backhaul resources include the sixth scheduled dynamic backhaul resource.

In an embodiment, the second node receives, on the fixed backhaul resource, information that is about a receive beam for the fifth scheduled dynamic backhaul resource and that is sent by the first node.

Alternatively, the second node receives, on the fifth scheduled dynamic backhaul resource, information that is about a receive beam for the sixth scheduled dynamic backhaul resource and that is sent by the first node.

In an embodiment, the second DCI carries a TCI to indicate the receive beam for the fifth scheduled dynamic backhaul resource.

In an embodiment, the third DCI carries a TCI to indicate the receive beam for the sixth scheduled dynamic backhaul resource.

According to a third aspect, a resource scheduling method is provided. A first node sends resource configuration information to a second node, where the resource configuration information is used to indicate a time domain position of a backhaul resource set, and the backhaul resource set includes a fixed backhaul resource and a plurality of dynamic backhaul resources.

The first node sends first indication information to the second node on the fixed backhaul resource, where the first indication information is used to indicate information about scheduled dynamic backhaul resources in the plurality of dynamic backhaul resources.

The first node sends a signal to the second node on the scheduled dynamic backhaul resources.

In an embodiment, the first node sends first downlink control information DCI to the second node on a first scheduled dynamic backhaul resource, where the first DCI is used to indicate a downlink scheduling parameter of the first scheduled dynamic backhaul resource, and the scheduled dynamic backhaul resources include the first scheduled dynamic backhaul resource.

In an embodiment, the first indication information includes downlink scheduling parameters of the scheduled dynamic backhaul resources.

In an embodiment, each of the scheduled dynamic backhaul resources corresponds to one control resource set, or each of the scheduled dynamic backhaul resources corresponds to one search space set or a subset of one search space set.

In an embodiment, PDCCH candidates for scheduling different dynamic backhaul resources have different control channel element (CCE) indexes.

In an embodiment, the subset of the search space set includes a CCE index or CCE indexes of one or more PDCCH candidates for scheduling each dynamic backhaul resource.

In an embodiment, the first node determines, by using a correspondence between each scheduled dynamic backhaul resource and a control resource set, a manner of sending DCI on each dynamic backhaul resource.

Alternatively, the first node determines, by using a correspondence between each scheduled dynamic backhaul resource and a search space set, a manner of sending DCI on each dynamic backhaul resource.

Alternatively, the first node determines, by using a correspondence between each scheduled dynamic backhaul resource and a subset of a search space set, a manner of sending DCI on each dynamic backhaul resource.

In an embodiment, the manner of sending DCI includes time-frequency resource mapping information corresponding to a PDCCH, and the like.

In an embodiment, the first indication information further includes a downlink scheduling parameter of a second scheduled dynamic backhaul resource, the scheduled dynamic backhaul resources include the second scheduled dynamic backhaul resource, and the fixed backhaul resource and the second scheduled dynamic backhaul resource are located in a same time unit, or the fixed backhaul resource and the second scheduled dynamic backhaul resource are located in adjacent time units.

In an embodiment, the first node sends, on the fixed backhaul resource, information about a receive beam for a third scheduled dynamic backhaul resource to the second node, where the scheduled dynamic backhaul resources include the third scheduled dynamic backhaul resource.

According to a fourth aspect, a resource scheduling method is provided. A first node sends resource configuration information to a second node, where the resource configuration information is used to indicate a time domain position of a backhaul resource set, and the backhaul resource set includes a fixed backhaul resource and a plurality of dynamic backhaul resources.

The first node sends second DCI to the second node on the fixed backhaul resource, where the second DCI is used to indicate a downlink scheduling parameter of a fourth scheduled dynamic backhaul resource, and the second DCI is used to indicate that a fifth scheduled dynamic backhaul resource is scheduled. The plurality of dynamic backhaul resources include the fourth scheduled dynamic backhaul resource and the fifth scheduled dynamic backhaul resource, and the fixed backhaul resource and the fourth scheduled dynamic backhaul resource are located in a same time unit, or the fixed backhaul resource and the fourth scheduled dynamic backhaul resource are located in adjacent time units.

The first node sends a signal to the second node on the fourth scheduled dynamic backhaul resource and the fifth scheduled dynamic backhaul resource.

the first node sends third DCI to the second node on the fifth scheduled dynamic backhaul resource, where the third DCI is used to indicate a downlink scheduling parameter of the fifth scheduled dynamic backhaul resource, and the third DCI is used to indicate that a sixth scheduled dynamic backhaul resource is scheduled. The plurality of dynamic backhaul resources include the sixth scheduled dynamic backhaul resource.

the first node sends, on the fixed backhaul resource, information about a receive beam for the fifth scheduled dynamic backhaul resource to the second node.

Alternatively, the first node sends, on the fifth scheduled dynamic backhaul resource, information about a receive beam for the sixth scheduled dynamic backhaul resource to the second node.

According to a fifth aspect, a resource scheduling apparatus is provided. The apparatus includes:

a transceiver unit, configured to receive resource configuration information sent by a first node, where the resource configuration information is used to indicate a time domain position of a backhaul resource set, and the backhaul resource set includes a fixed backhaul resource and a plurality of dynamic backhaul resources; and a processing unit, configured to determine the fixed backhaul resource and the plurality of dynamic backhaul resources.

The transceiver unit is further configured to receive, on the fixed backhaul resource, first indication information sent by the first node, where the first indication information is used to indicate information about scheduled dynamic backhaul resources in the plurality of dynamic backhaul resources.

The processing unit is further configured to determine the scheduled dynamic backhaul resources.

The transceiver unit is further configured to receive, on the scheduled dynamic backhaul resources, a signal sent by the first node.

In an embodiment, the transceiver unit is further configured to receive, on a first scheduled dynamic backhaul resource, first downlink control information DCI sent by the first node, where the first DCI is used to indicate a downlink scheduling parameter of the first scheduled dynamic backhaul resource, and the scheduled dynamic backhaul resources include the first scheduled dynamic backhaul resource.

The processing unit is further configured to determine the downlink scheduling parameter of the first scheduled dynamic backhaul resource.

In an embodiment, the transceiver unit is further configured to receive, on the fixed backhaul resource, information that is sent by the first node and that is about a receive beam for a third scheduled dynamic backhaul resource, where the scheduled dynamic backhaul resources include the third scheduled dynamic backhaul resource.

The processing unit is further configured to determine the receive beam for the third scheduled dynamic backhaul resource.

According to a sixth aspect, a resource scheduling apparatus is provided. The apparatus includes:

a processing unit, configured to determine a fixed backhaul resource and a plurality of dynamic backhaul resources; and a transceiver unit, configured to send resource configuration information to a second node, where the resource configuration information is used to indicate a time domain position of a backhaul resource set, and the backhaul resource set includes the fixed backhaul resource and the plurality of dynamic backhaul resources.

The processing unit is further configured to determine scheduled dynamic backhaul resources in the plurality of dynamic backhaul resources.

The transceiver unit is further configured to send first indication information to the second node on the fixed backhaul resource, where the first indication information is used to indicate information about the scheduled dynamic backhaul resources.

The transceiver unit is further configured to send a signal to the second node on the scheduled dynamic backhaul resources.

In an embodiment, the processing unit is further configured to determine a first scheduled dynamic backhaul resource, where the scheduled dynamic backhaul resources include the first scheduled dynamic backhaul resource.

The transceiver unit is further configured to send first DCI to the second node on the first scheduled dynamic backhaul resource, where the first DCI is used to indicate a downlink scheduling parameter of the first scheduled dynamic backhaul resource.

In an embodiment, the first indication information includes downlink scheduling parameters of the scheduled dynamic backhaul resources.

In an embodiment, each of the scheduled dynamic backhaul resources corresponds to one control resource set, or each of the scheduled dynamic backhaul resources corresponds to one search space set or a subset of one search space set.

In an embodiment, the first indication information further includes a downlink scheduling parameter of a second scheduled dynamic backhaul resource, the scheduled dynamic backhaul resources include the second scheduled dynamic backhaul resource, and the fixed backhaul resource and the second scheduled dynamic backhaul resource are located in a same time unit, or the fixed backhaul resource and the second scheduled dynamic backhaul resource are located in adjacent time units.

In an embodiment, the processing unit is further configured to determine a receive beam for a third scheduled dynamic backhaul resource, where the scheduled dynamic backhaul resources include the third scheduled dynamic backhaul resource.

The transceiver unit is further configured to send, on the fixed backhaul resource, information about the receive beam for the third scheduled dynamic backhaul resource to the second node.

According to a seventh aspect, a resource scheduling apparatus is provided. The apparatus includes:

a transceiver unit, configured to receive resource configuration information sent by a first node, where the resource configuration information is used to indicate a time domain position of a backhaul resource set, and the backhaul resource set includes a fixed backhaul resource and a plurality of dynamic backhaul resources, where a processing unit, configured to determine the fixed backhaul resource and the plurality of dynamic backhaul resources. The transceiver unit is further configured to receive, on the fixed backhaul resource, second DCI sent by the first node, where the second DCI is used to indicate a downlink scheduling parameter of a fourth scheduled dynamic backhaul resource, and the second DCI is used to indicate that a fifth scheduled dynamic backhaul resource is scheduled. The plurality of dynamic backhaul resources include the fourth scheduled dynamic backhaul resource and the fifth scheduled dynamic backhaul resource, and the fixed backhaul resource and the fourth scheduled dynamic backhaul resource are located in a same time unit, or the fixed backhaul resource and the fourth scheduled dynamic backhaul resource are located in adjacent time units.

The processing unit is further configured to determine the downlink scheduling parameter of the fourth scheduled dynamic backhaul resource and the fifth scheduled dynamic backhaul resource.

The transceiver unit is further configured to receive a signal on the fourth scheduled dynamic backhaul resource and the fifth scheduled dynamic backhaul resource.

In an embodiment, the transceiver unit is further configured to receive, on the fifth scheduled dynamic backhaul resource, third DCI sent by the first node, where the third DCI is used to indicate a downlink scheduling parameter of the fifth scheduled dynamic backhaul resource, and the third DCI is used to indicate that a sixth scheduled dynamic backhaul resource is scheduled. The plurality of dynamic backhaul resources include the sixth scheduled dynamic backhaul resource.

The processing unit is further configured to determine the downlink scheduling parameter of the fifth scheduled dynamic backhaul resource and the sixth scheduled dynamic backhaul resource.

In an embodiment, the transceiver unit is further configured to receive, on the fixed backhaul resource, information that is about a receive beam for the fifth scheduled dynamic backhaul resource and that is sent by the first node; and the processing unit is further configured to determine the receive beam for the fifth scheduled dynamic backhaul resource.

Alternatively, the transceiver unit is further configured to receive, on the fifth scheduled dynamic backhaul resource, information that is about a receive beam for the sixth scheduled dynamic backhaul resource and that is sent by the first node; and the processing unit is further configured to determine the receive beam for the sixth scheduled dynamic backhaul resource.

According to an eighth aspect, a resource scheduling apparatus is provided. The apparatus includes:

a processing unit, configured to determine a fixed backhaul resource and a plurality of dynamic backhaul resources; and a transceiver unit, configured to send resource configuration information to a second node, where the resource configuration information is used to indicate a time domain position of a backhaul resource set, and the backhaul resource set includes the fixed backhaul resource and the plurality of dynamic backhaul resources.

The processing unit is further configured to determine a fourth scheduled dynamic backhaul resource and a fifth scheduled dynamic backhaul resource in the plurality of dynamic backhaul resources.

The transceiver unit is further configured to send second DCI to the second node on the fixed backhaul resource, where the second DCI is used to indicate a downlink scheduling parameter of the fourth scheduled dynamic backhaul resource, and the second DCI is used to indicate that the fifth scheduled dynamic backhaul resource is scheduled. The fixed backhaul resource and the fourth scheduled dynamic backhaul resource are located in a same time unit, or the fixed backhaul resource and the fourth scheduled dynamic backhaul resource are located in adjacent time units.

The transceiver unit is further configured to send a signal to the second node on the fourth scheduled dynamic backhaul resource and the fifth scheduled dynamic backhaul resource.

With reference to the eighth aspect, in some possible implementations of the eighth aspect, the processing unit is further configured to determine a sixth scheduled dynamic backhaul resource, where the plurality of dynamic backhaul resources include the sixth scheduled dynamic backhaul resource.

The transceiver unit is further configured to send third DCI to the second node on the fifth scheduled dynamic backhaul resource, where the third DCI is used to indicate a downlink scheduling parameter of the fifth scheduled dynamic backhaul resource, and the third DCI is used to indicate that the sixth scheduled dynamic backhaul resource is scheduled.

In an embodiment, the processing unit is further configured to determine a receive beam for the fifth scheduled dynamic backhaul resource; and the transceiver unit is further configured to send, on the fixed backhaul resource, information about the receive beam for the fifth scheduled dynamic backhaul resource to the second node.

Alternatively, the processing unit is further configured to determine a receive beam for the sixth scheduled dynamic backhaul resource; and the transceiver unit is further configured to send, on the fifth scheduled dynamic backhaul resource, information about the receive beam for the sixth scheduled dynamic backhaul resource to the second node.

According to a ninth aspect, a resource determining method is provided. The method includes:

A second node receives resource configuration information sent by a first node, where the resource configuration information is used to indicate a time domain position of an access resource set, and the access resource set includes at least one fixed access resource and/or a plurality of dynamic access resources.

The second node receives first indication information sent by the first node, where the first indication information is used to indicate information about a scheduled dynamic access resource that is used for a backhaul link and that is in the plurality of dynamic access resources.

In an embodiment, the second node receives, on the scheduled dynamic backhaul resource used for the backhaul link, a signal sent by the first node.

In an embodiment, the second node determines, based on the information about the scheduled dynamic access resource used for the backhaul link, a dynamic access resource used for an access link in the plurality of dynamic access resources.

In an embodiment, the second node receives resource configuration information sent by the first node, where the resource configuration information is used to indicate a time domain position of a backhaul resource set, and the backhaul resource set includes at least one fixed backhaul resource and/or a plurality of dynamic backhaul resources.

In an embodiment, the resource configuration information used to indicate the access resource set and the resource configuration information used to indicate the backhaul resource set are transmitted through different signaling or interfaces.

In an embodiment, the access resource set is configured by using a method that is based on a bitmap or a character string, and the bitmap includes a bit of an unavailable-access-resource indication and a bit of a fixed/dynamic-access-resource indication, and a priority of the unavailable-access-resource indication is higher than that of the fixed/dynamic-access-resource indication.

In an embodiment, the second node receives the first indication information in a downlink transmission slot or subframe of the backhaul link, where the downlink transmission slot or subframe includes a slot or subframe in which the fixed backhaul resource and the scheduled dynamic access resource that is used for the backhaul link are configured for downlink transmission.

In an embodiment, the first indication information is used to indicate one of the following operations: activation, addition, reduction, replacement, and deactivation.

In an embodiment, the first indication information is carried on a PDCCH, and the PDCCH is scrambled by using a flexible scheduling radio network temporary identity (FS-RNTI).

In an embodiment, the second node sends a response message to the first node after receiving the first indication information.

According to the resource determining method in this embodiment of this application, the access resource set may be configured, so that the second node can obtain a dynamically scheduled resource, and the dynamically scheduled resource can be shared between the access link and the backhaul link, to improve resource utilization, thereby making resource scheduling for a relay node more flexible, and implementing fast resource coordination between the access link and the backhaul link.

According to a tenth aspect, a resource determining method is provided. A second node receives resource configuration information sent by a first node, where the resource configuration information is used to indicate a time domain position of a backhaul resource set, and the backhaul resource set includes at least one fixed backhaul resource and/or a plurality of dynamic backhaul resources.

The second node receives first indication information sent by the first node, where the first indication information is used to indicate information about a scheduled dynamic backhaul resource that is used for a backhaul link and that is in the plurality of dynamic backhaul resources.

In an embodiment, the second node determines, based on the information about the scheduled dynamic backhaul resource used for the backhaul link, a dynamic backhaul resource used for an access link in the plurality of dynamic backhaul resources.

In an embodiment, the second node receives resource configuration information sent by the first node, where the resource configuration information is used to indicate a time domain position of an access resource set, and the access resource set includes at least one fixed access resource and/or a plurality of dynamic access resources.

In an embodiment, the resource configuration information used to indicate the access resource set and the resource configuration information used to indicate the backhaul resource set are transmitted through different signaling or interfaces.

In an embodiment, the backhaul resource set is configured by using a method that is based on a bitmap or a character string, and the bitmap includes a bit of an unavailable-backhaul-resource indication and a bit of a fixed/dynamic-backhaul-resource indication, and a priority of the unavailable-backhaul-resource indication is higher than that of the fixed/dynamic-backhaul-resource indication.

In an embodiment, the second node receives the first indication information in a downlink transmission slot or subframe of the backhaul link, where the downlink transmission slot or subframe includes a slot or subframe in which the fixed backhaul resource and the scheduled dynamic backhaul resource that is used for the backhaul link are configured for downlink transmission.

In an embodiment, the first indication information is used to indicate one of the following operations: activation, addition, reduction, replacement, and deactivation.

In an embodiment, the first indication information is carried on a PDCCH, and the PDCCH is scrambled by using an FS-RNTI.

In some possible implementations, the second node sends a response message to the first node after receiving the first indication information.

According to the resource determining method in this embodiment of this application, the backhaul resource set may be configured, so that the second node can obtain a dynamically scheduled resource, and the dynamically scheduled resource can be shared between the access link and the backhaul link, to improve resource utilization, thereby making resource scheduling for a relay node more flexible, and implementing fast resource coordination between the access link and the backhaul link.

According to an eleventh aspect, a resource determining method is provided. A second node receives resource configuration information sent by a first node, where the resource configuration information is used to indicate at least one fixed backhaul resource and at least one dynamic resource.

The second node receives first indication information sent by the first node, where the first indication information is used to indicate information about a scheduled dynamic resource that is used for a backhaul link and that is in the at least one dynamic resource.

In an embodiment, the second node determines, based on the information about the scheduled dynamic resource used for the backhaul link, a dynamic resource used for an access link in the at least one dynamic resource.

In an embodiment, the second node receives second indication information sent by the first node, where the second indication information is used to re-assign a dynamic resource that is used for a backhaul link and that is in the at least one dynamic resource.

In an embodiment, a resource configuration is configured by using a method that is based on a bitmap or a character string.

In an embodiment, the second node receives the second indication information in a downlink transmission slot or subframe of the backhaul link, where the downlink transmission slot or subframe includes a slot or subframe in which the fixed backhaul resource and the scheduled dynamic resource that is used for the backhaul link are configured for downlink transmission.

In an embodiment, the second node sends a response message to the first node after receiving the first indication information or the second indication information.

According to the resource determining method in this embodiment of this application, the fixed backhaul resource and the dynamic resources of the backhaul link are configured, so that the second node can obtain a dynamic resource, and the dynamic resource can be shared between the access link and the backhaul link, to improve resource utilization, thereby making resource scheduling for a relay node more flexible, and implementing fast resource coordination between the access link and the backhaul link.

According to a twelfth aspect, a resource determining method is provided. A first node sends resource configuration information to a second node, where the resource configuration information is used to indicate a time domain position of an access resource set, and the access resource set includes at least one fixed access resource and/or a plurality of dynamic access resources.

The first node sends first indication information to the second node, where the first indication information is used to indicate information about a scheduled dynamic access resource that is used for a backhaul link and that is in the plurality of dynamic access resources.

In an embodiment, the first node determines, based on the information about the scheduled dynamic access resource used for the backhaul link, a dynamic access resource used for an access link.

In an embodiment, the first node sends resource configuration information to the second node, where the resource configuration information is used to indicate a time domain position of a backhaul resource set, and the backhaul resource set includes at least one fixed backhaul resource and/or a plurality of dynamic backhaul resources.

In an embodiment, the resource configuration information used to indicate the access resource set and the resource configuration information used to indicate the backhaul resource set are transmitted through different signaling or interfaces.

In an embodiment, the access resource set is configured by using a method that is based on a bitmap or a character string, and the bitmap includes a bit of an unavailable-access-resource indication and a bit of a fixed/dynamic-access-resource indication, and a priority of the unavailable-access-resource indication is higher than that of the fixed/dynamic-access-resource indication.

In an embodiment, the first node sends the first indication information in a downlink transmission slot or subframe of the backhaul link, where the downlink transmission slot or subframe includes a slot or subframe in which the fixed backhaul resource and the scheduled dynamic access resource that is used for the backhaul link are configured for downlink transmission.

In an embodiment, the first indication information is used to indicate one of the following operations: activation, addition, reduction, replacement, and deactivation.

In an embodiment, the first indication information is carried on a PDCCH, and the PDCCH is scrambled by using an FS-RNTI.

In an embodiment, after sending the first indication information to the second node, the first node receives a response message sent by the second node.

According to the resource determining method in this embodiment of this application, the first node configures the access resource set, so that the second node can obtain a dynamic access resource, and the dynamic access resource can be shared between the access link and the backhaul link, to improve resource utilization, thereby making resource scheduling for a relay node more flexible, and implementing fast resource coordination between the access link and the backhaul link.

According to a thirteenth aspect, a resource determining method is provided. A first node sends resource configuration information to a second node, where the resource configuration information is used to indicate a time domain position of a backhaul resource set, and the backhaul resource set includes at least one fixed backhaul resource and/or a plurality of dynamic backhaul resources.

The first node sends first indication information to the second node, where the first indication information is used to indicate information about a scheduled dynamic backhaul resource that is used for a backhaul link and that is in the plurality of dynamic backhaul resources.

In an embodiment, the first node determines, based on the information about the scheduled dynamic backhaul resource used for the backhaul link, a dynamic backhaul resource used for an access link.

In an embodiment, the first node sends resource configuration information to the second node, where the resource configuration information is used to indicate a time domain position of an access resource set, and the access resource set includes at least one fixed access resource and/or a plurality of dynamic access resources.

In an embodiment, the resource configuration information used to indicate the access resource set and the resource configuration information used to indicate the backhaul resource set are transmitted through different signaling or interfaces.

In an embodiment, the backhaul resource set is configured by using a method that is based on a bitmap or a character string, and the bitmap includes a bit of an unavailable-backhaul-resource indication and a bit of a fixed/dynamic-backhaul-resource indication, and a priority of the unavailable-backhaul-resource indication is higher than that of the fixed/dynamic-backhaul-resource indication.

In an embodiment, the first node sends the first indication information in a downlink transmission slot or subframe of the backhaul link, where the downlink transmission slot or subframe includes a slot or subframe in which the fixed backhaul resource and the scheduled dynamic backhaul resource that is used for the backhaul link are configured for downlink transmission.

In an embodiment, the first indication information is used to indicate one of the following operations: activation, addition, reduction, replacement, and deactivation.

In an embodiment, the first indication information is carried on a PDCCH, and the PDCCH is scrambled by using an FS-RNTI.

In an embodiment, after sending the first indication information to the second node, the first node receives a response message sent by the second node.

According to the resource determining method in this embodiment of this application, the first node configures the backhaul resource set, so that the second node can obtain a dynamic backhaul resource, and the dynamic backhaul resource can be shared between the access link and the backhaul link, to improve resource utilization, thereby making resource scheduling for a relay node more flexible, and implementing fast resource coordination between the access link and the backhaul link.

According to a fourteenth aspect, a resource determining method is provided. A first node sends resource configuration information to a second node, where the resource configuration information is used to indicate at least one fixed backhaul resource and at least one dynamic resource.

The first node sends first indication information to the second node, where the first indication information is used to indicate information about a scheduled dynamic resource that is used for a backhaul link and that is in the at least one dynamic resource.

In an embodiment, the first node sends second indication information to the second node, where the second indication information is used to re-assign a dynamic resource that is used for a backhaul link and that is in the at least one dynamic resource.

In an embodiment, a resource configuration is configured by using a method that is based on a bitmap or a character string.

In an embodiment, the first node sends the second indication information to the second node in a downlink transmission slot or subframe of the backhaul link, where the downlink transmission slot or subframe includes a slot or subframe in which the fixed backhaul resource and the scheduled dynamic resource that is used for the backhaul link are configured for downlink transmission.

In an embodiment, after sending the first indication information or the second indication information, the first node receives a response message sent by the second node.

According to the resource determining method in this embodiment of this application, the fixed backhaul resource and the dynamic resources of the backhaul link are configured, so that the second node can obtain a dynamic resource, and the dynamic resource can be shared between the access link and the backhaul link, to improve resource utilization, thereby making resource scheduling for a relay node more flexible, and implementing fast resource coordination between the access link and the backhaul link.

According to a fifteenth aspect, a resource determining apparatus is provided. The apparatus includes:

a transceiver unit, configured to receive resource configuration information sent by a first node, where the resource configuration information is used to indicate a time domain position of an access resource set, and the access resource set includes at least one fixed access resource and/or a plurality of dynamic access resources, where the transceiver unit is further configured to receive first indication information sent by the first node, where the first indication information is used to indicate information about a scheduled dynamic access resource that is used for a backhaul link and that is in the plurality of dynamic access resources.

In an embodiment, the transceiver unit is further configured to receive, on the scheduled dynamic backhaul resource used for the backhaul link, a signal sent by the first node.

In an embodiment, the apparatus further includes a processing unit, which is configured to determine, based on the information about the scheduled dynamic access resource used for the backhaul link, a dynamic access resource used for an access link in the plurality of dynamic access resources.

In an embodiment, the transceiver unit is further configured to receive resource configuration information sent by the first node, where the resource configuration information is used to indicate a time domain position of a backhaul resource set, and the backhaul resource set includes at least one fixed backhaul resource and/or a plurality of dynamic backhaul resources.

In an embodiment, the transceiver unit is configured to receive, through different signaling or interfaces, the resource configuration information used to indicate the access resource set and the resource configuration information used to indicate the backhaul resource set.

In an embodiment, the access resource set is configured by using a method that is based on a bitmap or a character string, and the bitmap includes a bit of an unavailable-access-resource indication and a bit of a fixed/dynamic-access-resource indication, and a priority of the unavailable-access-resource indication is higher than that of the fixed/dynamic-access-resource indication.

In an embodiment, the transceiver unit is further configured to receive the first indication information in a downlink transmission slot or subframe of the backhaul link, where the downlink transmission slot or subframe includes a slot or subframe in which the fixed backhaul resource and the scheduled dynamic access resource that is used for the backhaul link are configured for downlink transmission.

In an embodiment, the first indication information is used to indicate one of the following operations: activation, addition, reduction, replacement, and deactivation.

In an embodiment, the first indication information is carried on a PDCCH, and the PDCCH is scrambled by using an FS-RNTI.

In an embodiment, the transceiver unit is further configured to send a response message to the first node after receiving the first indication information.

According to the resource determining apparatus in this embodiment of this application, the access resource set may be configured, so that the apparatus can obtain a dynamically scheduled resource, and the dynamically scheduled resource can be shared between the access link and the backhaul link, to improve resource utilization, thereby making resource scheduling for a relay node more flexible, and implementing fast resource coordination between the access link and the backhaul link.

According to a sixteenth aspect, a resource determining apparatus is provided. The apparatus includes:

a transceiver unit, configured to receive resource configuration information sent by a first node, where the resource configuration information is used to indicate a time domain position of a backhaul resource set, and the backhaul resource set includes a fixed backhaul resource and a plurality of dynamic backhaul resources, where the transceiver unit is further configured to receive first indication information sent by the first node, where the first indication information is used to indicate information about a scheduled dynamic backhaul resource that is used for a backhaul link and that is in the plurality of dynamic backhaul resources.

In an embodiment, the apparatus further includes a processing unit, configured to determine, based on the information about the scheduled dynamic backhaul resource used for the backhaul link, a dynamic backhaul resource used for an access link in the plurality of dynamic backhaul resources.

In an embodiment, the transceiver unit is further configured to receive resource configuration information sent by the first node, where the resource configuration information is used to indicate a time domain position of an access resource set, and the access resource set includes at least one fixed access resource and/or a plurality of dynamic access resources.

In an embodiment, the transceiver unit is configured to receive, through different signaling or interfaces, the resource configuration information used to indicate the access resource set and the resource configuration information used to indicate the backhaul resource set.

In an embodiment, the backhaul resource set is configured by using a method that is based on a bitmap or a character string, and the bitmap includes a bit of an unavailable-backhaul-resource indication and a bit of a fixed/dynamic-backhaul-resource indication, and a priority of the unavailable-backhaul-resource indication is higher than that of the fixed/dynamic-backhaul-resource indication.

In an embodiment, the transceiver unit is further configured to receive the first indication information in a downlink transmission slot or subframe of the backhaul link, where the downlink transmission slot or subframe includes a slot or subframe in which the fixed backhaul resource and the scheduled dynamic backhaul resource that is used for the backhaul link are configured for downlink transmission.

In an embodiment, the first indication information is used to indicate one of the following operations: activation, addition, reduction, replacement, and deactivation.

In an embodiment, the first indication information is carried on a PDCCH, and the PDCCH is scrambled by using an FS-RNTI.

In an embodiment, the transceiver unit is further configured to send a response message to the first node after receiving the first indication information.

According to the resource determining apparatus in this embodiment of this application, the backhaul resource set may be configured, so that the apparatus can obtain a dynamically scheduled resource, and the dynamically scheduled resource can be shared between the access link and the backhaul link, to improve resource utilization, thereby making resource scheduling for a relay node more flexible, and implementing fast resource coordination between the access link and the backhaul link.

According to a seventeenth aspect, a resource determining apparatus is provided. The apparatus includes:

a transceiver unit, configured to receive resource configuration information sent by a first node, where the resource configuration information is used to indicate at least one fixed backhaul resource and at least one dynamic resource; and the transceiver unit is further configured to receive first indication information sent by the first node, where the first indication information is used to indicate information about a scheduled dynamic resource that is used for a backhaul link and that is in the at least one dynamic resource.

In some possible implementations, the apparatus further includes a processing unit, which is configured to determine, based on the information about the scheduled dynamic resource used for the backhaul link, a dynamic resource used for an access link in the at least one dynamic resource.

In an embodiment, the transceiver unit is further configured to receive second indication information sent by the first node, where the second indication information is used to re-assign a dynamic resource that is used for a backhaul link and that is in the at least one dynamic resource.

In an embodiment, the resource configuration information is configured by using a method that is based on a bitmap or a character string.

In an embodiment, the transceiver unit is further configured to receive the second indication information in a downlink transmission slot or subframe of the backhaul link, where the downlink transmission slot or subframe includes a slot or subframe in which the fixed backhaul resource and the scheduled dynamic resource that is used for the backhaul link are configured for downlink transmission.

In an embodiment, the transceiver unit is further configured to send a response message to the first node after receiving the first indication information or the second indication information.

According to the resource determining apparatus in this embodiment of this application, the fixed backhaul resource and the dynamic resources of the backhaul link are configured, so that the apparatus can obtain a dynamic resource, and the dynamic resource can be shared between the access link and the backhaul link, to improve resource utilization, thereby making resource scheduling for a relay node more flexible, and implementing fast resource coordination between the access link and the backhaul link.

According to an eighteenth aspect, a resource determining apparatus is provided. The apparatus includes:

a transceiver unit, configured to send resource configuration information to a second node, where the resource configuration information is used to indicate a time domain position of an access resource set, and the access resource set includes at least one fixed access resource and/or a plurality of dynamic access resources, where the transceiver unit is configured to send first indication information to the second node, where the first indication information is used to indicate information about a scheduled dynamic access resource that is used for a backhaul link and that is in the plurality of dynamic access resources.

In an embodiment, the apparatus further includes a processing unit, which is configured to determine, based on the information about the scheduled dynamic access resource used for the backhaul link, a dynamic access resource used for an access link.

In an embodiment, the transceiver unit is further configured to send resource configuration information to the second node, where the resource configuration information is used to indicate a time domain position of a backhaul resource set, and the backhaul resource set includes at least one fixed backhaul resource and/or a plurality of dynamic backhaul resources.

In an embodiment, the transceiver unit is further configured to send, to the second node through different signaling or interfaces, the resource configuration information used to indicate the access resource set and the resource configuration information used to indicate the backhaul resource set.

In an embodiment, the access resource set is configured by using a method that is based on a bitmap or a character string, and the bitmap includes a bit of an unavailable-access-resource indication and a bit of a fixed/dynamic-access-resource indication, and a priority of the unavailable-access-resource indication is higher than that of the fixed/dynamic-access-resource indication.

In an embodiment, the transceiver unit is further configured to send the first indication information in a downlink transmission slot or subframe of the backhaul link, where the downlink transmission slot or subframe includes a slot or subframe in which the fixed backhaul resource and the scheduled dynamic access resource that is used for the backhaul link are configured for downlink transmission.

In an embodiment, the first indication information is used to indicate one of the following operations: activation, addition, reduction, replacement, and deactivation.

In an embodiment, the first indication information is carried on a PDCCH, and the PDCCH is scrambled by using an FS-RNTI.

In an embodiment, the transceiver unit is further configured to: after sending the first indication information to the second node, receive a response message sent by the second node.

According to the resource determining apparatus in this embodiment of this application, the apparatus configures the access resource set, so that the second node can obtain a dynamic access resource, and the dynamic access resource can be shared between the access link and the backhaul link, to improve resource utilization, thereby making resource scheduling for a relay node more flexible, and implementing fast resource coordination between the access link and the backhaul link.

According to a nineteenth aspect, a resource determining apparatus is provided. The apparatus includes:

a transceiver unit, configured to send resource configuration information to a second node, where the resource configuration information is used to indicate a time domain position of a backhaul resource set, and the backhaul resource set includes a fixed backhaul resource and a plurality of dynamic backhaul resources, where the transceiver unit is configured to send first indication information to the second node, where the first indication information is used to indicate information about a scheduled dynamic backhaul resource that is used for a backhaul link and that is in the plurality of dynamic backhaul resources.

In an embodiment, the apparatus further includes a processing unit, which is configured to determine, based on the information about the scheduled dynamic backhaul resource used for the backhaul link, a dynamic backhaul resource used for an access link.

In an embodiment, the transceiver unit is further configured to send resource configuration information to the second node, where the resource configuration information is used to indicate a time domain position of an access resource set, and the access resource set includes at least one fixed access resource and/or a plurality of dynamic access resources.

In an embodiment, the transceiver unit is further configured to send, to the second node through different signaling or interfaces, the resource configuration information used to indicate the access resource set and the resource configuration information used to indicate the backhaul resource set.

In an embodiment, the backhaul resource set is configured by using a method that is based on a bitmap or a character string, and the bitmap includes a bit of an unavailable-backhaul-resource indication and a bit of a fixed/dynamic-backhaul-resource indication, and a priority of the unavailable-backhaul-resource indication is higher than that of the fixed/dynamic-backhaul-resource indication.

In an embodiment, the transceiver unit is further configured to send the first indication information in a downlink transmission slot or subframe of the backhaul link, where the downlink transmission slot or subframe includes a slot or subframe in which the fixed backhaul resource and the scheduled dynamic access resource that is used for the backhaul link are configured for downlink transmission.

In an embodiment, the first indication information is used to indicate one of the following operations: activation, addition, reduction, replacement, and deactivation.

In an embodiment, the first indication information is carried on a PDCCH, and the PDCCH is scrambled by using an FS-RNTI.

In an embodiment, the transceiver unit is further configured to: after sending the first indication information to the second node, receive a response message sent by the second node.

According to the resource determining apparatus in this embodiment of this application, the apparatus configures the backhaul resource set, so that the second node can obtain a dynamic backhaul resource, and the dynamic backhaul resource can be shared between the access link and the backhaul link, to improve resource utilization, thereby making resource scheduling for a relay node more flexible, and implementing fast resource coordination between the access link and the backhaul link.

According to a twentieth aspect, a resource determining apparatus is provided. The apparatus includes:

a transceiver unit, configured to send resource configuration information to a second node, where the resource configuration information is used to indicate at least one fixed backhaul resource and at least one dynamic resource, where the transceiver unit is further configured to send first indication information to the second node, where the first indication information is used to indicate information about a scheduled dynamic resource that is used for a backhaul link and that is in the at least one dynamic resource.

In an embodiment, the transceiver unit is further configured to send second indication information to the second node, where the second indication information is used to re-assign a dynamic resource that is used for a backhaul link and that is in the at least one dynamic resource.

In an embodiment, a resource configuration is configured by using a method that is based on a bitmap or a character string.

In an embodiment, the transceiver unit is further configured to send the second indication information to the second node in a downlink transmission slot or subframe of the backhaul link, where the downlink transmission slot or subframe includes a slot or subframe in which the fixed backhaul resource and the scheduled dynamic resource that is used for the backhaul link are configured for downlink transmission.

In an embodiment, the transceiver unit is further configured to: after sending the first indication information or the second indication information, receive a response message sent by the second node.

According to the resource determining apparatus in this embodiment of this application, the fixed backhaul resource and the dynamic resources of the backhaul link are configured, so that the apparatus can obtain a dynamic resource, and the dynamic resource can be shared between the access link and the backhaul link, to improve resource utilization, thereby making resource scheduling for a relay node more flexible, and implementing fast resource coordination between the access link and the backhaul link.

According to a twenty-first aspect, a communications apparatus is provided. The communications apparatus may be the second node in the foregoing method designs, or may be a chip disposed in the second node. The communications apparatus includes a processor, where the processor is coupled to a memory and may be configured to execute an instruction in the memory, to implement the method performed by the second node in any one of the first aspect, the second aspect, and the possible implementations of the first aspect and the second aspect. In an embodiment, the communications apparatus further includes the memory. In an embodiment, the communications apparatus further includes a communications interface, and the processor is coupled to the communications interface.

When the communications apparatus is the second node, the communications interface may be a transceiver or an input/output interface.

When the communications apparatus is the chip disposed in the second node, the communications interface may be an input/output interface.

In an embodiment, the transceiver may be a transceiver circuit. In an embodiment, the input/output interface may be an input/output circuit.

According to a twenty-second aspect, a communications apparatus is provided. The communications apparatus may be the first node in the foregoing method designs, or may be a chip disposed in the first node. The communications apparatus includes a processor, where the processor is coupled to a memory and may be configured to execute an instruction in the memory, to implement the method performed by the first node in any one of the third aspect, the fourth aspect, and the possible implementations of the third aspect and the fourth aspect. In an embodiment, the communications apparatus further includes the memory. In an embodiment, the communications apparatus further includes a communications interface, and the processor is coupled to the communications interface.

When the communications apparatus is the first node, the communications interface may be a transceiver or an input/output interface.

When the communications apparatus is the chip disposed in the first node, the communications interface may be an input/output interface.

In an embodiment, the transceiver may be a transceiver circuit. In an embodiment, the input/output interface may be an input/output circuit.

According to a twenty-third aspect, a program is provided. When being executed by a processor, the program is used to perform the methods provided in the first aspect to the fourth aspect.

According to a twenty-fourth aspect, a program product is provided, where the program product includes program code, and when the program code is run by a communications unit and a processing unit or a transceiver and a processor of a communications apparatus (for example, a first node or a second node), so that the communications apparatus performs the method in any one of the first aspect to the fourth aspect and the possible implementations of the first aspect to the fourth aspect.

According to a twenty-fifth aspect, a computer-readable medium is provided, where the computer-readable medium stores a program, and the program enables a communications apparatus (for example, a first node or a second node) to perform the method in any one of the first aspect to the fourth aspect and the possible implementations of the first aspect to the fourth aspect.

BRIEF DESCRIPTION OF DRAWINGS

FIG. 19 is an example of using a bitmap to represent allocation of an access link resource according to an embodiment of this application;

FIG. 20 is an example of using a character string to represent allocation of an access link resource according to an embodiment of this application;

FIG. 21 is an example of using a bitmap with grouped bits to represent allocation of an access link resource according to an embodiment of this application.

DESCRIPTION OF EMBODIMENTS

The following describes technical solutions of this application with reference to accompanying drawings.

The technical solutions of embodiments of this application may be applied to various communications systems, for example, a long term evolution (LTE) system, an LTE frequency division duplex (FDD) system, an LTE time division duplex (TDD) system, a 5th generation (5G) system, or a new radio (NR) system.

A terminal in the embodiments of this application may be user equipment, an access terminal, a subscriber unit, a user station, a mobile station, a mobile console, a remote station, a remote terminal, a mobile device, a user terminal, a terminal, a wireless communications device, a user agent, or a user apparatus. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

A network device in the embodiments of this application may be a device configured to communicate with a terminal. The network device may be a base transceiver station (BTS) in a global system for mobile communications (GSM) or a code division multiple access (CDMA) system, a NodeB (NB) in a wideband code division multiple access (WCDMA) system, an evolved NodeB (eNB or eNodeB) in an LTE system, or a radio controller in a cloud radio access network (CRAN) scenario. Alternatively, the network device may be a relay station, an access point, a vehicle-mounted device, a wearable device, a network device in a future 5G network, or a network device in a future evolved PLMN network. This is not limited in the embodiments of this application.

Figure 1:
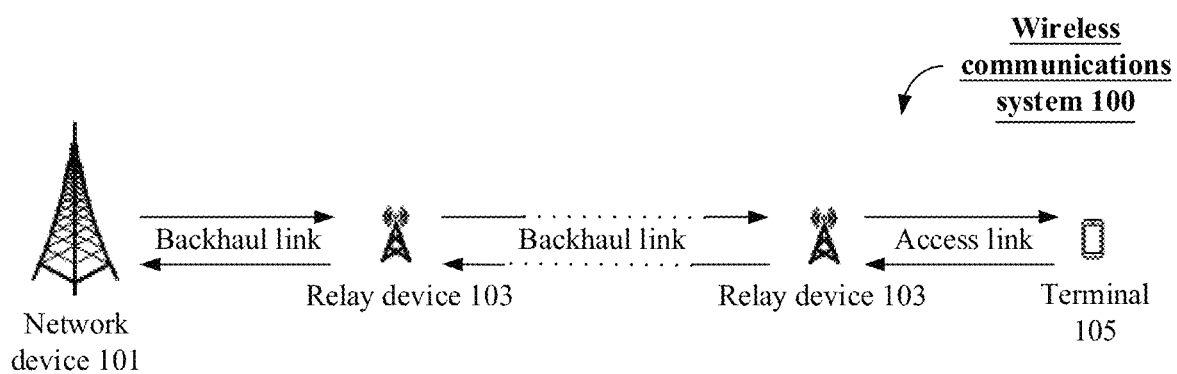
FIG. 1 is a schematic diagram of a wireless communications system according to this application.

FIG. 1 shows a wireless communications system in this application. The wireless communications system may be a long term evolution (LTE) system, a future evolved 5th generation (5G) mobile communications system, a new radio (NR) system, a machine-to-machine (M2M) communications system, or the like. As shown in FIG. 1, a wireless communications system 100 may include a network device 101, a terminal 105, and a relay device 103. The wireless communications system 100 includes a single-hop relay system or a multi-hop relay system. In the multi-hop relay system, referring to FIG. 1, there are at least two relay devices 103 between the network device 101 and the terminal 105. However, in the single-hop relay system, there is only one relay device 103 between the network device 101 and the terminal 105.

The network device may be configured to communicate with one or more terminals, or may be configured to communicate with one or more network devices that have some terminal functions (for example, communication between a macro base station and a micro base station, such as an access point). The network device may be a base transceiver station (BTS) in a time division-synchronous code division multiple access (TD-SCDMA) system, an evolved NodeB (eNB) in an LTE system, or a gNodeB gNB in a 5G system or an NR system. In addition, the network device may alternatively be an access point (AP), a transmission reception point (tTRP), a central unit (CU), or another network entity, and may include some or all functions of the foregoing network entities.

The terminal in the embodiments of this application may be a device that provides a user with voice and/or data connectivity, a handheld device with a wireless connection function, or another processing device connected to a wireless modem. The terminal may communicate with one or more core networks via a radio access network (RAN). The terminal 105 may be static or mobile. For example, the terminal 105 may be a mobile device, a mobile station (mobile station), a mobile unit, an M2M terminal, a radio unit, a remote unit, a user agent, a mobile client, a handheld device, a smartwatch, a notebook computer, a tablet computer, a smart band, or the like.

The relay device may be a relay base station, for example, a micro base station. Alternatively, the relay device may be a terminal that provides a relay function. Alternatively, the relay device may be a network entity such as a relay transceiver node, customer premise equipment (CPE), a relay transceiver, a relay agent, a transmission reception point (transmission and reception point, TRP), or a relay transmission reception point (rTRP). During specific implementation, a relay device may be disposed at a cell edge, to expand a coverage area of the network device.

In the wireless communications system 100, an access link is a radio link between a relay device and the terminal. The access link includes an uplink (UL) access link and/or a downlink (DL) access link. A backhaul link (BL) is a radio link between the network device and a relay device, or a link between relay devices. The backhaul link includes an uplink backhaul link and/or a downlink backhaul link.

In the wireless communications system 100, the relay device 103 between the network device 101 and the terminal 105 may be configured to forward a radio signal between the network device 101 and the terminal 105. Specifically, during downlink transmission, the relay device 103 is responsible for forwarding a radio signal transmitted by the network device 101, to finally transmit the radio signal to the terminal 105. During uplink transmission, the relay device 103 is responsible for forwarding a radio signal transmitted by the terminal 105, to finally transmit the radio signal to the network device 101.

It should be noted that the wireless communications system 100 shown in FIG. 1 is only intended to describe the technical solutions of this application more clearly, but is not intended to limit this application. A person of ordinary skill in the art may know that as a network architecture evolves and a new service scenario emerges, the technical solutions provided in this application are also applicable to a similar technical problem.

Figure 2:
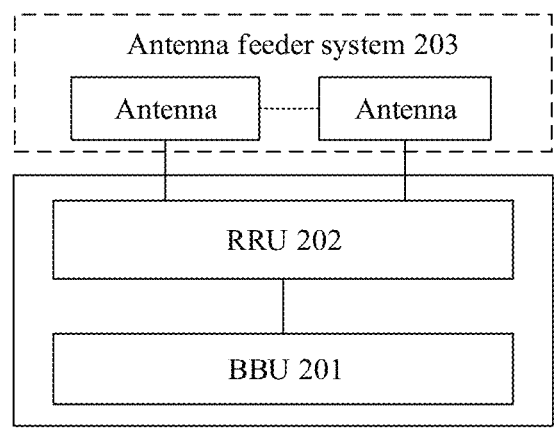
FIG. 2 is a schematic structural diagram of a network device according to an embodiment of this application.

FIG. 2 is a schematic structural diagram of a network device according to an embodiment of this application. The network device may include a building processing unit (BBU) 201 and a remote radio unit (RRU) 202. The RRU 202 is connected to an antenna feeder system 203, and the BBU 201 and the RRU 202 may be disassembled for use according to a requirement. For example, the RRU may be remotely located in a cloud platform. The structure shown in FIG. 2 may be a structure of the network device, or may be a structure of a relay device. The BBU 201 is configured to implement operation and maintenance of the entire network device or the relay device, implement signaling processing, radio resource management, and a transmission interface to a packet core network, and implement main control functions of a physical layer, a media access control layer, L3 signaling, and operation and maintenance. The RRU 202 is configured to implement conversion between a baseband signal and a radio frequency signal, implement demodulation of a radio received signal and modulation and power amplification of a sent signal, and the like. The antenna feeder system 203 may include a plurality of antennas, and is configured to implement receiving and sending of a radio air interface signal. A person skilled in the art may understand that, in a specific implementation process, the network device may further use another general-purpose hardware structure, but is not limited to the hardware structure shown in FIG. 2. A function of the network device in the embodiments of this application may also be implemented via a cloud access network (CloudRAN) device. A distributed networking mode, a centralized networking mode, or a combination of the foregoing two networking modes may be used for the CloudRAN.

Communication between the network device and the relay device or the terminal complies with a specific protocol layer structure. For example, a control plane protocol layer structure may include functions of protocol layers such as a radio resource control RRC layer, a packet data convergence protocol (PDCP) layer, a radio link control (RLC) layer, a media access control (MAC) layer, and a physical layer. A user plane protocol layer structure may include functions of protocol layers such as the PDCP layer, the RLC layer, the MAC layer, and the physical layer. In an implementation, a service data adaptation protocol (SDAP) layer is further included above the PDCP layer.

The functions of these protocol layers may be implemented by one node, or may be implemented by a plurality of nodes. For example, in an evolved structure, the network device may include a centralized unit (CU) and a distributed unit (DU), and a plurality of DUs may be centrally controlled by one CU. Division into the CU and the DU may be based on a protocol layer of a wireless network. For example, functions of the PDCP layer and a layer above the PDCP layer are set on the CU, and functions of protocol layers below the PDCP, such as the RLC layer and the MAC layer, are set on the DU.

Functions of protocol layers such as a radio resource control (RRC) protocol layer, a packet data convergence protocol (PDCP) protocol layer, a radio link control (RLC) protocol layer, and a media access control (MAC) protocol layer of the network device may be implemented by one node, or may be implemented by a plurality of nodes. For example, in an evolved structure, the network device may include a CU and a DU, and a plurality of DUs may be centrally controlled by one CU. Division into the CU and the DU may be based on a protocol layer of a wireless network. For example, functions of the PDCP layer and a layer above the PDCP layer are set on the CU, and functions of protocol layers below the PDCP, such as the RLC layer and the MAC layer, are set on the DU.

Division based on the protocol layer is merely an example, and division may alternatively be performed based on another protocol layer, for example, the RLC layer. Functions of the RLC layer and a layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, division may alternatively be performed in another manner, for example, the division is performed based on a latency. A function whose processing time needs to meet a latency requirement is set on the DU, and a function whose processing time does not need to meet the latency requirement is set on the CU.

In addition, the radio frequency apparatus may not be placed in the DU but is placed remotely from the DU, or may be integrated into the DU, or some remote parts of the radio frequency apparatus are integrated into the DU. This is not limited herein.

Further, a control plane (CP) and a user plane (UP) of the CU may be further separated into different entities for implementation, and the different entities are a control plane CU entity (CU-CP entity) and a user plane CU entity (CU-UP entity).

Signaling generated by the CU may be sent to the relay node or the terminal via the DU, or signaling generated by the relay node or the terminal may be sent to the CU via the DU. The DU may transparently transmit the signaling to the terminal or the CU by directly encapsulating the signaling at a protocol layer without parsing the signaling. In the following embodiments, if transmission of such signaling between the DU and the terminal is involved, that the DU sends or receives the signaling includes this scenario. For example, signaling at the RRC layer or the PDCP layer is finally processed as signaling at a PHY layer and sent to the relay node or the terminal, or is converted from received signaling at a PHY layer. In this architecture, it may also be considered that the signaling at the RRC layer or the PDCP layer is sent by the DU, or sent by the DU and the RRU 202.

In the embodiments of this application, the network device may be a gNB (including a gNB-CU and a gNB-DU) in 5G, or the like.

According to an existing protocol, a relay node in 5G is also referred to as an integrated access and backhaul (IAB) node, and IAB nodes may be classified into two types: a layer 3 IAB node and a layer 2 IAB node. The layer 2 IAB node has two functions: a mobile-termination (MT) function and a DU function. The MT function is used for communication between an IAB node and an upper-level node, and the DU function is used for communication between an IAB node and a lower-level node. Similarly, the layer 3 IAB node also has a function of communicating with an upper-level node and a function of communicating with a lower-level node.

In the embodiments of this application, a message from one node to another node (for example, from an upper-level node to a relay node, or from a relay node to another relay node) may be sent and received in at least the following two manners:

air interface signaling, such as RRC signaling, a media access control control element (MAC CE), DCI, or uplink control information (UCI); and an interface between network devices or between internal modules of a network device, such as an Xn interface between 5G access network nodes, an F1 interface between a CU and a DU, an enhanced F1 interface between a CU and a DU of an IAB node, and an interface between different IAB nodes.

It should be understood that there is no specific limitation on signaling or interfaces that carries or carry various types of messages in this application.

Figure 3:
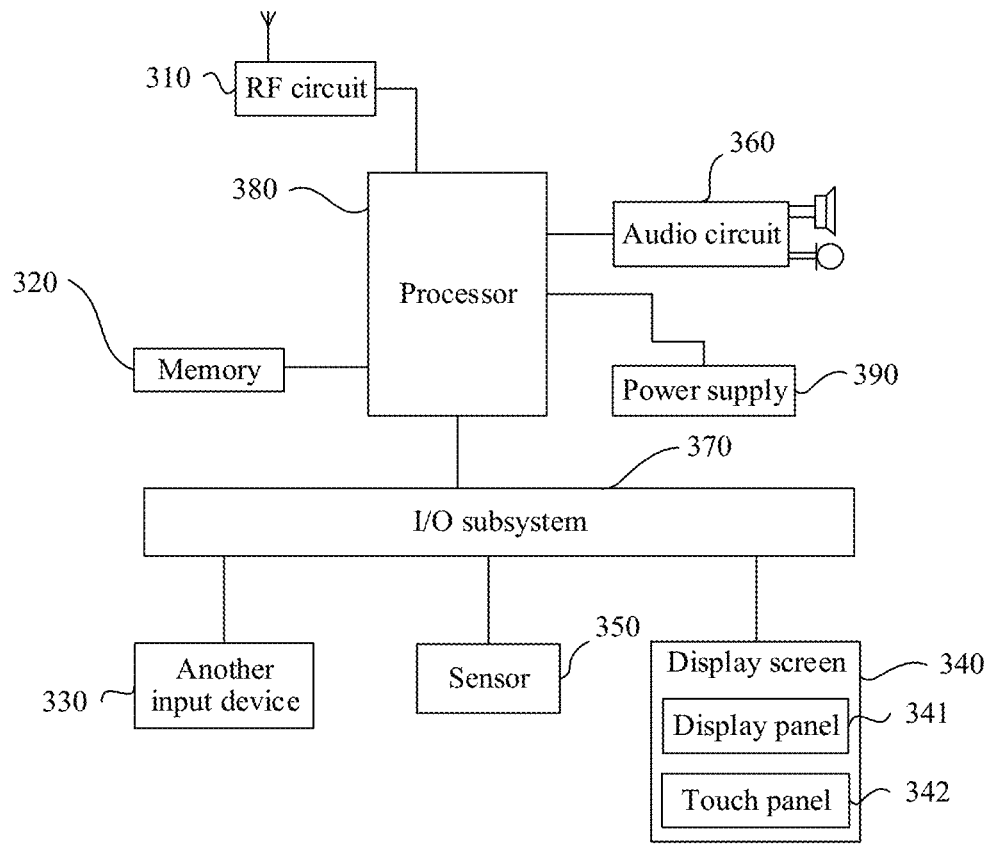
FIG. 3 is a schematic structural diagram of a terminal according to an embodiment of this application.

FIG. 3 is a schematic structural diagram of a terminal according to an embodiment of this application. Using an example in which the terminal is a mobile phone, the mobile phone may include components such as a radio frequency (RF) circuit 310, a memory 320, another input device 330, a display screen 340, a sensor 350, an audio circuit 360, an I/O subsystem 370, a processor 380, and a power supply 390. Each component of the mobile phone is described below in detail with reference to FIG. 3.

The processor 380 is connected to all of the RF circuit 310, the memory 320, the audio circuit 360, and the power supply 390. The I/O subsystem 370 is connected to all of the another input device 330, the display screen 340, and the sensor 350. The RF circuit 310 may be configured to receive and send voice or data information. Particularly, after receiving downlink information from a network device, the RF circuit sends the downlink information to the processor 380 for processing. The memory 320 may be configured to store a software program and a module. The processor 380 runs the software program and the module that are stored in the memory 320, to execute various function applications and data processing of the mobile phone. The another input device 330 may be configured to receive input digit or character information, and generate a keyboard signal input related to user setting and function control of the mobile phone. The display screen 340 may be configured to display information input by a user or information provided for a user, and various menus of the mobile phone, and may further receive user input. The display screen 340 may include a display panel 341 and a touch panel 342. The sensor 350 may be a light sensor, a motion sensor, or another sensor. The audio circuit 360 may provide an audio interface between the user and the mobile phone. The I/O subsystem 370 is configured to control inputting and outputting of an external device, and may include another device input controller, a sensor controller, and a display controller. The processor 380 is a control center of the mobile phone, is connected to each part of the entire mobile phone through various interfaces and by using various lines, and executes various functions and data processing of the mobile phone by running or executing the software program and/or the module that are/is stored in the memory 320 and invoking data stored in the memory 320, to perform overall monitoring on the mobile phone. The power supply 390 (for example, a battery) is configured to supply power to the foregoing components. Preferably, the power supply may be logically connected to the processor 380 by using a power management system, to implement functions such as charging, discharging, and power consumption management by using the power management system.

Although not shown, the mobile phone may further include function modules or components such as a camera and a Bluetooth module. Details are not described herein. A person skilled in the art may understand that a structure of the mobile phone shown in FIG. 3 does not constitute a limitation on the mobile phone, and the mobile phone may include more or fewer components than those shown in the figure, or combine some components, or have a different component arrangement.

A relay device may be a relay base station, for example, a micro base station, or a terminal that provides a relay function. For a structure of the relay device, refer to a schematic structural diagram of a network device or a terminal.

For ease of description, terms used in this application are described.

A first node is a previous-hop device, an upper-level node, or an upstream node of a second node on a link from a network device to a terminal. The second node is a next-hop device, a lower-level node, or a downstream node of the first node on the link from the network device to the terminal. The second node is a previous-hop device, an upper-level node, or an upstream node of a third node on the link from the network device to the terminal, or is a peer node of the third node.

Alternatively, a third node is a next-hop device, a lower-level node, or a downstream node of the second node on the link from the network device to the terminal, or is a peer node of the second node. The first node may be a network device or a relay device, the second node may be a relay device or a terminal, and the third node may be a relay device or a terminal. For example, if the first node is a network device or a relay device, the second node is a next-hop relay device of the first node, and the third node is a peer relay device of the second node, or the third node is a next-hop relay device of the second node or a terminal that accesses the second node.

It should be further noted that peer nodes described herein may be two nodes that do not directly communicate with each other, two independent nodes that are simultaneously linked to one upper-level node or lower-level node, or the like. For example, if the first node is a network device 101, the second node may be a first relay device 103, and the third node may be a second relay device 103 (where the second relay device 103 may be a lower-level node or a peer node of the first relay device 103) or a terminal 105. Alternatively, if the first node is a first relay device 103, the second node may be a second relay device 103 (where the second relay device 103 may be a lower-level node or a peer node of the first relay device 103), and the third node is a third relay device 103 (where the third relay device 103 may be a lower-level node or a peer node of the second relay device 103) or a terminal 105.

The embodiments of this application are applied to a wireless communications system, where the wireless communications system includes a first node, a second node, and a third node. The first node is an upper-level node of the second node and the third node, and the second node may be an upper-level node of the third node, or the second node and the third node are nodes at a same level.

In the embodiments of this application, when the first node needs to perform resource configuration, the second node sends information such as a resource available to the second node to the first node, and the first node configures a backhaul resource for the second node. In addition, in a subsequent scheduling process, the first node may send scheduling information to the second node, where the scheduling information is used to indicate an actually scheduled backhaul resource, and the second node may receive, on the actually scheduled backhaul resource, a signal sent by the first node.

Backhaul link: A link on which the second node communicates with the first node is referred to as a backhaul link.

Access link: A link on which the second node communicates with the third node is referred to as an access link.

Downlink control area: a time-frequency position occupied by a physical downlink control channel (PDCCH). In LTE, a PDCCH always occupies the first m (where m may be 1, 2, 3, or 4) symbols of a subframe. It should be noted that an E-PDCCH and an R-PDCCH in LTE do not occupy the first m symbols.

In NR, a downlink control area may be flexibly configured by using RRC signaling based on a control resource set (CORESET) and a search space set (search space set).

In the control resource set, information such as a frequency domain position of a PDCCH or a control channel element (CCE), and a quantity (where a maximum value is 3) of continuous time-domain symbols may be configured.

In the search space set, information such as a PDCCH detection periodicity, a PDCCH offset, and a start symbol of a PDCCH in a slot may be configured.

For example, it may be configured that in the search space set, a PDCCH periodicity is one slot, and a time-domain start symbol is a symbol 0. In this case, the terminal or the relay node needs to detect a PDCCH at a start position of each slot.

Downlink data area: a time-frequency position occupied by a physical downlink shared channel (PDSCH) and remaining downlink signals. The remaining downlink signals may include at least one of the following signals: a channel state information-reference signal (CSI-RS), a synchronization signal/broadcast channel block (SS/PBCH block), or the like.

In-Advance Scheduling of a Backhaul Resource

Using a downlink as an example, backhaul link transmission can be determined by two stages:

(1) First stage: The first node configures a backhaul resource set for the second node, and the configuration may be completed by using higher layer signaling (for example, RRC signaling). In a possible implementation, the first node configures an access resource set for the second node, and the second node deduces the backhaul resource set based on the access resource set.

(2) Second stage: The first node configures actual backhaul link transmission for the second node. The configuration may be completed by using higher layer signaling such as RRC signaling, or may be completed by using lower layer signaling (for example, a media access control control element (MAC CE) or DCI). For example, a periodic CSI-RS signal is generally configured by using RRC signaling, a semi-persistent CSI-RS signal may be activated by using a MAC CE, and a PDSCH and an aperiodic CSI-RS are generally scheduled or triggered by using DCI.

PDSCH transmission on the backhaul link is used as an example. The upper-level node determines a PDSCH transmission parameter of the backhaul link by using DCI, such as a time domain resource position, a transmission bandwidth, a modulation and coding scheme (MCS), and a quantity of transmitted streams. The time domain resource position should fall within the backhaul resource set. An amount of data that needs to be carried on the backhaul link dynamically changes. When the amount of data is relatively small, some backhaul resources configured by using higher layer signaling may not be used for PDSCH transmission. In an LTE relay system, a PDSCH on a backhaul link and a corresponding PDCCH are located in a same subframe. When a subframe corresponding to a backhaul link is not scheduled or a relay node does not detect a corresponding PDCCH, the subframe is wasted.

To avoid a waste of excessive resources, the relay node may recycle unscheduled backhaul resources. In an embodiment, when finding that the backhaul resources are not scheduled, the relay node may use the unscheduled backhaul resources to perform access link transmission. In this case, a backhaul resource may also be used for an access link. Therefore, the backhaul resource is also referred to as an optional backhaul resource in this application.

To enable the relay node to recycle a backhaul resource, the first node may pre-configure a PDCCH corresponding to an optional backhaul resource. If the second node detects scheduling DCI, the second node receives a signal on the corresponding optional backhaul resource. Alternatively, if the second node does not detect scheduling DCI, the second node sends an access link signal. Through in-advance scheduling, the relay node may recycle an unscheduled optional backhaul resource. To ensure that in-advance scheduling can be implemented, an advance of a PDCCH should be sufficient for the relay node to perform operations such as DCI decoding and access link signal generation. Therefore, the advance should meet a minimum threshold $K_1$, where $K_1$ may be defined in a protocol, or may be reported by the relay node.

Figure 4:
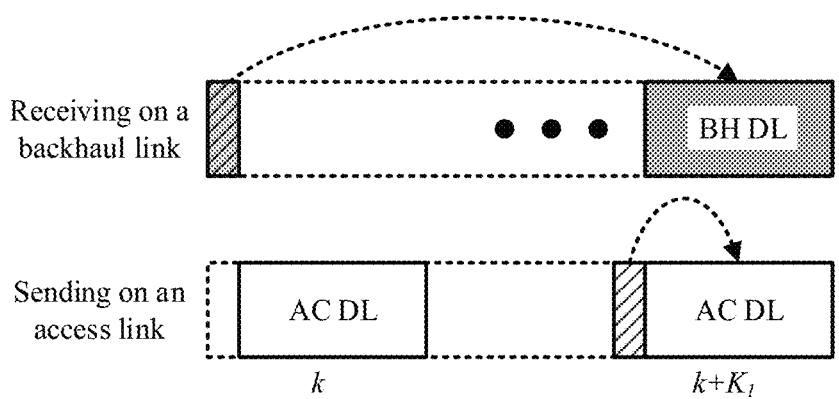
FIG. 4 is a schematic diagram of in-advance scheduling a backhaul resource.

FIG. 4 is a schematic diagram of in-advance scheduling of a backhaul resource. A relay node receives a PDCCH in a $k^{th}$ slot on a backhaul link. If the relay node detects scheduling DCI, the relay node receives, in a $(k+K_1)^{th}$ slot, a PDSCH sent by an upper-level node. If the relay node does not detect DCI in the $k^{th}$ slot, the relay node sends a PDSCH to a lower-level node in the $(k+K_1)^{th}$ slot.

When the relay node supports space division multiplexing or frequency division multiplexing on a backhaul link and an access link, that is, when the relay node simultaneously receives a downlink backhaul link transmission and an uplink access link transmission, or the relay node simultaneously sends an uplink backhaul link transmission and a downlink access link transmission, in-advance scheduling may also be used. For example, the relay node simultaneously receives a downlink backhaul link transmission and an uplink access link transmission. After detecting downlink scheduling DCI in the $k^{th}$ slot, the relay node may schedule a subordinate terminal device based on content of the DCI, so that space division multiplexing (SDM) is performed on the uplink access link transmission sent by the terminal device and the scheduled downlink backhaul link transmission. The relay node simultaneously receives the downlink backhaul link transmission and the uplink access link transmission in the $(k+K_1)^{th}$ slot. In this case, in duration of the $K_1$ slots, the relay node needs to parse backhaul link DCI and send access link DCI. In addition, the subordinate terminal device needs to parse the access link DCI, and prepare content of the to-be-sent uplink access link transmission.

It should be understood that, in the embodiments of this application, a slot may include a control area and a data area. As shown in FIG. 4, first several symbols (a slashed area) of the slot k are a control area of the slot k, and last several symbols (a blank area) of the slot k are a data area of the slot k. On a backhaul link, the relay node receives or detects, in the control area, a PDCCH sent by an upper-level node, and receives, in the data area, a PDSCH and/or another signal (for example, a CSI-RS) sent by the upper-level node. On an access link, the relay node sends a PDCCH to a lower-level node in the control area, and sends a PDSCH and/or another signal (for example, a CSI-RS) to the lower-level node in the data area.

It should be further understood that positions of the control area and the data area in the slot are merely examples. It is assumed that a control area of a backhaul resource is located at a head of the slot, and it is assumed that headers of some backhaul resources also include a control area of an access link. The foregoing two assumptions are only one possible implementation, other implementations are not excluded in this application. For example, a control area of a backhaul resource may not be located at a start position of a slot, and a scheduled backhaul slot may not be used to send a PDCCH of the access link.

It should be further understood that, the backhaul resource in the embodiments of this application may be a time unit, and the time unit may be one slot, a plurality of slots, a plurality of symbols, or the like. This is not limited in this application. In addition, when configuring a backhaul resource, the upper-level node may further indicate frequency domain information, for example, indicate bandwidth part (BWP) information of the backhaul resource. The frequency domain information of the backhaul resource is not limited in this application.

In-Advance Scheduling During Beam Indication

Figure 5:
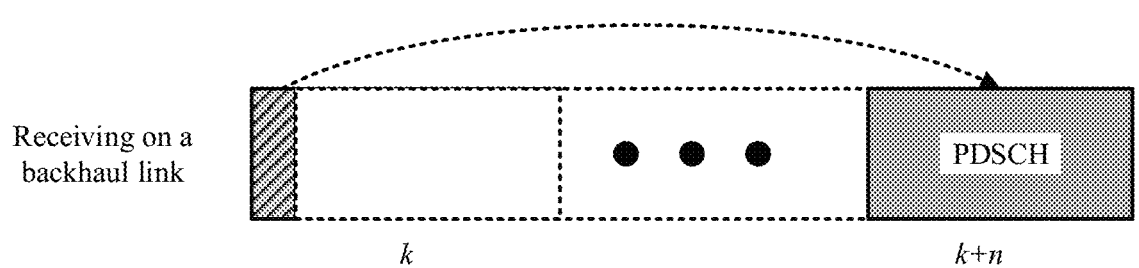
FIG. 5 is a schematic diagram of in-advance scheduling during beam indication.

In NR, in-advance scheduling is also used during beam indication that occurs when a PDSCH is scheduled by using DCI. Herein, PDSCH receiving of a terminal or a relay node is considered. In this application, it is assumed that the relay node also uses a mechanism that is the same as or similar to that of the terminal to dynamically indicate a beam. As shown in FIG. 5, a relay node (or a terminal) detects PDSCH scheduling DCI, where the scheduling DCI indicates a scheduling delay n. When the scheduling delay is greater than a preset threshold $K_2$ (a parameter Threshold-Sched-Offset in NR), the relay node (or the terminal) determines a receive beam by using a transmission configuration indicator (TCI) in the DCI. When the scheduling delay n is less than the preset threshold $K_2$, the relay node (or the terminal) uses a default receive beam.

It should be understood that there is a difference between the in-advance scheduling of the backhaul resource and the in-advance scheduling during the beam indication in the embodiments of this application. The in-advance scheduling of the backhaul resource is to enable the relay node (or the terminal) to recycle an unoccupied backhaul resource. The relay node knows that current DCI indicates, by using in-advance scheduling, a subsequent slot that meets a minimum threshold, and a purpose (an access link or a backhaul link) of a current slot (a slot k in FIG. 4) has been already determined in advance by the upper-level node or the relay node. This does not cause a waste of resources. The in-advance scheduling during the beam indication is to enable the terminal or the relay node to have sufficient time to detect DCI and switch an analog beam. The terminal or the relay node does not know whether in-advance scheduling is used for current DCI, but determines, based on a DCI parsing result, whether to perform in-advance scheduling. Therefore, the relay node still needs to perform receiving in a current slot (a slot k in FIG. 5).

When a scheduling advance is $n \geq K_3 = \max(K_1, K_2)$, the in-advance scheduling brings the following benefits:

(1) The relay node may recycle an unscheduled optional backhaul resource.

(2) The upper-level node may indicate a beam to the lower-level node by using the TCI in the DCI.

To improve flexibility of configuring a dynamic backhaul resource, a quantity of optional backhaul resources should not be too small. However, one optional backhaul slot generally needs to correspond to receiving of a PDCCH once. If m optional backhaul slots are configured in one periodicity, the relay node (or the terminal) needs to receive and detect the PDCCH m times. However, receiving of excessive PDCCHs increases backhaul link overheads on the relay node (including a guard interval between backhaul and access link switching), and if the relay node receives excessive PDCCHs, it is not conducive to sending of the PDCCHs on the access link. On the other hand, too few optional resource configurations can affect system throughput and flexibility.

The embodiments of this application provide a resource scheduling method, to ensure allocation of a dynamic backhaul resource in a backhaul resource allocation and scheduling process (that is, a relay node or a terminal may recycle an unscheduled backhaul resource), and avoid allocation excessive PDCCHs by the relay node or the terminal.

Figure 6:
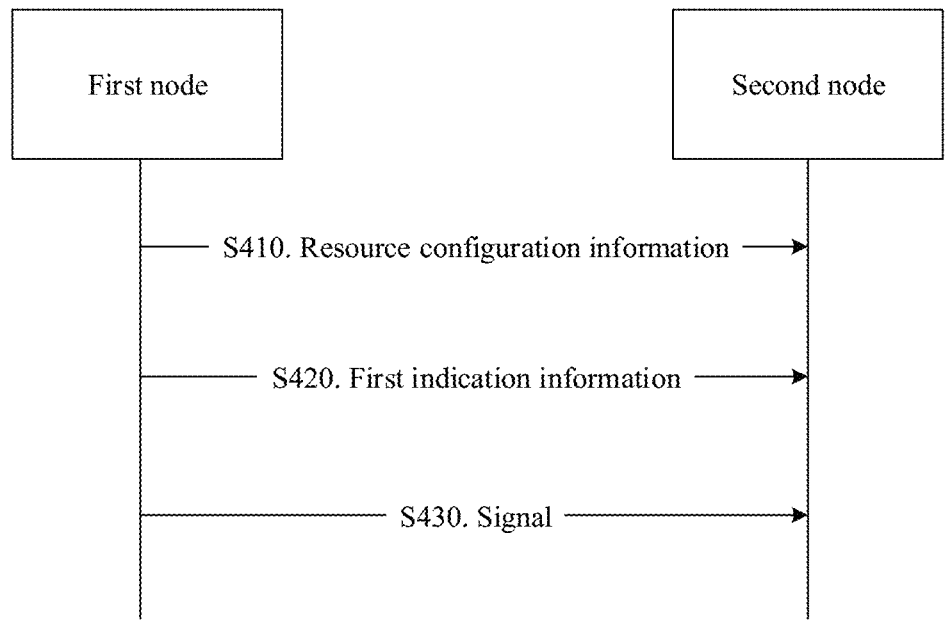
FIG. 6 is a schematic flowchart of a resource scheduling method according to an embodiment of this application.

FIG. 6 is a schematic flowchart of a resource scheduling method 400 according to an embodiment of this application. As shown in FIG. 6, the method 400 includes the following operations.

S410. A first node sends resource configuration information to a second node, and the second node receives the resource configuration information sent by the first node, where the resource configuration information is used to indicate a time domain position of a backhaul resource set, and the backhaul resource set includes a fixed backhaul resource and a plurality of dynamic backhaul resources.

S420. The first node sends first indication information to the second node on the fixed backhaul resource, and the second node receives the first indication information sent by the first node, where the first indication information is used to indicate information about scheduled dynamic backhaul resources in the plurality of dynamic backhaul resources.

S430. The first node sends a signal to the second node on the scheduled dynamic backhaul resources, and the second node receives, on the scheduled dynamic backhaul resources, the signal sent by the first node.

In an embodiment, the first node sends the resource configuration information to the second node. The resource configuration information indicates the time domain position of the backhaul resource set. The backhaul resource set includes a fixed backhaul resource and a plurality of dynamic backhaul resources. After the backhaul resource set is configured, the first node may send first indication information on the fixed backhaul resource in the backhaul resource set, where the first indication information indicates information about the scheduled dynamic backhaul resource in a plurality of dynamic backhaul resources. After receiving the information, the second node may determine that the first node is to send the signal on the scheduled dynamic backhaul resources, and the second node receives, on the scheduled dynamic backhaul resources, the signal sent by the first node.

In an embodiment, the first node is a network device, a relay node, or a terminal having a relay node function.

In an embodiment, the second node is a relay node, or a terminal having a relay node function.

It should be understood that the fixed backhaul resource in this embodiment of this application is a time-frequency resource used by the second node to receive the first indication information.

It should be further understood that the dynamic backhaul resource in this embodiment of this application may be understood as a backhaul resource that can be scheduled. That is, although the first node configures the plurality of dynamic backhaul resources for the second node, in an actual scheduling process, the second node needs to determine, based on the first indication information, backhaul resources in the plurality of dynamic backhaul resources are used as actually scheduled backhaul resources.

It should be further understood that, in this embodiment of this application, the resource configuration information may be generated by the first node and sent to the second node. Alternatively, the resource configuration information may be generated by a control node and sent to the first node, and the first node sends the resource configuration information to the second node. The control node is a network device or a relay node different from the first node.

In an embodiment of this application, the first node configures the backhaul resource set for the second node in, but not limited to, the following two manners.

Manner 1: Separate Configuration

The first node may configure a plurality of backhaul resources for the second node. The plurality of backhaul resources include a fixed backhaul resource and a plurality of dynamic backhaul resources. In addition, the first node further configures a correspondence between the fixed backhaul resource and the plurality of dynamic backhaul resources for the second node.

It should be understood that a configuration granularity of the backhaul resource may be one time unit, for example, may be one slot, a plurality of slots, or a plurality of symbols. In this embodiment of this application, that the configuration granularity is a slot is mainly used for description, but other configuration granularities are not excluded. The "backhaul resource" in this embodiment of this application may also be referred to as a "backhaul slot" or a "backhaul resource slot". When the backhaul resource is configured, a parameter set used for the time unit needs to be indicated, for example, a subcarrier spacing, a cyclic prefix (CP) type or length, and a DMRS type. Some of the parameters may be obtained by configuring a BWP. As described above, the fixed backhaul resource is a resource for sending the first indication information, and the first indication information is usually sent by using a PDCCH. In NR, a time resource occupied by the PDCCH is usually several time domain symbols (for example, one to three symbols) rather than an entire slot. Therefore, in this application, a fixed backhaul slot represents a slot including a fixed backhaul resource, and it does not mean that an entire slot is a fixed backhaul resource.

In an embodiment, the first node allocates a plurality of backhaul resource slots to the second node, where the plurality of backhaul resource slots include at least one fixed backhaul resource slot, and each dynamic backhaul slot is associated with one fixed backhaul slot. The association relationship indicates that first indication information corresponding to the dynamic backhaul slot is sent in the fixed backhaul slot.

In another embodiment, the first node allocates a plurality of backhaul resource slots to the second node, and each backhaul resource slot is associated with one backhaul resource slot, indicating that first indication information corresponding to the backhaul resource slot is sent in the associated backhaul resource slot. When a backhaul slot is associated with the backhaul slot itself, the backhaul slot is the foregoing fixed backhaul slot.

In the foregoing two embodiments, an association relationship between backhaul slots may be configured when the backhaul slots are configured, or may be configured by using separate signaling. After configuring the association relationship, the first node further needs to configure, for the second node, a position of the PDCCH including the first indication information. The PDCCH should be located in a fixed backhaul slot. When there are a plurality of fixed backhaul slots, each fixed backhaul slot may be configured with a PDCCH. In NR, a time-frequency position occupied by the PDCCH is obtained by configuring a CORESET and a search space set.

In an embodiment, the first node allocates a plurality of backhaul resource slots to the second node, and implicitly indicates a position of a fixed backhaul slot by configuring a PDCCH position. Specifically, a time-frequency position of a PDCCH configured by the first node for the second node is a fixed backhaul slot position, and the second node may configure a plurality of backhaul slots indicated by first indication information included in the PDCCH. The configured PDCCH may be located in one configured backhaul resource slot, or may be located in one independent slot. Similarly, the first node may configure a plurality of PDCCHs to indicate a plurality of fixed backhaul slots.

It should be noted that all the foregoing backhaul slots are periodically configured, and a plurality of associated backhaul slots should generally have a same periodicity. The periodicity of the backhaul slot may be separately configured, or another configured periodicity may be directly used. For example, the periodicity of the backhaul slot may be consistent with a TDD uplink-downlink common configuration (a parameter tdd-UL-DL-ConfigurationCommon in the protocol) periodicity used by the first node. In some cases, the first node may configure two sets of TDD uplink-downlink common configurations, and the two sets of configurations have a same periodicity. However, specific uplink-downlink slot configurations may be different. In this case, two sets of similar configurations may also be used for a backhaul resource. A periodicity of the PDCCH needs to be configured also by using a search space set. Generally, the periodicity configured by using the search space set should be consistent with a periodicity of the fixed backhaul resource, or the periodicity configured by using the search space set should be an integer multiple of a periodicity of the fixed backhaul resource.

Manner 2: Configuration of a Backhaul Resource Group

The first node may configure one backhaul resource group for the second node, and a configuration of the backhaul resource group is:

```
{
    backhaul resource group number;
    backhaul resource group periodicity;
    time domain position of a first time unit (a fixed
    backhaul resource) in a backhaul
resource periodicity;
    time domain position of a second time unit (a dynamic
    backhaul resource) in a backhaul
resource periodicity;
    time domain position of a third time unit (a dynamic
    backhaul resource) in a backhaul
resource periodicity;
    ...
    time domain position of an $N^{th}$ time unit (a dynamic
    backhaul resource) in a backhaul
resource periodicity;
}
```

It should be understood that the foregoing configuration content indicates that the first node may configure a plurality of backhaul resource groups for the second node, to avoid that one fixed backhaul resource is used to indicate excessive dynamic backhaul resources, and improve configuration flexibility.

It should be understood that a configuration granularity of the backhaul resource may be one time unit, for example, may be one slot, a plurality of slots, or a plurality of symbols. In this embodiment of this application, that the configuration granularity is a slot is mainly used for description, but other configuration granularities are not excluded. In addition, there is only one fixed backhaul resource in the configured resource groups. However, in this application, there may be a plurality of fixed backhaul slots in the backhaul resource groups. When the time unit of the backhaul resource is configured, a parameter set used for the time unit needs to be indicated, for example, a subcarrier spacing, a CP type or length, and a DMRS type. Some of the parameters may be obtained by configuring a BWP. As described above, the fixed backhaul resource is a resource for sending the first indication information, and the first indication information is usually sent by using a PDCCH. In NR, a time resource occupied by the PDCCH is usually several time domain symbols (for example, one to three symbols) rather than an entire slot. Therefore, in this application, a fixed backhaul slot represents a slot including a fixed backhaul resource, and it does not mean that an entire slot is a fixed backhaul resource.

In an embodiment, when configuring the backhaul resource for the second node, the first node may further configure frequency domain information of the backhaul resource. First, the first node may configure BWP information when configuring the backhaul resource for the second node, where the BWP information includes bandwidth information. Second, the first node may directly configure frequency domain information of the backhaul resource for the second node, for example, a frequency domain position and a range. A configuration granularity of the frequency domain information is usually an integer multiple of a resource block (resource block, RB). When the frequency domain position and the range of the backhaul resource are configured, it indicates that the backhaul link scheduled by the first node does not exceed the range, and the second node may schedule an access link beyond the range.

It should be noted that the fixed backhaul slot in the manner 2 may not be directly configured, but may be obtained by configuring the PDCCH including the first indication information. A specific method is the same as that described above, and details are not described herein again. In addition, the fixed backhaul slot may also be the first slot of a backhaul resource group.

In the configuration manner 2, the backhaul slots are configured in groups, and a dynamic backhaul slot in a same group is indicated by first indication information in a fixed backhaul slot. Therefore, an association relationship between backhaul slots does not need to be configured by using additional signaling. After configuring the backhaul resource group, the first node further needs to configure, for the second node, a position of the PDCCH including the first indication information. The PDCCH should be located in a fixed backhaul slot. When there are a plurality of backhaul slot groups, a fixed backhaul slot of each backhaul slot group may be configured with a PDCCH. In NR, a time-frequency position occupied by the PDCCH is obtained by configuring a CORESET and a search space set.

Figure 7:
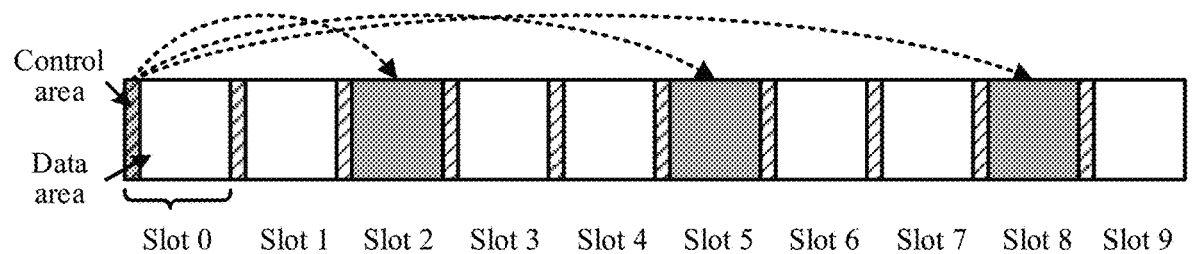
FIG. 7 is another schematic diagram of in-advance scheduling of a backhaul resource.

FIG. 7 is a schematic diagram of in-advance scheduling of a backhaul resource. As shown in FIG. 7, the first node configures one fixed backhaul slot (a slot 0) and a plurality of dynamic backhaul slots (a slot 2, a slot 5, and a slot 8) for the second node.

In an embodiment, the fixed backhaul resource may be a control area of the slot 0, and the plurality of dynamic backhaul resources may be data areas of the slots 2, 5, and 8. The second node may receive, in the control area of the slot 0, first indication information sent by the first node, where the first indication information indicates that the data areas of the slots 2, 5, and 8 are all scheduled backhaul resources, or the first indication information indicates that none of the data areas of the slots 2, 5, and 8 is a scheduled backhaul resource, or the first indication information indicates that at least some of the data areas of the slots 2, 5, and 8 are scheduled backhaul resources.

For example, if the first indication information indicates that the data area of the slot 2 is a scheduled backhaul resource, and the data areas of the slots 5 and 8 are not scheduled, the second node may schedule the data area of the slot 2 to receive a PDSCH sent by the first node, and the data areas of the slots 5 and 8 that are not scheduled may also be used as access link resources (or for other purposes).

It should be understood that, to enable the second node to recycle an unscheduled dynamic backhaul resource, an interval between the fixed backhaul resource and each of the scheduled dynamic backhaul resources (the slot 0 and the slot 2 in FIG. 7) should be greater than the threshold $K_1$ in the foregoing description. If the first node needs to indicate a dynamic beam (or dynamically indicate a spatial QCL relationship) on the scheduled dynamic backhaul resources, the interval between the fixed backhaul resource and each of the scheduled dynamic backhaul resources should be greater than the threshold $K_2$ in the foregoing description.

In an embodiment of this application, the control area and the data area are not in a one-to-one correspondence, but one control area corresponds to a plurality of data areas. In a subsequent scheduling process, the second node may receive, in one control area, scheduling DCI of a plurality of data areas or indication information indicating whether a plurality of data areas are scheduled.

It should be understood that, in this embodiment of this application, various RRC configurations (or other higher layer configurations) of the second node may be configured and sent by the first node, or may be configured and then sent by another network device (for example, a gNB, a CU, or a DU) via the first node. This is not limited in this application.

According to the resource scheduling method in an embodiment of this application, indication information is received on one backhaul resource, and the indication information indicates a scheduled backhaul resource in a plurality of backhaul resources, to help avoid switching overheads on a terminal or a relay node while ensuring system flexibility.

In an embodiment, the first indication information includes a downlink scheduling parameter of the scheduled dynamic backhaul resource. Generally, the downlink scheduling parameter is carried by using DCI, for example, DCI formats 1_0 and 1_1 in NR.

Specifically, the first indication information includes a downlink scheduling parameter of each dynamic backhaul resource in the scheduled dynamic backhaul resources. After receiving the first indication information, the second node may receive a signal on each of the dynamic backhaul resources based on the downlink scheduling parameter of each scheduled dynamic backhaul resource.

It should be understood that the signal received by the second node on each scheduled dynamic backhaul resource may be a signal sent by the first node, or may be a signal sent by another node. This is not limited in this application.

In an embodiment, the first indication information is at least one piece of DCI, and each of the at least one piece of DCI corresponds to one of the scheduled dynamic backhaul resources.

The first node sends a downlink scheduling parameter of a second scheduled dynamic backhaul resource to the second node on the fixed backhaul resource, and the second node receives the downlink scheduling parameter that is of the second scheduled dynamic backhaul resource and that is sent by the first node, where the scheduled dynamic backhaul resources include the second scheduled dynamic backhaul resource.

In an embodiment, the fixed backhaul resource and the second scheduled dynamic backhaul resource are located in a same time unit, or the fixed backhaul resource and the second scheduled dynamic backhaul resource are located in adjacent time units.

Specifically, in an embodiment, a case in which no data backhauled within a periodicity seldom occurs in a system. Therefore, to further reduce switching overheads, the downlink scheduling parameter that is of the second scheduled dynamic backhaul resource and that is sent by the first node may be received on the fixed backhaul resource. The second scheduled dynamic backhaul resource and the fixed backhaul resource are located in a same time unit, or the second scheduled dynamic backhaul resource and the fixed backhaul resource are located in adjacent time units.

The following uses an example in which the second scheduled dynamic backhaul resource and the fixed backhaul resource are located in a same slot for description.

It should be understood that, because an interval between the fixed backhaul resource and the second scheduled dynamic backhaul resource is 0, even if the second node does not receive the downlink scheduling parameter of the second scheduled dynamic backhaul resource, the second node may be unable to recycle the second scheduled dynamic resource.

In an embodiment, a periodic or semi-persistent (semi-persistent) signal configured by the first node for the second node should be on the fixed backhaul resource or the second scheduled dynamic backhaul resource, and the periodic signal includes a CSI-RS, an SS block/a PBCH block, a TRS, or the like.

In another embodiment, when a periodic signal configured by the first node is located outside the fixed backhaul resource or the second scheduled dynamic backhaul resource, the second node ignores the configuration, or the second node may not receive a configured signal located outside the fixed backhaul resource or the second scheduled dynamic backhaul resource. A specific example is as follows, and a procedure in which from initial access to performing a normal operation by the second node is divided into two phases.

First phase: The second node first accesses the first node by using an independent terminal function, where the first node may configure a periodic signal such as a CSI-RS for the second node, and then the first node configures a relay-node-specific configuration such as a backhaul resource for the second node.

Second phase: The second node enables a network device function of the second node to serve a lower-level node.

After the phase 2 starts, if a periodic signal configured by the first node in the phase 1 is located outside the fixed backhaul resource or the second scheduled dynamic backhaul resource, the second node ignores the configuration, or the second node may not receive a configured signal located outside the fixed backhaul resource or the second scheduled dynamic backhaul resource. Alternatively, after the second phase starts, the second node ignores all signals configured in the first phase.

Figure 8:
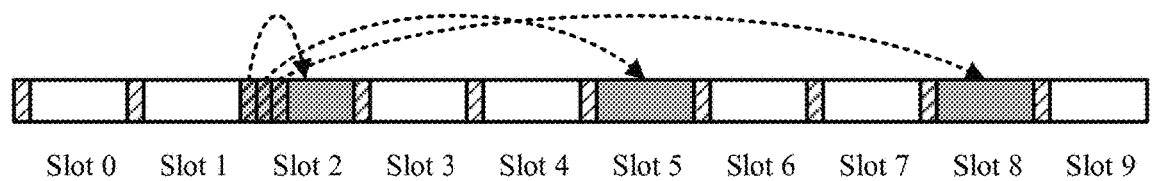
FIG. 8 is still another schematic diagram of in-advance scheduling of a backhaul resource.

FIG. 8 is another schematic diagram of in-advance scheduling. As shown in FIG. 8, the first node configures a fixed backhaul resource (a control area of a slot 2) and three dynamic backhaul resources (data areas of slots 2, 5, and 8) for the second node. A PDCCH received by the second node in the control area of the slot 2 indicates downlink scheduling information of the data areas of the slots 2, 5, and 8, or the second node receives DCI (for example, DCI for scheduling a PDSCH) of the data areas of the slots 2, 5, and 8 in the control area of the slot 2. The DCI received in the control area of the slot 2 indicates a downlink scheduling parameter of the slot 2, the DCI received in the control area of the slot 2 indicates a downlink scheduling parameter of the slot 5, and the DCI received in the control area of the slot 2 indicates a downlink scheduling parameter of the slot 8.

In this example, the data area in the slot 2 is the second scheduled dynamic backhaul resource.

It should be understood that each dynamic backhaul resource in FIG. 8 is scheduled by using DCI in a fixed backhaul slot. FIG. 8 is merely an example, and does not represent an actual time-frequency domain position of the DCI.

It should be further understood that the DCI received in the control area of the slot 2 may further carry a field indicating information about a receive beam in the data area of the slot 5, and the DCI received in the control area of the slot 2 may further carry a field indicating information about a receive beam in the data area of the slot 8, and a receive beam in the data area of the slot 2 may be a default receive beam or a pre-configured receive beam.

In an embodiment, the second node receives, on the fixed backhaul resource, information that is sent by the first node and that is about a receive beam for a third scheduled dynamic backhaul resource, where the scheduled dynamic backhaul resources include the third scheduled dynamic backhaul resource.

In an embodiment, if the scheduled dynamic backhaul resources include a second scheduled dynamic backhaul resource, where the second scheduled dynamic backhaul resource and the fixed backhaul resource are located in a same time unit or in adjacent time units, the first indication information further includes information used to indicate a receive beam for a third scheduled dynamic backhaul resource, and the third scheduled dynamic backhaul resource is at least a part, other than the second scheduled dynamic backhaul resource, of the scheduled dynamic backhaul resources.

In an embodiment, if the scheduled dynamic backhaul resources do not include a dynamic backhaul resource, where the dynamic backhaul resource and the fixed backhaul resource are located in a same time unit or in adjacent time units, the first indication information further includes information used to indicate a receive beam for a third scheduled dynamic backhaul resource, and the third scheduled dynamic backhaul resource is at least a part of the scheduled dynamic backhaul resources.

As shown in FIG. 8, the fixed backhaul resource (the control area of the slot 2) and the second scheduled dynamic backhaul resource (the data area of the slot 2) are located in a same slot. In this case, the first indication information further includes the information about the receive beam for the third scheduled dynamic backhaul resource (the data area in the slot 5 and the data area in the slot 8).

In an embodiment, the DCI of the slot 5 and the DCI of the slot 8 that are received in the control area of the slot 2 respectively carry fields indicating the information about the receive beams in the slot 5 and the slot 8.

In an embodiment, when the first indication information is at least one piece of DCI, a field may be carried in some or all of the at least one piece of DCI to indicate the receive beam used for the PDSCH of the third dynamic backhaul resource.

For example, as shown in FIG. 7, the first node receives DCI of the slot 2 in the slot 0, and a TCI carried in the DCI is used to indicate a receive beam used for a PDSCH in the slot 2. Generally, the receive beam for the PDSCH is indicated by a spatial QCL relationship. However, the spatial QCL relationship is indicated by using a transmission configuration indication. In an existing protocol, the TCI includes three bits. That is, eight TCI statuses may be indicated, and each status is associated with at least one reference signal used to indicate the QCL relationship. More specifically, one TCI status may include a reference signal configured with Type-D QCL, to indicate a receive beam for a subsequent PDSCH. There is a Type-D QCL relationship between the reference signal and a DMRS of the subsequent PDSCH. In other words, the relay node may receive the subsequent PDSCH by using the beam for receiving the reference signal. Type-D QCL is QCL about a spatial Rx parameter (spatial Rx parameter).

It should be understood that the TCI in the current protocol may be used to indicate only one receive beam, that is, one TCI status includes only one reference signal used to indicate a Type-D QCL relationship. A possibility that one TCI is used to indicate a plurality of receive beams is not excluded in a subsequent protocol, and a quantity of receive beams indicated by one TCI status is not limited in this application.

For another example, the first node receives, in the slot 0, the DCI of the slot 5 and the slot 8, where the DCI separately carries TCIs to indicate receive beams used for PDSCHs in the slot 5 and the slot 8.

In an embodiment of this application, the first node may determine a control channel PDCCH of the fixed backhaul resource by configuring a control resource set (CORESET) and a search space set (search space set). A frequency domain subcarrier resource, a time domain symbol quantity, a DMRS configuration, an interleaving scheme, a precoding scheme, a QCL relationship, and the like of the PDCCH are determined based on the CORESET. After the CORESET is configured, the relay node can obtain several control channel elements (CCE). One search space set needs to be associated with one CORESET. The search space set indicates information such as a periodicity in which the terminal or the relay node detects a PDCCH, an offset in the periodicity, a time domain position of a CORESET start symbol, an aggregation level that needs to be detected, a quantity of PDCCH candidates at each aggregation level, an index of a CCE occupied by each PDCCH candidate, and a DCI format that needs to be detected. The aggregation level indicates a quantity of CCEs occupied by a PDCCH candidate, and may have a value of 1, 2, 4, 8, 16, or the like.

In an embodiment of this application, PDSCH scheduling information of the scheduled dynamic backhaul resources may be sent on a PDCCH of the fixed backhaul resource, and the second scheduled dynamic backhaul resource (the data area of the slot 2) in the scheduled dynamic backhaul resources and the fixed backhaul resource (the control area of the slot 2) may be located in a same time unit (the slot 2), or may be located in adjacent time units.

In an embodiment, each of the scheduled dynamic backhaul resources corresponds to one control resource set, or each of the scheduled dynamic backhaul resources corresponds to one search space set or a subset of one search space set.

In an embodiment, the first node determines, by using a correspondence between each scheduled dynamic backhaul resource and a control resource set, a manner of sending DCI on each dynamic backhaul resource.

Alternatively, the first node determines, by using a correspondence between each scheduled dynamic backhaul resource and a search space set, a manner of sending DCI on each dynamic backhaul resource.

Alternatively, the first node determines, by using a correspondence between each scheduled dynamic backhaul resource and a subset of a search space set, a manner of sending DCI on each dynamic backhaul resource.

In an embodiment, the manner of sending DCI includes time-frequency resource mapping information corresponding to a PDCCH, and the like.

Specifically, the correspondence between each scheduled dynamic backhaul resource and the control resource set or the search space set includes but is not limited to the following manners:

Manner 1

A plurality of CORESETs are configured, and the CORESETs are bound to dynamic backhaul resources. Different backhaul resources are scheduled by using DCI in different CORESETs. The first node may bind a CORESET to a dynamic backhaul resource (for example, bind a CORESET index p to a backhaul resource index) in advance by using RRC signaling. In addition, the second node may also determine, based on an existing time domain resource indication field in the DCI, a dynamic backhaul resource corresponding to the DCI.

Manner 2

A search space set is bound to a backhaul resource. Different backhaul resources are scheduled by using DCI in different search space sets. The first node may bind a search space set to a dynamic backhaul resource (bind a search space set index s to a backhaul resource index) in advance by using RRC signaling. In addition, the second node may also determine, based on an existing time domain resource indication field in the DCI, a dynamic backhaul resource corresponding to the DCI.

Manner 3

A PDCCH candidate configured by using a search space set is bound to a backhaul resource. Different backhaul resources use different PDCCH candidates in a search space set to blindly detect scheduling DCI. In addition, the second node may also determine, based on an existing time domain resource indication field in the DCI, a dynamic backhaul resource corresponding to the DCI.

In an embodiment, the first node indicates, to the second node by configuring a search space set, a PDCCH blind detection periodicity and a quantity of PDCCH candidates in a periodicity, or a quantity of PDCCH candidates that need to be blindly detected by the second node in a search space set periodicity. Each candidate PDCCH includes L CCEs, and index numbers of the L CCEs are obtained through calculation according to a protocol-agreed rule by using a plurality of parameters (for example, an RNTI identifier of the second node, a total quantity of CCEs in a CORESET, and a total quantity of PDCCH candidates), where L represents an aggregation level, and one search space set may be configured with a plurality of aggregation levels.

In an embodiment of this application, it may be considered that an identifier of a backhaul resource is introduced, as a new parameter, into a CCE index rule for a PDCCH candidate, so that different backhaul resources correspond to different PDCCH candidates. Specifically, one backhaul resource corresponds to a part of several PDCCH candidates.

A part of the several PDCCH candidates are also referred to as a subset of a search space set in this embodiment of this application. In some cases, different PDCCH candidates have different CCE indexes. In other cases, CCE indexes of different PDCCH candidates may collide. For example, one or more PDCCH candidates for scheduling the slot 2 and the slot 5 have a same CCE index. In this case, the second node cannot determine a scheduled backhaul resource by using a CCE index of a PDCCH. Therefore, further confirmation needs to be performed by using a field in the DCI.

It should be understood that, in this embodiment of this application, the subset of the search space set includes CCE indexes of one or more PDCCH candidates of each scheduled dynamic backhaul resource.

In an embodiment, each piece of scheduling DCI may include one piece of indication information, indicating a total quantity of scheduled backhaul resources in the backhaul resource group. For example, in the foregoing example, when the slots 2 and 5 are scheduled, the indication information indicates that a quantity of scheduled backhaul resources is 2. In some cases, the foregoing indication information can be used to reduce a quantity of times of DCI blind detection, and can be used to ensure that an error does not occur in HARQ feedback.

In the foregoing embodiment, the scheduling DCI of the scheduled dynamic backhaul resource in the backhaul resource group is located in the fixed backhaul slot. Such a design is easy to implement, but the second node needs to perform a large quantity of times of DCI blind detection on the fixed backhaul resource. This may increase complexity of the second node, an excessively advanced scheduling parameter configuration may be not conductive to scheduling flexibility. The following provides an improved resource scheduling method 500.

Figure 9:
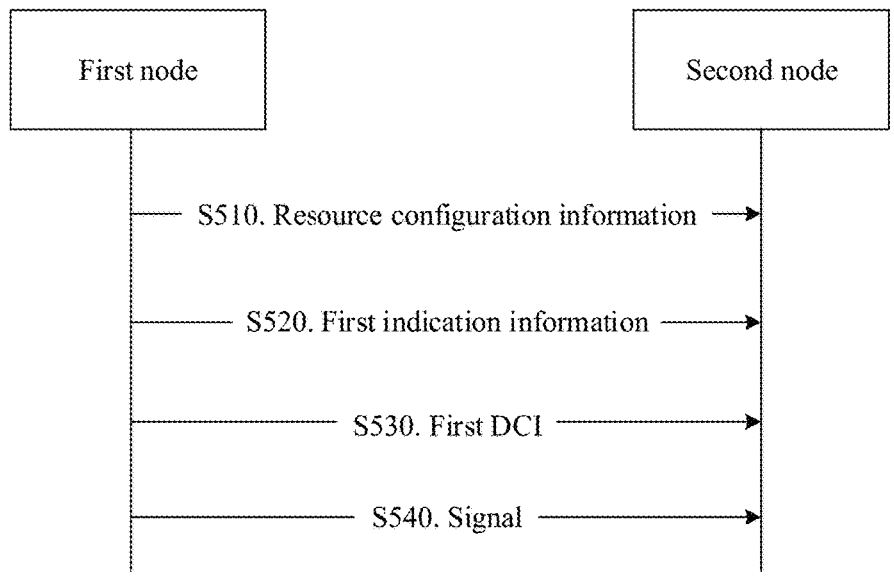
FIG. 9 is another schematic flowchart of a resource scheduling method according to an embodiment of this application.

FIG. 9 is a schematic flowchart of a resource scheduling method 500 according to an embodiment of this application. As shown in FIG. 9, the method 500 includes the following operations.

S510. A first node sends resource configuration information to a second node, and the second node receives the resource configuration information sent by the first node, where the resource configuration information is used to indicate a time domain position of a backhaul resource set, and the backhaul resource set includes a fixed backhaul resource and a plurality of dynamic backhaul resources.

S520. The first node sends first indication information to the second node on the fixed backhaul resource, and the second node receives the first indication information sent by the first node, where the first indication information is used to indicate scheduled dynamic backhaul resources in the plurality of dynamic backhaul resources.

S530. Receive, on a first scheduled dynamic backhaul resource, first downlink control information DCI sent by the first node, where the first DCI is used to indicate a downlink scheduling parameter of the first scheduled dynamic backhaul resource, and the scheduled dynamic backhaul resources include the first scheduled dynamic backhaul resource.

S540. The first node sends a signal to the second node on the first scheduled dynamic backhaul resource, and the second node receives, on the first scheduled dynamic backhaul resource, the signal sent by the first node.

In an embodiment, on the fixed backhaul resource, the first indication information received by the second node is only used to indicate whether the plurality of dynamic backhaul resources are actually scheduled, and actual PDSCH scheduling DCI is sent in a corresponding dynamic backhaul slot.

It should be understood that the first scheduled dynamic backhaul resource is a dynamic backhaul resource on which a PDCCH and a PDSCH are multiplexed in a same time unit, and the second node determines, based on the first indication information, whether to detect the PDCCH that is on the first scheduled dynamic backhaul resource.

Figure 10:
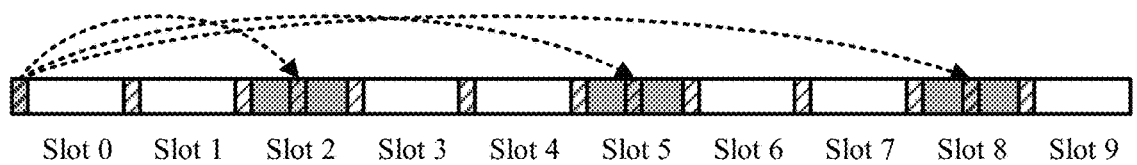
FIG. 10 is still another schematic diagram of in-advance scheduling of a backhaul resource.

For example, FIG. 10 is a schematic diagram of in-advance scheduling of a backhaul resource. The first node configures a fixed backhaul resource (a control area of a slot 0) and dynamic backhaul resources (data areas of slots 2, 5, and 8) for the second node. The second node receives the first indication information in the control area of the slot 0, where the first indication information indicates whether the data areas of the slots 2, 5, and 8 are actually to be scheduled. If the first indication information indicates that the data areas of the slots 2, 5, and 8 are all to-be-scheduled backhaul resources, the second node receives, in the control area of the slot 2, PDSCH scheduling DCI in the slot 2, receives, in the control area of the slot 5, PDSCH scheduling DCI in the slot 5, and receives, in the control area of the slot 8, PDSCH scheduling DCI in the slot 8.

In an embodiment, the first indication information may be used to indicate, by using a bitmap, whether a subsequent backhaul resource is to be scheduled. For example, when the slots 2, 5, and 8 are dynamic backhaul slots, three bits are used in the first indication information to indicate slots that are subsequently to be scheduled. For example, [1 0 0] indicates that only the slot 2 is to be scheduled, [1 1 0] indicates that the slots 2 and 5 are to be scheduled, and by analog.

In an embodiment, the method 500 further includes the following operations.

The first node sends, on the fixed backhaul resource, information about a receive beam for a third scheduled dynamic backhaul resource to the second node, where the scheduled dynamic backhaul resources include the third scheduled dynamic backhaul resource.

In an embodiment, if the scheduled dynamic backhaul resources do not include a dynamic backhaul resource, where the dynamic backhaul resource and the fixed backhaul resource are located in a same time unit or in adjacent time units, the first indication information further includes information used to indicate a receive beam for a third scheduled dynamic backhaul resource, and the third scheduled dynamic backhaul resource is at least a part of the scheduled dynamic backhaul resources.

For example, the first indication information may carry a TCI to indicate receive beams for at least some of the scheduled dynamic backhaul resources. If the first indication information indicates that the data areas in the slots 2, 5, and 8 are all to-be-scheduled backhaul resources, a 9-bit TCI field may be added to the first indication information to indicate information about receive beams for the slots 2, 5, and 8, or a 6-bit TCI field may be added to the first indication information to indicate information about receive beams for the slots 5 and 8.

In an embodiment, the first indication information may indicate the scheduled dynamic backhaul resources in the plurality of dynamic backhaul resources, and may further indicate information about the receive beams for the at least some of the scheduled dynamic backhaul resources.

In an embodiment, the first indication information further includes a downlink scheduling parameter of a second scheduled dynamic backhaul resource, and the scheduled dynamic backhaul resources include the second scheduled dynamic backhaul resource.

In an embodiment, the fixed backhaul resource and the second scheduled dynamic backhaul resource are located in a same time unit, or the fixed backhaul resource and the second scheduled dynamic backhaul resource are located in adjacent time units.

Specifically, to more efficiently use the fixed backhaul resource, the first indication information may further include PDSCH scheduling DCI of the second scheduled dynamic backhaul resource. Alternatively, it may also be expressed as that PDSCH scheduling DCI of a scheduled dynamic backhaul resource is sent in a control area of the fixed backhaul resource, and a field is added to the DCI (or an existing field is reused) to indicate whether other dynamic backhaul resources are scheduled. In this case, the DCI on the fixed backhaul resource and a resource occupied for scheduling a PDSCH are usually consecutive, or occupy a same time unit.

In an embodiment, a field may be further added to the DCI to indicate information about a receive beam for the third scheduled dynamic backhaul resource.

It should be understood that, if the scheduled dynamic backhaul resources include a second scheduled dynamic backhaul resource, where the second scheduled dynamic backhaul resource and the fixed backhaul resource are located in a same time unit or in adjacent time units, the first indication information further includes information used to indicate a receive beam for a third scheduled dynamic backhaul resource, and the third scheduled dynamic backhaul resource is at least a part, other than the second scheduled dynamic backhaul resource, of the scheduled dynamic backhaul resources.

The following uses an example in which the fixed backhaul resource and the second scheduled dynamic backhaul resource occupy a same time unit for description.

Figure 11:
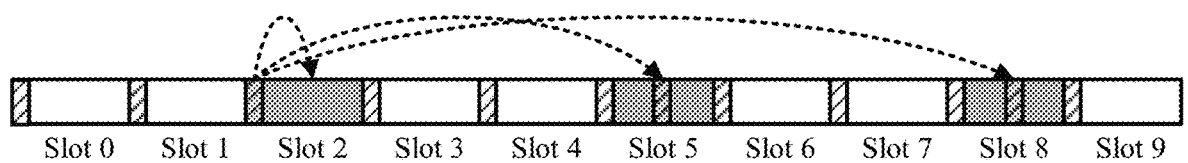
FIG. 11 is still another schematic diagram of in-advance scheduling of a backhaul resource.

FIG. 11 is still another schematic diagram of in-advance scheduling of a backhaul resource. As shown in FIG. 11, the first node configures a fixed backhaul resource (a control area of a slot 2) and a plurality of dynamic backhaul resources (data areas of slots 2, 5, and 8) for the second node. Scheduling DCI received by the second node in the control area of the slot 2 is used to schedule a PDSCH in the slot 2, and whether the dynamic backhaul resources 5 and 8 are scheduled is indicated, that is, whether a relay node needs to detect the scheduling DCI is indicated.

Further in an embodiment, the DCI on the fixed backhaul resource may further indicate information (or a spatial QCL relationship between) about receive beams for at least some of the scheduled dynamic backhaul resources.

It should be understood that the scheduling DCI received in the control area of the slot 2 may indicate information about receive beams in the slot 5 and the slot 8, and the receive beam in the slot 2 may be a default receive beam or a preconfigured receive beam.

To reduce complexity, PDCCHs and PDSCHs in dynamic backhaul slots (slots 5 and 8) shown in FIG. 11 may have a same QCL relationship, or the second node may receive PDCCHs and PDSCHs in a same scheduled dynamic backhaul slot by using a same receive beam.

The following describes in detail a process of in-advance scheduling of a backhaul resource in FIG. 11.

(1) Configuration of a backhaul resource set

Specifically, the configuration of the backhaul resource set is the same as that in the method 400. For brevity, details are not described herein again.

(2) The first node configures at least one CORESET for the second node, where the CORESET is used to transmit scheduling DCI of a fixed backhaul slot.

Specifically, to distinguish from a CORESET configured on a dynamic backhaul resource below, the CORESET configured on the fixed backhaul resource is denoted as a CORESET p1, and the CORESET p1 is consistent with a CORESET in an existing protocol.

(3) The first node configures a search space set for the second node.

In an embodiment, the CORESET associated with the search space set is the CORESET p1. In addition, a periodicity and an offset of the search space set are configured, so that the second node always monitors the DCI on the fixed backhaul resource. A simple method for configuring a search space set is to configure a search space set s1. A periodicity and an offset of the search space set s1 (at a slot level) is consistent with those of the fixed backhaul resource. A start symbol position of the search space set s1 may be located at a header of a slot, or may be located at another position. It should be understood that the first node may alternatively enable, by using a another manner of configuring a CORESET and a search space set, the second node to always receive a PDCCH or monitor DCI on the fixed backhaul resource.

The DCI is used to indicate the downlink scheduling parameter of the PDSCH of the second scheduled dynamic backhaul resource (for example, the data area of the slot 2 in FIG. 11), and carries a field to indicate whether a plurality of subsequent backhaul resources (for example, the slots 5 and 8 in FIG. 11) are to be scheduled. For example, considering a case shown in FIG. 11, the DCI in the slot 2 may indicate, by using two bits, whether the slot 5 and the slot 8 are to be scheduled. For example, [1 1] indicates that both of the two slots are to be scheduled, and [1 0] indicates that the slot 5 is to be scheduled, and the slot 8 is not to be scheduled.

The DCI may further carry a field to indicate a beam (or spatial QCL) relationship used for PDSCHs of at least some dynamic backhaul resources in a plurality of subsequent scheduled dynamic backhaul resources (for example, the slots 5 and 8 in FIG. 11). Generally, the spatial QCL relationship for the PDSCHs is indicated by using a TCI. In an existing protocol, the TCI includes three bits, that is, eight TCI statuses may be indicated, and each status is associated with at least one reference signal used to indicate a QCL relationship. More specifically, the TCI uses a reference signal configured with Type-D QCL to indicate a receive beam for a subsequent PDSCH. If beams for a plurality of subsequent backhaul slots need to be indicated by using the TCI, a TCI field with a corresponding quantity of bits are required. For example, when two scheduled dynamic backhaul slots need to be indicated, a 6-bit TCI field is required.

It should be understood that, if it is needed to indicate, by using the DCI, whether the N dynamic backhaul resources are to be scheduled, N bits are required. If TCI statuses of the N dynamic backhaul resources need to be indicated, 3N bits are required. A total of 4N bits are required. The two indications may be combined to reduce overheads. For example, a TCI status is used to indicate that a corresponding dynamic backhaul resource is not scheduled. For example, first seven TCI statuses are configured as common QCL indications, and the last status may be used to indicate that a corresponding dynamic backhaul resource is not scheduled. In this way, N-bit DCI overheads can be reduced. When a TCI of a PDSCH is not configured in the CORESET in which the DCI is located, or when the DCI does not include a TCI field, only N-bit DCI is used to indicate whether a dynamic backhaul slot exists.

In an embodiment, to avoid an excessively large DCI length, a maximum quantity of dynamic backhaul resources in a backhaul resource group is limited. For example, one group of backhaul resources may be defined to include a maximum of three dynamic backhaul resources. In this way, a quantity of added indication bits is limited. Alternatively, one group of backhaul resources include only one fixed dynamic backhaul resource and one dynamic backhaul slot. In this way, the first node may indicate the dynamic backhaul slot by using existing 3-bit TCI information, and no additional bit needs to be added.

(4) The first node configures a CORESET for the second node on a scheduled dynamic backhaul resource, where the CORESET is used to transmit scheduling DCI of the scheduled dynamic backhaul resource.

The DCI received on the fixed backhaul resource indicates whether a dynamic backhaul resource is to be scheduled (if the DCI indicates that the dynamic backhaul resource is to be scheduled, the DCI may further indicate a receive beam for the scheduled backhaul resource), and also indicates whether a PDCCH corresponding to a dynamic PDSCH exists, and a corresponding beam (TCI). A dedicated CORESET, denoted as a CORESET p2, may be configured for the scheduled dynamic backhaul slot. A difference between the CORESET p2 and a common CORESET is that a reference signal that has a QCL relationship with the common CORESET is configured by using RRC signaling, and a QCL reference signal for the CORESET p2 may be in a default state during RRC configuration, or may be modifiable. After the DCI received on the fixed backhaul resource indicates a TCI status of the corresponding PDSCH, the CORESET p2 uses the same TCI status. Alternatively, it is directly defined in the protocol that the foregoing TCI is a TCI shared by the CORESET p2 and the PDSCH. In the protocol, the CORESET p2 may be configured to different scheduled dynamic backhaul resources by configuring a search space set. However, if the dynamic backhaul resources are not indicated, the second node may ignore this time of detection. It should be understood that the first node may further enable, in another manner of configuring the CORESET and the search space set, the second node to receive a PDCCH or monitor a DCI on the scheduled dynamic backhaul resource based on the first indication information.

In an embodiment, the DCI received on the fixed backhaul resource indicates only whether the dynamic backhaul resource is scheduled, and does not include a TCI indication, or does not include a receive beam indication. In this case, a QCL relationship may be configured for the CORESET p2, and a corresponding dynamic backhaul resource may use a same QCL relationship, a same TCI status, or a same receive beam as the CORESET p2.

In an embodiment, if a same receive beam (or spatial QCL relationship) is indicated for a subsequent dynamic backhaul resource (for example, the slots 5 or 8 in FIG. 11) and the second dynamic backhaul resource (for example, the slot 2 in FIG. 11), scheduling DCI on the fixed backhaul resource may be repeatedly used. Specifically, DCI sent in a fixed backhaul slot may be used to schedule a plurality of dynamic backhaul slots, and a specific scheduled dynamic backhaul slot may be indicated by using a field in the DCI.

According to the resource scheduling method in this embodiment of this application, whether a dynamic backhaul resource is scheduled is indicated in advance, to avoid excessive switching overheads while ensuring system flexibility. In addition, scheduling information of each dynamic backhaul resource is sent on the dynamic backhaul resource. This helps reduce complexity of the second node and improve scheduling flexibility.

Figure 12:
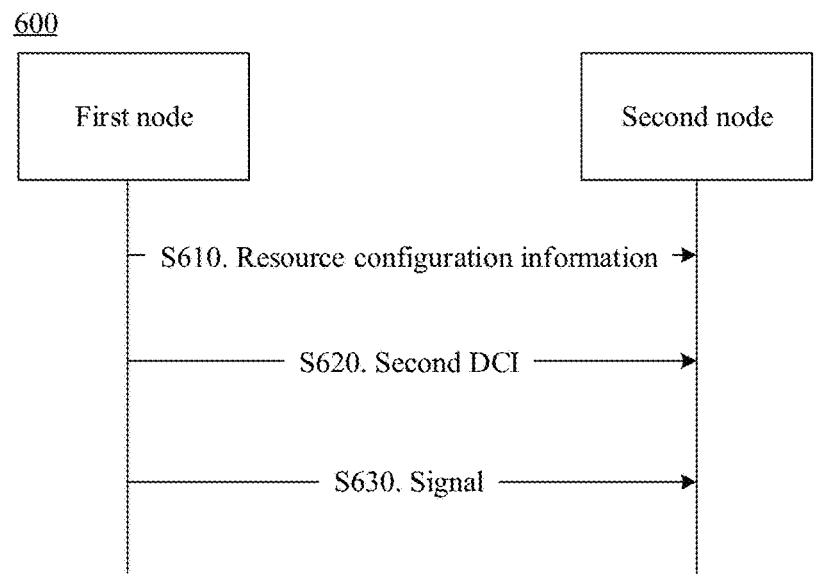
FIG. 12 is still another schematic flowchart of a resource scheduling method according to an embodiment of this application.

FIG. 12 is a schematic flowchart of a resource scheduling method 600 according to an embodiment of this application. As shown in FIG. 12, the method 600 includes the following operations.

S610. A first node sends resource configuration information to a second node, and the second node receives the resource configuration information sent by the first node, where the resource configuration information is used to indicate a time domain position of a backhaul resource set, and the backhaul resource set includes a fixed backhaul resource and a plurality of dynamic backhaul resources.

S620. The first node sends second DCI to the second node on the fixed backhaul resource, and the second node receives the second DCI sent by the first node, where the second DCI is used to indicate a downlink scheduling parameter of a fourth scheduled dynamic backhaul resource, the second DCI is used to indicate that a fifth scheduled dynamic backhaul resource is scheduled, and the plurality of dynamic backhaul resources include the fourth scheduled dynamic backhaul resource and the fifth scheduled dynamic backhaul resource.

S630. The first node sends a signal to the second node on the fourth scheduled dynamic backhaul resource and the fifth scheduled dynamic backhaul resource, and the second node receives, on the fourth scheduled dynamic backhaul resource and the fifth scheduled dynamic backhaul resource based on the first DCI, the signal sent by the first node.

In an embodiment, the method 600 provides a level-by-level dynamic backhaul resource indication, and an advantage brought by the level-by-level dynamic backhaul resource indication is that DCI indication overheads are further reduced. In this way, for each piece of DCI, only a 3-bit TCI (or a 1-bit dynamic backhaul resource indication, or a 1-bit dynamic resource indication and a 3-bit TCI) needs to be used to indicate a next dynamic backhaul resource. This is consistent with TCI overheads of common DCI.

In an embodiment, the fixed backhaul resource and the fourth scheduled dynamic backhaul resource are located in a same time unit, or the fixed backhaul resource and the fourth scheduled dynamic backhaul resource are located in adjacent time units.

In an embodiment, the method 600 further includes:
receiving, on the fixed backhaul resource, information that is about a receive beam for the fifth scheduled dynamic backhaul resource and that is sent by the first node.

The following uses an example in which the fixed backhaul resource and the fourth scheduled dynamic backhaul resource are located in a same time unit for description.

Figure 13:
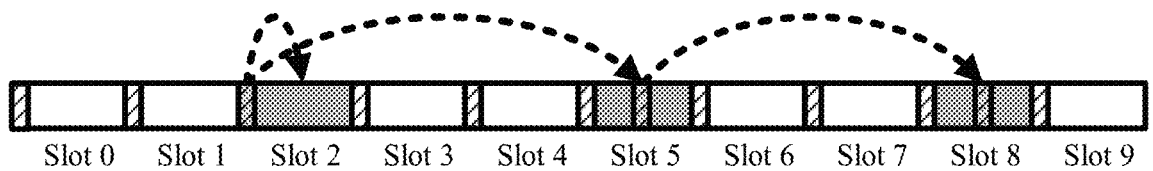
FIG. 13 is still another schematic diagram of in-advance scheduling of a backhaul resource.

FIG. 13 is still another schematic diagram of in-advance scheduling of a backhaul resource. As shown in FIG. 13, the first node configures a fixed backhaul resource (a control area of a slot 2) and a plurality of dynamic backhaul resources (data areas of slots 2, 5, and 8) for the second node. The first DCI received by the second node in the control area of the slot 2 is used to schedule a PDSCH in the slot 2, in other words, the first DCI indicates a downlink scheduling parameter in the slot 2.

In an embodiment, the first DCI further carries one bit to indicate that the slot 5 is scheduled.

Further, in an embodiment, the first DCI further carries three bits to indicate information about a receive beam in the slot 5.

In an embodiment, the method 600 further includes:
receiving, on the fifth scheduled dynamic backhaul resource, third DCI sent by the first node, where the third DCI is used to indicate a downlink scheduling parameter of the fifth scheduled dynamic backhaul resource, and the third DCI is used to indicate that a sixth scheduled dynamic backhaul resource is scheduled. The plurality of dynamic backhaul resources include the sixth scheduled dynamic backhaul resource.

In an embodiment, the method 600 further includes:
receiving, on the fifth scheduled dynamic backhaul resource, information that is about a receive beam for the sixth scheduled dynamic backhaul resource and that is sent by the first node.

As shown in FIG. 13, if the first DCI indicates that the slot 5 is scheduled, the second node receives, in the slot 5, the second DCI sent by the first node, where the second DCI indicates a downlink scheduling parameter of the slot 5.

In an embodiment, the second DCI may further carry a field to indicate that the slot 8 is scheduled.

Further, in an embodiment, the second DCI further carries a field to indicate a receive beam in the slot 8.

According to the resource scheduling method in this embodiment of this application, a backhaul resource is scheduled in advance through level-by-level indication. This helps avoid excessive switching overheads while ensuring system flexibility, and can reduce DCI indication overheads.

The foregoing describes in detail configuration and indication of a downlink backhaul resource with reference to the method 400 to the method 600, and the methods may be further applicable to an uplink backhaul resource in the embodiments of this application. Same as the downlink backhaul resource, the first node cannot dynamically schedule an uplink backhaul resource at random, to avoid a conflict with an access link. Therefore, the first node still needs to configure several optional uplink backhaul resources for a relay node.

Figure 14:
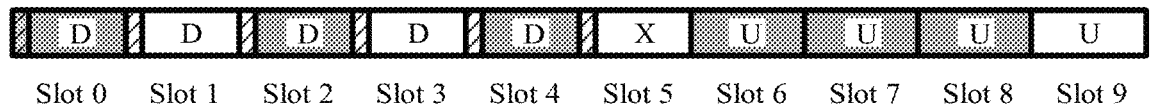
FIG. 14 is a schematic diagram of in-advance scheduling of an uplink backhaul resource and a downlink backhaul resource.

FIG. 14 is a schematic diagram of in-advance scheduling of an uplink backhaul resource and a downlink backhaul resource. As shown in FIG. 14, the first node configures one fixed backhaul resource (a control area of a slot 0) and a plurality of dynamic downlink backhaul resources (data areas of slots 0, 2, and 4) for the second node, and configures a plurality of optional uplink backhaul resources (slots 6, 7, and 8). With reference to the foregoing embodiments, the control area of the slot 0 is a fixed downlink backhaul resource, the data areas of the slots 0, 2, and 4 are dynamic downlink backhaul resources, and the slots 6, 7, and 8 are optional uplink backhaul slots.

In the foregoing embodiments, only configuration of a downlink backhaul resource is considered. However, in practice, the first node further needs to configure an uplink backhaul resource of the second node. The uplink backhaul resource can be configured independently or together with the downlink backhaul resource.

An uplink backhaul resource may be configured by using the following options:

(1) All optional uplink backhaul resources are configured as dynamic backhaul resources, and are scheduled by using DCI. As shown in FIG. 14, the slots 6, 7, and 8 are scheduled by using the foregoing downlink backhaul resources, and HARQ feedback information of the downlink backhaul resources is configured to any one of the slots by using the downlink DCI. In this example, the uplink backhaul resources are independently configured.

(2) At least one fixed uplink backhaul resource is bound to a fixed downlink backhaul resource. The second node detects DCI of the fixed uplink backhaul resource on the fixed downlink backhaul resource, and HARQ feedback corresponding to at least some dynamic downlink backhaul resources is located on the fixed uplink backhaul resource. For example, in FIG. 14, the slot 6 is set as a fixed uplink backhaul slot, scheduling information of the slot 6 is usually located in the slot 0, and HARQ feedback information of a PDSCH in the slot 0 is located in the slot 6. In addition, another periodic or semi-persistent signal, such as a periodic or semi-persistent SRS, or a PUCCH or PUSCH used for periodic or semi-persistent CSI reporting, sent by the second node may also be located in this fixed uplink backhaul slot.

In an embodiment, HARQ feedback corresponding to another dynamic backhaul resource is also located in this fixed uplink backhaul slot. For example, in FIG. 14, HARQ feedback information of the slots 0, 2, and 4 is located in the slot 6. If the first node configures a plurality of groups of downlink backhaul resources for the second node, a fixed downlink backhaul resource in each group of downlink backhaul resources may be bound to one fixed uplink backhaul resource.

The fixed uplink backhaul resource may be directly configured, or may be indirectly obtained based on a configuration position of a periodic signal (for example, a PUCCH or an SRS). The fixed uplink backhaul resource may not be used for uplink backhaul link sending when no data is transmitted on the downlink backhaul resource (or the second dynamic backhaul resource), for example, when a PUCCH of the fixed uplink backhaul resource is used only to feed back HARQ-ACK information of a PDSCH transmitted on the downlink backhaul resource (or the second dynamic backhaul resource), and the second node does not detect scheduling DCI corresponding to a PUSCH of the fixed uplink backhaul resource.

(3) Based on (2), other uplink backhaul resources may be configured as dynamic backhaul resources.

In an embodiment, each dynamic uplink backhaul resource is also bound to one dynamic downlink backhaul resource. The dynamic uplink backhaul slot is scheduled on the bound dynamic downlink backhaul resource, and may be used to transmit HARQ information corresponding to the dynamic downlink backhaul slot.

In (2) and (3), the uplink backhaul resource and the downlink backhaul resource are jointly configured, and a binding or association relationship between the uplink backhaul resource and the downlink backhaul resource needs to be configured.

For example, in FIG. 14, a fixed uplink backhaul slot 6 is corresponding to a fixed downlink backhaul slot 0, a dynamic downlink backhaul slot 2 and a dynamic downlink backhaul slot 4 are respectively corresponding to dynamic uplink backhaul slots 7 and 8, and scheduling DCI of the slot 7 is in the slot 2, and scheduling information of the slot 8 is in the slot 4. Therefore, if the slot 2 is not scheduled, the slot 7 is not scheduled, either, and the slot 8 is scheduled in the same way. In this case, HARQ information in the slot 2 may be fed back in the slot 7, or may be still fed back in the slot 6.

In another embodiment, the first node configures a dynamic flexible slot (that is, neither an uplink slot nor a downlink slot is specified) for the second node, and binds the flexible slot to a downlink backhaul slot. The second node determines, by detecting DCI of the downlink slot, whether the dynamic flexible slot is scheduled, a transmission direction (uplink or downlink), and a transmission parameter.

In the foregoing embodiment shown in FIG. 6, FIG. 9, or FIG. 12, in operations S410, S510, and S610, the first node sends the resource configuration information to the second node, where the resource configuration information may be used to configure an access link resource or a backhaul link resource.

If the access resource is configured, the access resource may further include an unavailable resource. That is, the access link resource includes a fixed access resource, a dynamic access resource, and an unavailable access resource (not available access resource).

If the backhaul link resource is configured, as described above, the resource configuration information includes a fixed backhaul resource and a dynamic backhaul resource. Access link transmission is not performed on the unavailable access resource. It should be understood that the dynamic access resource may be configured for uplink transmission or downlink transmission on an access link. Similarly, the dynamic backhaul resource may also be configured for uplink transmission or downlink transmission on a backhaul link.

If the access resource is configured, the second node receives the resource configuration information sent by the first node, where the resource configuration information is used to indicate a time domain position of an access resource set, and the access resource set includes at least one fixed access resource and/or a plurality of dynamic access resources; and the second node receives first indication information sent by the first node, where the first indication information is used to indicate information about a scheduled dynamic access resource that is used for a backhaul link and that is in the plurality of dynamic access resources. Further, the second node receives, on the scheduled dynamic access resource used for the backhaul link, the signal sent by the first node. The second node determines, based on the information about the scheduled dynamic access resource used for the backhaul link, a dynamic access resource used for an access link.

A meaning of the information about the scheduled dynamic access resource used for the backhaul link includes that some or all of the dynamic access resources are assigned, in the first indication information, for backhaul link transmission.

An unavailable access resource in the access resource set may be used as a fixed backhaul resource. To be specific, when the resource configuration information is used to configure the access resource set, the unavailable access resource in the resource configuration information is used as the fixed backhaul resource of the backhaul link. It should be understood that an unavailable access resource configured in the access resource set is not necessarily used as the fixed backhaul resource herein. On the contrary, the fixed backhaul resource is an unavailable access resource on the access link.

It should be understood that a configuration granularity of the access resource may be one slot, a plurality of slots, a plurality of symbols, or the like. In this application, that the configuration granularity is a slot is mainly used for description, but other configuration granularities are not excluded.

The resource configuration information may be configured by an upper-level node by using higher layer signaling. The upper-level node includes a control node. Generally, the control node is a donor base station, and may be a control unit (CU) of the donor base station. The higher layer signaling includes RRC signaling or F1AP (F1 application) signaling. The F1AP may also be an enhanced or a modified version of the F1AP. Specifically, if the backhaul link resource is configured, the backhaul link resource may be configured by using RRC signaling. If the access link resource is configured, the access link resource is configured by using F1AP.

It should be understood that the first node may be an upper-level node of the second node, or may be a donor base station. The resource configuration information received by the second node may be from one first node, and the first indication information received by the second node may be from another first node. In other words, the resource configuration information and the first indication information that are received by the second node are from different first nodes. In this application, the first node is used as a name only for ease of description. It should be understood that the first node may forward the resource configuration information that is from the donor base station to the second node.

Therefore, that the first node sends resource configuration information to the second node includes: The first node generates the resource configuration information and sends the resource configuration information to the second node, or the first node forwards the resource configuration information from the donor base station. The following is the same, and details are not described.

Further, when the second node receives the resource configuration information sent by the first node, the second node may receive the resource configuration information that is of the access link and that is sent by the first node, and may further receive the resource configuration information that is of the backhaul link and that is sent by the first node. The resource configuration information is used to indicate a time domain position of the backhaul resource set, and the backhaul resource set includes at least one fixed backhaul resource and/or a plurality of dynamic backhaul resources.

The resource configuration information used to indicate the access resource set and the resource configuration information used to indicate the backhaul resource set are transmitted through different signaling or interfaces. For example, the resource configuration information used to indicate the access resource set is transmitted by using F1AP signaling or an interface, and the resource configuration information used to indicate the backhaul resource set is transmitted by using RRC signaling.

Specifically, the backhaul link resource or the access link resource may be configured by using a method that is based on a bitmap or a character string. The bitmap includes a bit of an unavailable-access-resource indication and a bit of a fixed/dynamic-access-resource indication, and a priority of the unavailable-access-resource indication is higher than that of the fixed/dynamic-access-resource indication.

Specific manners are as follows:

Manner 1: Configuration Based on Two Levels of Bitmaps

When two levels of bitmaps are used to configure an access link resource, a first-level bitmap is used to indicate an unavailable access resource, a second-level bitmap is used to indicate a fixed/dynamic access resource, and a priority of an unavailable-access-resource indication is higher than that of a fixed/dynamic-access-resource indication. To be specific, when an access resource is indicated to be unavailable, regardless of an indication of a fixed/dynamic resource, the access resource is an unavailable access resource.

It should be understood that an unavailable access resource of the access link may be directly configured as an available resource of the access link, and a resource that is not configured cannot be used for access link transmission. In this application, an unavailable access resource is used as an example, but an available resource configured for an access link is not excluded. Details are not described below.

An access link resource is configured as follows:

```
Access resource configuration:
{
access resource number;
access resource periodicity;
unavailable-access-resource indication;
fixed/dynamic-access-resource indication;
}
```

In addition, because the relay node may have a plurality of cells/sectors/antenna panels, different types of access resources may be configured for different cells/sectors/antenna panels. Therefore, a plurality of access resource configurations may coexist, and may be associated with the cells/sectors/antenna panels by using access resource numbers.

In the foregoing access resource configuration, the unavailable-access-resource indication and the fixed/dynamic-access-resource indication may be indicated by using a bitmap.

FIG. 19 is an example of an access link resource allocation represented by using a bitmap according to this embodiment. In FIG. 19, a length of an indicated resource is 10 slots. In an unavailable-backhaul-resource indication, a bit 1 represents an unavailable resource. It should be understood that only 10 slots are used as an example in FIG. 19. In an actual system, there may be 20 slots or any other quantity of slots. This is not limited in this application.

Similarly, in a fixed/dynamic-backhaul-resource indication, a bit 1 represents a fixed access resource, and a bit 0 represents a dynamic access resource.

In this example, bits 1, 2, and 3 in a bitmap of the unavailable-access-resource indication are 1, indicating that slots 1, 2, and 3 are unavailable access slots. Bits 0, 4, and 5 in a bitmap of the fixed/dynamic-access-resource indication are 1, indicating that slots 0, 4, and 5 are fixed access slots. In remaining slots, because the slots 1, 2, and 3 are unavailable access slots, slots 0, 6, 7, 8, and 9 are dynamic access slots, as shown by access resource types in FIG. 19.

It should be understood that neither 0 nor 1 in the bitmap is forcibly associated with a type in this application. To be specific, in the unavailable-access-resource indication, 0 may be used to indicate an unavailable resource, or 1 may be used to indicate an unavailable resource. In the fixed/dynamic-access-resource indication, 0 may be used to indicate a fixed access resource, 1 may be used to indicate a dynamic access resource, and vice versa.

Manner 2: Configuration Based on a Character String

In another embodiment of the bitmap, an access resource type may be directly indicated by using a character string, and a specific configuration may be as follows:

```
Access resource configuration:
{
access resource number;
access resource periodicity;
access resource type character string;
}
```

FIG. 20 shows an example in which a length of an indicated resource is 10 slots. A type of each slot resource is indicated by using different characters. It should be understood that the length of the indicated resource is not limited in this application. The 10 slots are merely an example, and 20 slots or any other quantity of slots may be used. Table 1 shows a correspondence between characters and access resource types.

TABLE 1

Correspondence between characters and access resource types

| | |
|---|---|
| U | Unavailable access resource |
| H | Fixed access resource |
| S | Dynamic access resource |

It should be understood that Table 1 is merely an example, and a specific character is not limited in this application. For example, the unavailable access resource U may also be represented by N. In a possible implementation, the configuration based on the two levels of bitmaps in the manner 1 may also be represented by using one bitmap, as shown in FIG. 21. In an embodiment, one bitmap may be divided into groups corresponding to all slots, where each group includes two bits. The first bit represents an available or unavailable access resource, and the second bit represents a fixed/dynamic access resource. 0 may be used to indicate the fixed access resource, 1 may be used to indicate the dynamic access resource, and vice versa. In FIG. 21, 10 slots are still used as an example. In practice, a quantity of slots is not limited. The first bit in each bit group is 0, indicating that the resource can be used for the access link, and the first bit in each bit group is 1, indicating an unavailable resource; and vice versa. The second bit in each bit group is 0, indicating a dynamic access resource, and the second bit in each bit group is 1, indicating a fixed resource; and vice versa.

As described above, the first node configures the access resource set for the second node, and the second node deduces the backhaul resource set based on the access resource set. Specifically, a backhaul link resource configuration may be obtained based on a correspondence between access resource types and backhaul resource types. The correspondence between access resource types and backhaul resource types may be shown in the following Table 2.

TABLE 2

Correspondence between access resource types and backhaul resource types

| | |
|---|---|
| Unavailable access resource | Fixed backhaul resource |
| Fixed access resource | Unavailable backhaul resource |
| Dynamic access resource | Dynamic backhaul resource |

Under the foregoing correspondence rule, after obtaining the access link resource configuration, the first node may obtain the corresponding backhaul link resource configuration.

It should be understood that the foregoing is merely an example. In a possible embodiment, the resource configuration information may further include an unavailable-resource configuration and/or a fixed-backhaul-resource configuration of the backhaul link, and the correspondence in Table 2 is not used. The fixed backhaul resource of the backhaul link is an unavailable access resource on the access link. Correspondingly, the fixed access resource of the access link is an unavailable backhaul resource on the backhaul link. It should be understood that not all unavailable access resources of the access link may be fixed backhaul resources of the backhaul link. This depends on a definition in a protocol, and is not limited in this application. Correspondingly, not all unavailable resources of the backhaul link may be fixed access resources of the access link.

In another possible embodiment, the control node, for example, a donor base station, configures the access link resource by using the F1AP, where the access link resource includes an unavailable access resource, a fixed access resource, and a dynamic access resource; and configures the backhaul link resource by using RRC signaling, where the backhaul link resource includes an unavailable backhaul resource, a fixed backhaul resource, and a dynamic backhaul resource. It should be understood that the F1AP may also be an enhanced or a modified version of the F1AP. This is not limited in this application.

It should be understood that the unavailable backhaul resource of the backhaul link may not exist. In other words, the backhaul link resource configuration includes only the fixed backhaul resource and the dynamic backhaul resource. Whether the dynamic backhaul resource is used for uplink transmission or downlink transmission on the backhaul link may be implemented by using the foregoing scheduling method, and details are not described again.

In the foregoing embodiments, allocation of a dynamic backhaul resource is implemented through in-advance scheduling. The in-advance scheduling may be scheduling of a plurality of dynamic backhaul resources in a fixed transmission slot or subframe, such as the embodiment shown in FIG. 7, FIG. 8, FIG. 10, or FIG. 11, while in the embodiment shown in FIG. 13 or FIG. 14, the in-advance scheduling is not limited to the fixed slot.

Therefore, the scheduling method in the foregoing embodiment includes: The second node receives the resource configuration information sent by the first node, where the resource configuration information is used to indicate the time domain position of the backhaul resource set, and the backhaul resource set includes at least one fixed backhaul resource and/or a plurality of dynamic backhaul resources. The second node receives the first indication information sent by the first node, where the first indication information is used to indicate information about a scheduled dynamic backhaul resource in the plurality of dynamic backhaul resources. Further, the second node receives, on the scheduled dynamic backhaul resources, a signal sent by the first node.

That the second node receives, on but not limited to a fixed backhaul slot, the first indication information sent by the first node.

Similarly, because the resource configuration information configured by the first node for the second node may also be an access resource set, the foregoing method also includes: The second node receives the resource configuration information sent by the first node, where the resource configuration information is used to indicate the time domain position of the access resource set, and the access resource set includes at least one fixed access resource and/or a plurality of dynamic access resources. The second node receives the first indication information sent by the first node, where the first indication information is used to indicate information about a scheduled dynamic access resource in the plurality of dynamic access resources. Further, the second node receives, on the scheduled dynamic access resource used for the backhaul link, the signal sent by the first node.

the second node receives the first indication information in a downlink transmission slot or subframe of the backhaul link, where the downlink transmission slot or subframe includes a slot or subframe in which the fixed backhaul resource and the scheduled dynamic access resource that is used for the backhaul link are configured for downlink transmission. In other words, the first indication information may be transmitted in any downlink slot or subframe that has been configured as a resource of a backhaul link, where the downlink transmission slot or subframe may not be limited to a fixed backhaul slot, or may be transmitted on a dynamic backhaul resource that is configured for downlink transmission.

It should be understood that the first node may configure the access resource set for the second node, may configure the backhaul resource set for the second node, or may configure both the access resource set and the backhaul resource set for the second node. If the first node configures the access resource set for the second node, the dynamic access resource in the access resource set may be dynamically configured between the access link and the backhaul link. The dynamic resource of the backhaul link is configured by using the first indication information. Therefore, the dynamic resource that can be used for the access link may be determined based on the dynamic access resource in the access resource set.

Correspondingly, if the first node configures the backhaul resource set for the second node, the dynamic backhaul resource in the backhaul resource set may be dynamically configured between the access link and the backhaul link. The dynamic resource of the backhaul link is still configured by using the first indication information. Therefore, the dynamic resource that can be used for the access link may be determined based on the dynamic backhaul resource in the backhaul resource set.

If the first node separately configures the access resource set and the backhaul resource set for the second node, the dynamic resource may be configured only in the access resource set or the backhaul resource set. Alternatively, the dynamic resource may be configured in both the access resource set and the backhaul resource set. This is not limited in this application.

In an embodiment, based on the embodiment described in FIG. 6, FIG. 9, or FIG. 12, after the resource configuration information is completed in operations S410, S510, and S610, the first node may also activate, add, remove, replace, or deactivate the dynamic backhaul resource by using the first indication information.

Figure 22:
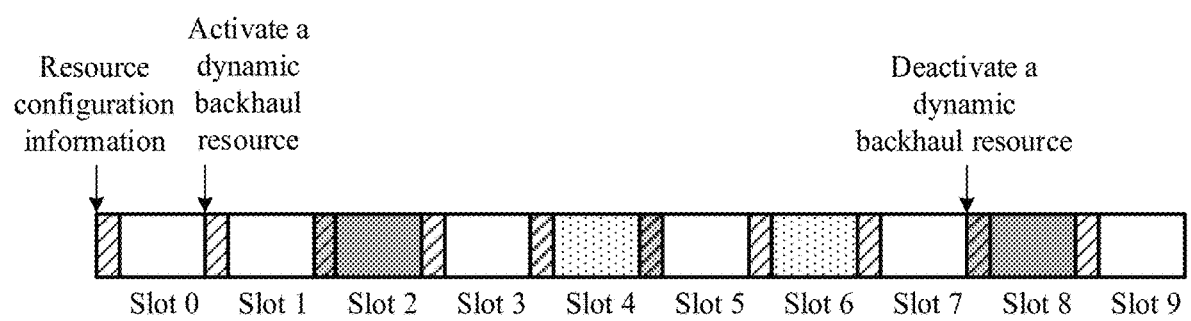
FIG. 22 is a schematic diagram of activating or deactivating a dynamic resource on a backhaul link according to an embodiment of this application.

FIG. 22 is a schematic diagram of activating or deactivating a dynamic resource of a backhaul link. It is assumed that in a slot 0, the first node sends resource configuration information to the second node, and the second node receives the resource configuration information sent by the first node, where the resource configuration information is used to indicate a time domain position of a backhaul resource set, and the backhaul resource set includes at least one fixed backhaul resource and/or a plurality of dynamic backhaul resources. As described above, the resource configuration information may be configured by using a bitmap. A resource of an access link or a resource of a backhaul link may be configured. This is not limited in this application.

It is assumed that in FIG. 22, slots 0 and 1 are fixed backhaul resources of a backhaul link. Slots 2, 5, 6, and 8 are dynamic backhaul resources, and are indicated by using filling parts in the figure. In other words, the dynamic backhaul resources may be used for an access link, or may be used for a backhaul link. In the slot 1, the first node sends, to the second node, an indication for activating a dynamic backhaul resource. The dynamic backhaul resource may be activated through PDCCH scheduling, or may be activated by using a MAC CE at a MAC layer. Specific signaling to be used is not limited in this application.

If a PDCCH is used for implementation, specifically, the dynamic backhaul resource of the backhaul link may be activated by using a specific scrambling code. For example, a flexible scheduling radio network temporary identity (FS-RNTI) may be defined. It should be understood that the FS-RNTI herein may have another name. This is not limited in this application. For example, the FS-RNTI may be a 16-bit identifier, and is used to scramble a cyclic redundancy check (CRC) of the PDCCH. The FS-RNTI can be used to identify whether the PDCCH is used to activate, add, remove, replace, or deactivate a dynamic backhaul resource of the backhaul link.

Dynamic backhaul resources that are to be actually used for backhaul link transmission are indicated through scrambling by using the FS-RNTI or indicated by using the MAC CE, and a dynamic backhaul resource that is not indicated or configured may be used for access link transmission. For example, in FIG. 22, it is indicated that the slots 2 and 8 are used for backhaul link transmission, and the slots 4 and 6 are not configured for backhaul link transmission. Therefore, the slots 4 and 6 may be used for access link transmission.

Similar to the foregoing configuration method by using the bitmap, in an indication for activating the dynamic backhaul resource, a backhaul link resource may be indicated by using a bitmap. When the PDCCH is used for activation, because a specific scrambling code is used, content of the PDCCH may be redefined. For example, one bit may be used to indicate whether to activate or deactivate a dynamic backhaul resource. Certainly, alternatively, two bits may be used to indicate activating, adding, removing, or deactivating a dynamic backhaul resource of a backhaul link. Other bits may be used in the bitmap to indicate a backhaul link resource. For example, if the slot 2 and the slot 8 are configured as backhaul link resources, a value of the bitmap may be "0010000010". It should be understood that the bitmap herein is only used to indicate a dynamic backhaul resource, and only 10 slots are used as an example. Alternatively, the bitmap may include another quantity of slots. This is not limited in this application.

In an embodiment, to compress a length of the bitmap of the PDCCH, only a dynamic backhaul resource slot may be indicated. Because the resource configuration information exists before, for example, the slots 2, 4, 6, and 8 are configured as dynamic access resources or dynamic backhaul resources in the resource configuration information, four bits may be used in sequence to indicate the configuration of the dynamic backhaul resources. For example, if the slot 2 and the slot 8 are configured for backhaul link transmission, four bits "1001" are used to represent a configuration of four dynamic backhaul resources.

Further, whether a dynamic backhaul resource used for a backhaul link is used for downlink transmission or uplink transmission may be configured. Therefore, another bitmap needs to be further configured to indicate whether the configured dynamic backhaul resource used for the backhaul link used for is uplink transmission or downlink transmission. For example, assuming that the slot 2 is used for uplink and the slot 8 is used for downlink, a corresponding bitmap may be "0000000010", where bit 2 being 0 indicates uplink, bit 8 being 1 indicates downlink, and vice versa. Further, two bits, for example, "01", may be further used for representation, because only two dynamic backhaul resources are configured for backhaul link transmission.

The bitmap-based configuration manner is applicable to a method for activating a dynamic backhaul resource based on a PDCCH or a MAC CE. The foregoing uses only a slot as an example. However, this is not limited in this application, and configuration may alternatively be performed by using a subframe, a symbol, or a frame as a granularity.

Once the dynamic backhaul resource of the backhaul link is activated, there is no difference between a downlink slot of the activated dynamic backhaul resource used for the backhaul link and a normal slot. Therefore, normal scheduling and operations can be performed. Thus, further reconfiguration of a backhaul link resource may be performed in each activated dynamic backhaul resource slot and/or fixed backhaul resource slot.

The reconfiguration includes adding a dynamic backhaul resource of the backhaul link, removing a dynamic backhaul resource of the backhaul link, or replacing a dynamic backhaul resource of the backhaul link. The replacing the dynamic backhaul resource of the backhaul link includes replacing a part of configured dynamic backhaul resources used for the backhaul link with another part of dynamic backhaul resources. A specific method is similar to the foregoing activation method, and a bitmap-based method is used. Details are not described again. A dynamic backhaul resource of the backhaul link may be replaced by using two bitmaps. One bitmap is used to indicate dynamic backhaul resources that are to be replaced, and the other bitmap is used to indicate a new dynamic backhaul resource used for the backhaul link.

It should be understood that the signaling for activating, reconfiguring, or deactivating the dynamic backhaul resource of the backhaul link includes an operation indication field used to indicate that the signaling is used for an activation, an addition, a removing, a replacement, or a deactivation operation. Specifically, for example, three bits may be used for representation. Different values indicate different operations. A specific value is not limited in this application.

The deactivation operation may be identified by using the operation indication field in the foregoing signaling, and may not include another field, or may include a cause field that is used to indicate a deactivation cause. After the deactivation operation is performed, all dynamic backhaul resources on the backhaul link are released.

It should be understood that the signaling for activating, reconfiguring, or deactivating the dynamic backhaul resource of the backhaul link may be transmitted on all downlink resources, that is, may be transmitted on a fixed backhaul resource or a dynamic backhaul resource.

It should be understood that the resource configuration information in this application may further include an identifier (ID) of a physical node. Alternatively, signaling or a message including the resource configuration information may be associated with an ID of a physical node, for example, an ID of the second node. The second node determines, based on the identifier, whether to receive the resource configuration information. If the ID of the physical node included in or associated with the resource configuration information is different from an ID of a receiving node, the message or signaling that includes the resource configuration information may be forwarded. If the ID of the physical node included in or associated with the resource configuration information is the same as the ID of the receiving node, the resource configuration information is received and processed. Details are not described below.

In an embodiment, the access resource set may further include configuration information of an access link of another node. For example, the donor base station notifies the first node of a backhaul and/or access resource configuration of another node, the another node includes a lower-level node or a potential lower-level node of the first node, and the potential lower-level node is an IAB node that may become a lower-level node of the first node. Therefore, the first node can better control scheduling. The following is the same, and details are not described.

According to the foregoing method, a dynamic resource on a backhaul link can be more flexibly activated, added, removed, replaced, or deactivated, control is faster, and overheads in a control area are reduced. When the foregoing operations are implemented by using the PDCCH, whether the PDCCH is used for dynamic backhaul link resource adjustment can be distinguished through only blind detection. If the MAC CE is used, the implementation is also very fast, and implementation complexity is reduced.

In an embodiment, in the foregoing method for dynamically allocating a backhaul link resource by using a PDCCH or a MAC CE, acknowledgment may be performed through feedback, to ensure that a resource conflict does not occur between the first node and the second node. Therefore, it is a feasible method for the second node to make a response after receiving allocation of the dynamic backhaul resource of the first node.

In an embodiment, after the second node receives the PDCCH sent by the first node for scheduling or allocating the dynamic backhaul resource of the backhaul link, the second node sends a response message to the first node. The response message includes a positive response and a negative response. For example, the response message may be an ACK or a NACK. After receiving the response message sent by the second node, the first node starts transmission on the scheduled resource.

If the MAC CE is used to schedule or allocate the dynamic backhaul resource of the backhaul link, the MAC layer also sends an acknowledgment message. A method is similar, and details are not described again.

It should be understood that in the foregoing embodiments, the access resource set or the backhaul resource set is mainly used as an example to describe specific implementations. In an embodiment in which the access resource set is used as an example, a method for the backhaul resource set is similar, and the corresponding method for the backhaul resource set may be obtained through simple replacement. In an embodiment in which the backhaul resource set is used as an example, a method for the access resource set is also the same. It is only for the sake of space and will not be described again.

In an embodiment, the first node may include at least one fixed backhaul resource and at least one dynamic resource in the resource configuration information. The at least one dynamic resource is dynamically allocated for an access link and a backhaul link of the second node. Whether some or all dynamic resources are used for the access link or the backhaul link is implemented through scheduling by the second node.

The first node sends the resource configuration information to the second node, where the resource configuration information is used to indicate at least one fixed backhaul resource and at least one dynamic resource. The first node sends the first indication information to the second node, where the first indication information is used to indicate information about a scheduled dynamic resource that is used for the backhaul link and that is in the at least one dynamic resource.

In an embodiment, the first node sends second indication information to the second node, where the second indication information is used to re-assign a dynamic resource that is used for the backhaul link and that is in the at least one dynamic resource.

The second indication information is used to reallocate the dynamic resource. It should be understood that the foregoing assignment of the dynamic access resource or the dynamic backhaul resource through scheduling may be semi-static. That is, after each time of scheduling, the assigned resource used for the backhaul link is considered as a resource used for the backhaul link, until a next time of scheduling.

The dynamic resource may be re-assigned by using the second indication information. It should be understood that the second indication information is also applicable to the dynamic access resource and/or the dynamic backhaul resource in the foregoing embodiments. Details are not described again.

In an embodiment, the first node sends the second indication information to the second node in a downlink transmission slot or subframe of the backhaul link, where the downlink transmission slot or subframe includes a slot or subframe in which the fixed backhaul resource and the scheduled dynamic resource that is used for the backhaul link are configured for downlink transmission.

The second indication information is transmitted on, but not limited to, a fixed backhaul resource, and the second indication information may also be transmitted on the scheduled dynamic resource used for the backhaul link. It should be understood that herein, the fixed backhaul resource used to transmit the second indication information or the scheduled dynamic resource used for the backhaul link should be configured as a downlink transmission resource on the backhaul link. It should be understood that the resource in this application includes a time domain resource, a frequency domain resource, a time-frequency resource, and a code domain resource. This is not limited in this application.

In an embodiment, the resource configuration is configured by using a method that is based on a bitmap or a character string. A specific configuration method and representation method of the bitmap are described above, and are not described again. It should be understood that when the configuration is performed by using the bitmap or the character string, the bitmap-based configuration may be used in the PDCCH or the MAC CE. This is not limited in this application.

In an embodiment, after sending the first indication information or the second indication information, the first node receives the response message sent by the second node. A specific response is described above, and details are not described again.

It should be understood that, the foregoing is described from a perspective of the first node, and for the second node, there is a similar method:

A second node receives resource configuration information sent by a first node, where the resource configuration information is used to indicate at least one fixed backhaul resource and at least one dynamic resource.

The second node receives first indication information sent by the first node, where the first indication information is used to indicate information about a scheduled dynamic resource that is used for a backhaul link and that is in the at least one dynamic resource.

In an embodiment, the second node determines, based on the information about the scheduled dynamic resource used for the backhaul link, a dynamic resource used for an access link in the at least one dynamic resource.

In an embodiment, the second node receives second indication information sent by the first node, where the second indication information is used to re-assign a dynamic resource that is used for a backhaul link and that is in the at least one dynamic resource.

In an embodiment, the resource configuration is configured by using a method that is based on a bitmap or a character string.

In an embodiment, the second node receives the second indication information in a downlink transmission slot or subframe of the backhaul link, where the downlink transmission slot or subframe includes a slot or subframe in which the fixed backhaul resource and the scheduled dynamic resource that is used for the backhaul link are configured for downlink transmission.

In an embodiment, the second node sends a response message to the first node after receiving the first indication information or the second indication information.

For specific implementation, refer to the foregoing method. Details are not described again.

According to the resource determining method in this embodiment of this application, the fixed backhaul resource and the dynamic resources of the backhaul link are configured, so that the second node can obtain a dynamic resource, and the dynamic resource can be shared between the access link and the backhaul link, to improve resource utilization, thereby making resource scheduling for a relay node more flexible, and implementing fast resource coordination between the access link and the backhaul link.

In an embodiment, the dynamic access resource, the dynamic backhaul resource, or the dynamic resource received by the second node is collectively referred to as a soft (soft) resource, and the soft resource includes a resource that can be used for an access link or a backhaul link. The fixed access resource and/or the fixed backhaul resource in the foregoing embodiments may also be referred to as a hard (hard) resource.

Therefore, the foregoing method further includes: The second node obtains soft resources. The second node receives first indication information sent by the first node, where the first indication information is used to indicate information about a scheduled soft resource that is used for a backhaul link and that is in the soft resources.

In an embodiment, the second node determines, based on the information about the scheduled soft resource used for the backhaul link, a dynamic resource used for an access link in the at least one soft resource.

In an embodiment, the second node receives second indication information sent by the first node, where the second indication information is used to re-assign a soft resource that is used for a backhaul link and that is in the at least one soft resource.

In an embodiment, the resource configuration is configured by using a method that is based on a bitmap or a character string.

In an embodiment, the second node receives the second indication information in a downlink transmission slot or subframe of the backhaul link, where the downlink transmission slot or subframe includes a slot or subframe in which the fixed backhaul resource and the scheduled dynamic resource that is used for the backhaul link are configured for downlink transmission.

The soft resource and/or the hard resource may be sent by the first node to the second node by using F1AP or RRC signaling. Details are described above, and are not described again.

In a possible implementation, the second node sends a response message to the first node after receiving the first indication information or the second indication information.

An operation of the first node is similar to the method used for the second node, and details are not described again.

The foregoing describes in detail the resource scheduling method provided in the embodiments of this application with reference to FIG. 1 to FIG. 14. The following describes in detail a resource scheduling apparatus provided in the embodiments of this application with reference to FIG. 15 to FIG. 17.

An embodiment of this application further provides an apparatus configured to implement any one of the foregoing methods. For example, an apparatus is provided, and includes units (or means) configured to implement the operations performed by the first node in any one of the foregoing methods. For another example, another apparatus is further provided, and includes units (or means) configured to implement the operations performed by the second node in any one of the foregoing methods.

Figure 15:
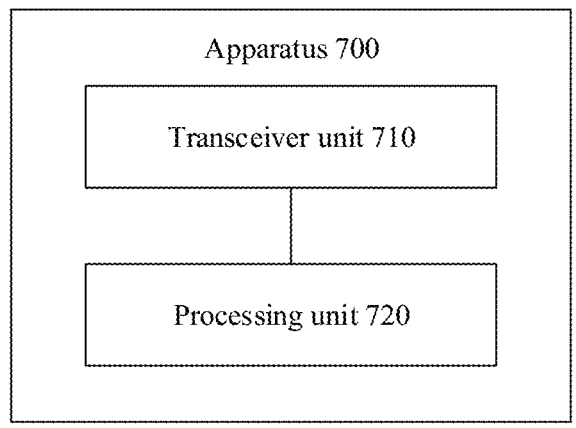
FIG. 15 is a schematic block diagram of a resource scheduling apparatus according to an embodiment of this application.

FIG. 15 is a schematic block diagram of a resource scheduling apparatus 700 according to an embodiment of this application. As shown in FIG. 15, the resource scheduling apparatus 700 may include a transceiver unit 710 and a processing unit 720.

In an embodiment, the resource scheduling apparatus 700 may be the second node in the method 400, the method 500, or the method 600, or may be a chip disposed in the second node.

Specifically, the transceiver unit 710 is configured to receive resource configuration information sent by a first node, where the resource configuration information is used to indicate a time domain position of a backhaul resource set, and the backhaul resource set includes a fixed backhaul resource and a plurality of dynamic backhaul resources.

The processing unit 720 is configured to determine the fixed backhaul resource and the plurality of dynamic backhaul resources.

The transceiver unit 710 is further configured to receive, on the fixed backhaul resource, first indication information sent by the first node, where the first indication information is used to indicate information about scheduled dynamic backhaul resources in the plurality of dynamic backhaul resources.

The processing unit 720 is further configured to determine the scheduled dynamic backhaul resources.

The transceiver unit 710 is further configured to receive a signal on the scheduled dynamic backhaul resources.

In an embodiment, the resource configuration information is further used to indicate a frequency domain position of the backhaul resource set.

In an embodiment, the transceiver unit 710 is configured to receive a PDSCH on the scheduled dynamic backhaul resources.

In an embodiment, the transceiver unit 710 is further configured to receive, on a first scheduled dynamic backhaul resource, first downlink control information DCI sent by the first node, where the first DCI is used to indicate a downlink scheduling parameter of the first scheduled dynamic backhaul resource, and the scheduled dynamic backhaul resources include the first scheduled dynamic backhaul resource.

The processing unit 720 is further configured to determine the downlink scheduling parameter of the first scheduled dynamic backhaul resource.

In an embodiment, the transceiver unit 710 is further configured to receive DCI on each of the scheduled dynamic backhaul resources, where the DCI is used to indicate a downlink scheduling parameter of each scheduled dynamic backhaul resource.

The processing unit 720 is further configured to determine a downlink scheduling parameter of each dynamic backhaul resource.

The transceiver unit 710 is further configured to receive a signal on each of the scheduled dynamic backhaul resources.

In an embodiment, the first indication information is further used to indicate information about a receive beam for a third scheduled dynamic backhaul resource, and the scheduled dynamic backhaul resources include the third scheduled dynamic backhaul resource.

In an embodiment, the first indication information is DCI, and the DCI carries a TCI to indicate the information about the receive beam for the third scheduled dynamic backhaul resource.

It should be understood that the resource scheduling apparatus 700 may correspond to the second node in the resource scheduling method 500 according to the embodiment of this application, and the resource scheduling apparatus 700 may include units configured to perform the method performed by the second node in the resource scheduling method 500 in FIG. 9. In addition, the units in the resource scheduling apparatus 700 and the foregoing other operations and/or functions are separately used to implement corresponding procedures of the resource scheduling method 500 in FIG. 9. For a specific process of performing a corresponding operation by each unit, refer to the descriptions in the method embodiment with reference to FIG. 9. For brevity, details are not described herein again.

In an embodiment, the first indication information includes downlink scheduling parameters of the scheduled dynamic backhaul resources.

In an embodiment, the transceiver unit 710 is further configured to receive, on the fixed backhaul resource, DCI that is of each of the scheduled dynamic backhaul resources and that is sent by the first node, where the DCI of each scheduled dynamic backhaul resource is used to indicate a downlink scheduling parameter of each scheduled dynamic backhaul resource.

The processing unit 720 is further configured to determine the downlink scheduling parameter of each of the scheduled dynamic backhaul resources.

The transceiver unit 710 is further configured to receive a signal on each of the scheduled dynamic backhaul resources.

It should be understood that the resource scheduling apparatus 700 may correspond to the second node in the resource scheduling method 400 according to the embodiment of this application, and the resource scheduling apparatus 700 may include units configured to perform the method performed by the second node in the resource scheduling method 400 in FIG. 6. In addition, the units in the resource scheduling apparatus 700 and the foregoing other operations and/or functions are separately used to implement corresponding procedures of the resource scheduling method 400 in FIG. 6. For a specific process of performing the foregoing corresponding operations by the units, refer to the foregoing description with reference to the method embodiment in FIG. 6. For brevity, details are not described herein.

In an embodiment, the DCI of each scheduled dynamic backhaul resource carries a TCI to indicate information about a receive beam for each scheduled dynamic backhaul resource.

In an embodiment, each of the scheduled dynamic backhaul resources corresponds to one control resource set, or each of the scheduled dynamic backhaul resources corresponds to one search space set or a subset of one search space set.

In an embodiment, the DCI of each of the scheduled dynamic backhaul resources is determined by the first node by using a control resource set (CORESET) and a search space set (search space set). The DCI of each of the scheduled dynamic backhaul resources is bound to one control resource set, or the DCI of each of the scheduled dynamic backhaul resources is bound to one search space set.

In an embodiment, the first indication information further includes a downlink scheduling parameter of a second scheduled dynamic backhaul resource, the scheduled dynamic backhaul resources include the second scheduled dynamic backhaul resource, and the fixed backhaul resource and the second scheduled dynamic backhaul resource are located in a same time unit, or the fixed backhaul resource and the second scheduled dynamic backhaul resource are located in adjacent time units.

In an embodiment, the transceiver unit 710 is further configured to receive, on the fixed backhaul resource, information that is sent by the first node and that is about a receive beam for a third scheduled dynamic backhaul resource, where the scheduled dynamic backhaul resources include the third scheduled dynamic backhaul resource.

The processing unit 720 is further configured to determine the receive beam for the third scheduled dynamic backhaul resource.

In an embodiment, the first indication information is further used to indicate information about the receive beam for the third scheduled dynamic backhaul resource.

In an embodiment, the fixed backhaul resource is a fixed downlink backhaul resource, the plurality of dynamic backhaul resources are a plurality of dynamic downlink backhaul resources, the backhaul resource set further includes at least one dynamic uplink backhaul resource, and the at least one dynamic uplink backhaul resource is scheduled by using the fixed backhaul resource or the plurality of dynamic downlink backhaul resources.

In an embodiment, the fixed backhaul resource is a fixed downlink backhaul resource, the plurality of dynamic backhaul resources are a plurality of dynamic downlink backhaul resources, and the backhaul resource set further includes a fixed uplink backhaul resource. The transceiver unit 710 is further configured to receive, on the fixed downlink backhaul resource, DCI that is of the fixed uplink backhaul resource and that is sent by the first node.

In some embodiments, the processing unit 720 is further configured to determine HARQ feedback information of the fixed downlink backhaul resource.

The transceiver unit 710 is further configured to send, on the fixed uplink backhaul resource, the HARQ feedback information of the fixed downlink backhaul resource to the first node.

In an embodiment, the fixed backhaul resource is a fixed downlink backhaul resource, the plurality of dynamic backhaul resources are a plurality of dynamic downlink backhaul resources, and the backhaul resource set further includes a fixed uplink backhaul resource and a plurality of dynamic uplink backhaul resources. The transceiver unit 710 is further configured to receive, on the fixed downlink backhaul resource, DCI that is of the fixed uplink backhaul resource and that is sent by the first node.

The processing unit 720 is further configured to determine the DCI of the fixed uplink backhaul resource.

The transceiver unit 710 is further configured to receive, on the first scheduled dynamic backhaul resource, DCI that is sent by the first node and that is of a first dynamic uplink backhaul resource, where the first dynamic uplink backhaul resource is any one of the plurality of dynamic uplink backhaul resources.

The processing unit 720 is further configured to determine the DCI of the first dynamic uplink backhaul resource.

In an embodiment, the processing unit 720 is further configured to determine HARQ feedback information of the fixed downlink backhaul resource.

The transceiver unit 710 is further configured to send, on the fixed uplink backhaul resource, the HARQ feedback information of the fixed downlink backhaul resource to the first node.

The processing unit 720 is further configured to determine HARQ feedback information of the first scheduled dynamic backhaul resource.

The transceiver unit 710 is further configured to send, on the first dynamic uplink backhaul resource, the HARQ feedback information of the first scheduled dynamic backhaul resource to the first node.

In an embodiment, the transceiver unit 710 is further configured to receive resource configuration information sent by a first node, where the resource configuration information is used to indicate a time domain position of a backhaul resource set, and the backhaul resource set includes a fixed backhaul resource and a plurality of dynamic backhaul resources.

The processing unit 720 is further configured to determine the fixed backhaul resource and the plurality of dynamic backhaul resources.

The transceiver unit 710 is further configured to receive, on the fixed backhaul resource, second DCI sent by the first node, where the second DCI is used to indicate a downlink scheduling parameter of a fourth scheduled dynamic backhaul resource, and the second DCI is used to indicate that a fifth scheduled dynamic backhaul resource is scheduled. The plurality of dynamic backhaul resources include the fourth scheduled dynamic backhaul resource and the fifth scheduled dynamic backhaul resource, and the fixed backhaul resource and the fourth scheduled dynamic backhaul resource are located in a same time unit, or the fixed backhaul resource and the fourth scheduled dynamic backhaul resource are located in adjacent time units.

The processing unit 720 is further configured to determine the fourth scheduled dynamic backhaul resource and the fifth scheduled dynamic backhaul resource.

The transceiver unit 710 is further configured to receive a signal on the fourth scheduled dynamic backhaul resource and the fifth scheduled dynamic backhaul resource.

In an embodiment, the transceiver unit 710 is further configured to receive, on the fifth scheduled dynamic backhaul resource, third DCI sent by the first node, where the third DCI is used to indicate a downlink scheduling parameter of the fifth scheduled dynamic backhaul resource, and the third DCI is used to indicate that a sixth scheduled dynamic backhaul resource is scheduled. The plurality of dynamic backhaul resources include the sixth scheduled dynamic backhaul resource.

The processing unit 720 is further configured to determine the sixth scheduled dynamic backhaul resources.

In an embodiment, the transceiver unit 710 is further configured to receive, on the fixed backhaul resource, information that is about a receive beam for the fifth scheduled dynamic backhaul resource and that is sent by the first node.

The processing unit 720 is further configured to determine the receive beam for the fifth scheduled dynamic backhaul resource.

Alternatively, the transceiver unit 710 is further configured to receive, on the fifth scheduled dynamic backhaul resource, information that is about a receive beam for the sixth scheduled dynamic backhaul resource and that is sent by the first node.

The processing unit 720 is further configured to determine the receive beam for the sixth scheduled dynamic backhaul resource.

In an embodiment, the second DCI carries a TCI to indicate the receive beam for the fifth scheduled dynamic backhaul resource.

In an embodiment, the third DCI carries a TCI to indicate the receive beam for the sixth scheduled dynamic backhaul resource.

It should be understood that the resource scheduling apparatus 700 may correspond to the second node in the resource scheduling method 600 according to the embodiment of this application, and the resource scheduling apparatus 700 may include units configured to perform the method performed by the second node in the resource scheduling method 600 in FIG. 12. In addition, the units in the resource scheduling apparatus 600 and the foregoing other operations and/or functions are separately used to implement corresponding procedures of the resource scheduling method 600 in FIG. 12. For a specific process of performing a corresponding operation by each unit, refer to the descriptions in the method embodiment with reference to FIG. 12. For brevity, details are not described herein again.

In an embodiment, the transceiver unit 710 is configured to receive resource configuration information sent by a first node, where the resource configuration information is used to indicate a time domain position of an access resource set, and the access resource set includes at least one fixed access resource and/or a plurality of dynamic access resources.

The transceiver unit 710 is further configured to receive first indication information sent by the first node, where the first indication information is used to indicate information about a scheduled dynamic access resource that is used for a backhaul link and that is in the plurality of dynamic access resources.

In an embodiment, the processing unit 720 is configured to determine, based on the information about the scheduled dynamic access resource used for the backhaul link, a dynamic access resource used for an access link in the plurality of dynamic access resources.

In an embodiment, the transceiver unit 710 is further configured to receive resource configuration information sent by the first node, where the resource configuration information is used to indicate a time domain position of a backhaul resource set, and the backhaul resource set includes at least one fixed backhaul resource and/or a plurality of dynamic backhaul resources.

In an embodiment, the transceiver unit 710 is configured to receive, through different signaling or interfaces, the resource configuration information used to indicate the access resource set and the resource configuration information used to indicate the backhaul resource set. The access resource set is configured by using a method that is based on a bitmap or a character string, and the bitmap includes a bit of an unavailable-access-resource indication and a bit of a fixed/dynamic-access-resource indication, and a priority of the unavailable-access-resource indication is higher than that of the fixed/dynamic-access-resource indication.

In an embodiment, the transceiver unit 710 is configured to receive the first indication information in a downlink transmission slot or subframe of the backhaul link, where the downlink transmission slot or subframe includes a slot or subframe in which the fixed backhaul resource and the scheduled dynamic access resource that is used for the backhaul link are configured for downlink transmission.

The first indication information is used to indicate one of the following operations: activation, addition, reduction, replacement, and deactivation. The first indication information is carried on a PDCCH, and the PDCCH is scrambled by using an FS-RNTI.

In an embodiment, the transceiver unit 710 is further configured to send a response message to the first node after the second node receives the first indication information.

In an embodiment, the transceiver unit 710 is configured to receive resource configuration information sent by the first node, where the resource configuration information is used to indicate a time domain position of a backhaul resource set, and the backhaul resource set includes at least one fixed backhaul resource and/or a plurality of dynamic backhaul resources.

The transceiver unit 710 is further configured to receive first indication information sent by the first node, where the first indication information is used to indicate information about a scheduled dynamic backhaul resource that is used for a backhaul link and that is in the plurality of dynamic backhaul resources.

The processing unit 720 is further configured to determine, based on the information about the scheduled dynamic backhaul resource used for the backhaul link, a dynamic backhaul resource used for an access link in the plurality of dynamic backhaul resources.

In an embodiment, the transceiver unit 710 is further configured to receive resource configuration information sent by the first node, where the resource configuration information is used to indicate a time domain position of an access resource set, and the access resource set includes at least one fixed access resource and/or a plurality of dynamic access resources.

In an embodiment, the transceiver unit 710 is configured to receive, through different signaling or interfaces, the resource configuration information used to indicate the access resource set and the resource configuration information used to indicate the backhaul resource set.

The backhaul resource set is configured by using a method that is based on a bitmap or a character string, and the bitmap includes a bit of an unavailable-backhaul-resource indication and a bit of a fixed/dynamic-backhaul-resource indication, and a priority of the unavailable-backhaul-resource indication is higher than that of the fixed/dynamic-backhaul-resource indication.

In an embodiment, the transceiver unit 710 is configured to receive the first indication information in a downlink transmission slot or subframe of the backhaul link, where the downlink transmission slot or subframe includes a slot or subframe in which the fixed backhaul resource and the scheduled dynamic backhaul resource that is used for the backhaul link are configured for downlink transmission.

The first indication information is used to indicate one of the following operations: activation, addition, reduction, replacement, and deactivation. The first indication information is carried on a PDCCH, and the PDCCH is scrambled by using an FS-RNTI.

In an embodiment, the transceiver unit 710 is further configured to send a response message to the first node after receiving the first indication information.

In an embodiment, the transceiver unit 710 is configured to receive resource configuration information sent by the first node, where the resource configuration information is used to indicate at least one fixed backhaul resource and at least one dynamic resource.

The transceiver unit 710 is further configured to receive first indication information sent by the first node, where the first indication information is used to indicate information about a scheduled dynamic resource that is used for a backhaul link and that is in the at least one dynamic resource.

In an embodiment, the processing unit 720 is configured to determine, based on the information about the scheduled dynamic resource used for the backhaul link, a dynamic resource used for an access link in the at least one dynamic resource.

In an embodiment, the transceiver unit 710 is further configured to receive second indication information sent by the first node, where the second indication information is used to re-assign a dynamic resource that is used for a backhaul link and that is in the at least one dynamic resource.

In an embodiment, the resource configuration information is configured by using a method that is based on a bitmap or a character string.

In an embodiment, the transceiver unit 710 is further configured to receive the second indication information in a downlink transmission slot or subframe of the backhaul link, where the downlink transmission slot or subframe includes a slot or subframe in which the fixed backhaul resource and the scheduled dynamic resource that is used for the backhaul link are configured for downlink transmission.

In an embodiment, the transceiver unit 710 is further configured to send a response message to the first node after receiving the first indication information or the second indication information.

Figure 16:
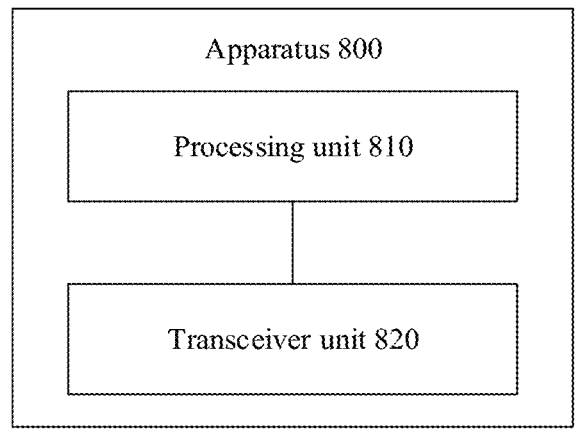
FIG. 16 is another schematic block diagram of a resource scheduling apparatus according to an embodiment of this application.

FIG. 16 is a schematic block diagram of a resource scheduling apparatus 800 according to an embodiment of this application. As shown in FIG. 16, the resource scheduling apparatus 800 may include a processing unit 810 and a transceiver unit 820.

In a possible implementation, the resource scheduling apparatus may be the first node in the method 400, the method 500, or the method 600, or may be a chip disposed in the first node.

Specifically, the processing unit 810 is configured to determine a fixed backhaul resource and a plurality of dynamic backhaul resources.

The transceiver unit 820 is configured to send resource configuration information to a second node, where the resource configuration information is used to indicate a time domain position of a backhaul resource set, and the backhaul resource set includes the fixed backhaul resource and the plurality of dynamic backhaul resources.

The processing unit 810 is further configured to determine scheduled dynamic backhaul resources in the plurality of dynamic backhaul resources.

The transceiver unit 820 is further configured to send first indication information to the second node on the fixed backhaul resource, where the first indication information is used to indicate information about the scheduled dynamic backhaul resources.

The transceiver unit 820 is further configured to send a signal to the second node on the scheduled dynamic backhaul resources.

In an embodiment, the processing unit 810 is further configured to determine the first scheduled dynamic backhaul resource, where the scheduled dynamic backhaul resources include the first scheduled dynamic backhaul resource.

The transceiver unit 820 is further configured to send first downlink control information DCI to the second node on the first scheduled dynamic backhaul resource, where the first DCI is used to indicate a downlink scheduling parameter of the first scheduled dynamic backhaul resource.

It should be understood that the resource scheduling apparatus 800 may correspond to the first node in the resource scheduling method 500 according to the embodiment of this application, and the resource scheduling apparatus 800 may include units configured to perform the method performed by the first node in the resource scheduling method 500 in FIG. 9. In addition, the units in the resource scheduling apparatus 800 and the foregoing other operations and/or functions are separately used to implement corresponding procedures of the resource scheduling method 500 in FIG. 9. For a specific process of performing a corresponding operation by each unit, refer to the descriptions in the method embodiment with reference to FIG. 9. For brevity, details are not described herein again.

In an embodiment, the first indication information includes downlink scheduling parameters of the scheduled dynamic backhaul resources.

In an embodiment, each of the scheduled dynamic backhaul resources corresponds to one control resource set, or each of the scheduled dynamic backhaul resources corresponds to one search space set.

It should be understood that the resource scheduling apparatus 800 may correspond to the first node in the resource scheduling method 400 according to the embodiment of this application, and the resource scheduling apparatus 800 may include units configured to perform the method performed by the first node in the resource scheduling method 400 in FIG. 6. In addition, the units in the resource scheduling apparatus 800 and the foregoing other operations and/or functions are separately used to implement corresponding procedures of the resource scheduling method 400 in FIG. 6. For a specific process of performing the foregoing corresponding operations by the units, refer to the foregoing description with reference to the method embodiment in FIG. 6. For brevity, details are not described herein.

In an embodiment, the first indication information further includes a downlink scheduling parameter of a second scheduled dynamic backhaul resource, the scheduled dynamic backhaul resources include the second scheduled dynamic backhaul resource, and the fixed backhaul resource and the second scheduled dynamic backhaul resource are located in a same time unit, or the fixed backhaul resource and the second scheduled dynamic backhaul resource are located in adjacent time units.

In an embodiment, the processing unit 810 is further configured to determine a receive beam for a third scheduled dynamic backhaul resource, where the scheduled dynamic backhaul resources include the third scheduled dynamic backhaul resource.

The transceiver unit 820 is further configured to send, on the fixed backhaul resource, information about the receive beam for the third scheduled dynamic backhaul resource to the second node.

In an embodiment, the fixed backhaul resource is a fixed downlink backhaul resource, the plurality of dynamic backhaul resources are a plurality of dynamic downlink backhaul resources, the backhaul resource set further includes at least one dynamic uplink backhaul resource, and the at least one dynamic uplink backhaul resource is scheduled by using the fixed backhaul resource or the plurality of dynamic downlink backhaul resources.

In an embodiment, the fixed backhaul resource is a fixed downlink backhaul resource, the plurality of dynamic backhaul resources are a plurality of dynamic downlink backhaul resources, and the backhaul resource set further includes a fixed uplink backhaul resource. The processing unit 810 is further configured to determine DCI of the fixed uplink backhaul resource.

The transceiver unit 820 is further configured to send, on the fixed downlink backhaul resource, the DCI of the fixed uplink backhaul resource to the second node.

In some possible implementations, the transceiver unit 820 is further configured to receive, on the fixed uplink backhaul resource, HARQ feedback information that is of the fixed downlink backhaul resource and that is sent by the second node.

The processing unit 810 is further configured to determine the HARQ feedback information of the fixed downlink backhaul resource.

In an embodiment, the fixed backhaul resource is a fixed downlink backhaul resource, the plurality of dynamic backhaul resources are a plurality of dynamic downlink backhaul resources, and the backhaul resource set further includes a fixed uplink backhaul resource and a plurality of dynamic uplink backhaul resources. The processing unit 810 is further configured to determine DCI of the fixed uplink backhaul resource.

The transceiver unit 820 is further configured to send, on the fixed downlink backhaul resource, the DCI of the fixed uplink backhaul resource to the second node.

The processing unit 810 is further configured to determine DCI of a first dynamic uplink backhaul resource, where the first dynamic uplink backhaul resource is any one of the plurality of dynamic uplink backhaul resources.

The transceiver unit 820 is further configured to send the DCI of the first dynamic uplink backhaul resource to the second node on the first scheduled dynamic backhaul resource.

In an embodiment, the transceiver unit 820 is further configured to receive, on the fixed uplink backhaul resource, HARQ feedback information that is of the fixed downlink backhaul resource and that is sent by the second node.

The processing unit 810 is further configured to determine the HARQ feedback information of the fixed downlink backhaul resource.

The transceiver unit 820 is further configured to receive, on the first dynamic uplink backhaul resource, HARQ feedback information that is of the first scheduled dynamic backhaul resource and that is sent by the second node.

The processing unit 810 is further configured to determine the HARQ feedback information of the first scheduled dynamic backhaul resource.

In an embodiment, the processing unit 810 is further configured to determine a fixed backhaul resource and a plurality of dynamic backhaul resources.

The transceiver unit 820 is further configured to send resource configuration information to a second node, where the resource configuration information is used to indicate a time domain position of a backhaul resource set, and the backhaul resource set includes the fixed backhaul resource and the plurality of dynamic backhaul resources.

The processing unit 810 is further configured to determine a fourth scheduled dynamic backhaul resource and a fifth scheduled dynamic backhaul resource, where the plurality of dynamic backhaul resources include the fourth scheduled dynamic backhaul resource and the fifth scheduled dynamic backhaul resource.

The transceiver unit 820 is further configured to send second DCI to the second node on the fixed backhaul resource, where the second DCI is used to indicate a downlink scheduling parameter of the fourth scheduled dynamic backhaul resource, and the second DCI is used to indicate that the fifth scheduled dynamic backhaul resource is scheduled. The fixed backhaul resource and the fourth scheduled dynamic backhaul resource are located in a same time unit, or the fixed backhaul resource and the fourth scheduled dynamic backhaul resource are located in adjacent time units.

The transceiver unit 820 is further configured to send a signal to the second node on the fourth scheduled dynamic backhaul resource and the fifth scheduled dynamic backhaul resource.

In an embodiment, the processing unit 820 is further configured to determine a sixth scheduled dynamic backhaul resource.

The transceiver unit 820 is further configured to send third DCI to the second node on the fifth scheduled dynamic backhaul resource, where the third DCI is used to indicate a downlink scheduling parameter of the fifth scheduled dynamic backhaul resource, and the third DCI is used to indicate that a sixth scheduled dynamic backhaul resource is scheduled. The plurality of dynamic backhaul resources include the sixth scheduled dynamic backhaul resource.

In an embodiment, the processing unit 810 is further configured to determine a receive beam for the fifth scheduled dynamic backhaul resource.

The transceiver unit 820 is further configured to send, on the fixed backhaul resource, information about the receive beam for the fifth scheduled dynamic backhaul resource to the second node.

Alternatively, the processing unit 810 is further configured to determine a receive beam for the sixth scheduled dynamic backhaul resource.

The transceiver unit 820 is further configured to send, on the fifth scheduled dynamic backhaul resource, information about the receive beam for the sixth scheduled dynamic backhaul resource to the second node.

It should be understood that the resource scheduling apparatus 800 may correspond to the first node in the resource scheduling method 600 according to the embodiment of this application, and the resource scheduling apparatus 800 may include units configured to perform the method performed by the first node in the resource scheduling method 600 in FIG. 12. In addition, the units in the resource scheduling apparatus 800 and the foregoing other operations and/or functions are separately used to implement corresponding procedures of the resource scheduling method 600 in FIG. 12. For a specific process of performing a corresponding operation by each unit, refer to the descriptions in the method embodiment with reference to FIG. 12. For brevity, details are not described herein again.

In an embodiment, the transceiver unit 820 is configured to send resource configuration information to a second node, where the resource configuration information is used to indicate a time domain position of an access resource set, and the access resource set includes at least one fixed access resource and/or a plurality of dynamic access resources.

The transceiver unit 820 is further configured to send first indication information to the second node, where the first indication information is used to indicate information about a scheduled dynamic access resource that is used for a backhaul link and that is in the plurality of dynamic access resources.

In an embodiment, the processing unit 810 is configured to determine, based on the information about the scheduled dynamic access resource used for the backhaul link, a dynamic access resource used for an access link.

In an embodiment, the transceiver unit 820 is further configured to send resource configuration information to the second node, where the resource configuration information is used to indicate a time domain position of a backhaul resource set, and the backhaul resource set includes at least one fixed backhaul resource and/or a plurality of dynamic backhaul resources.

In an embodiment, the transceiver unit 820 is configured to transmit, to the second node through different signaling or interfaces, the resource configuration information used to indicate the access resource set and the resource configuration information used to indicate the backhaul resource set.

In an embodiment, the access resource set is configured by using a method that is based on a bitmap or a character string, and the bitmap includes a bit of an unavailable-access-resource indication and a bit of a fixed/dynamic-access-resource indication, and a priority of the unavailable-access-resource indication is higher than that of the fixed/dynamic-access-resource indication.

In an embodiment, the transceiver unit 820 is configured to send the first indication information in a downlink transmission slot or subframe of the backhaul link, where the downlink transmission slot or subframe includes a slot or subframe in which the fixed backhaul resource and the scheduled dynamic access resource that is used for the backhaul link are configured for downlink transmission.

In an embodiment, the first indication information is used to indicate one of the following operations: activation, addition, reduction, replacement, and deactivation.

In an embodiment, the transceiver unit 820 is further configured to: after sending the first indication information to the second node, receive a response message sent by the second node.

In an embodiment, the transceiver unit 820 is configured to send resource configuration information to a second node, where the resource configuration information is used to indicate a time domain position of a backhaul resource set, and the backhaul resource set includes at least one fixed backhaul resource and/or a plurality of dynamic backhaul resources.

In an embodiment, the transceiver unit 820 is further configured to send first indication information to the second node, where the first indication information is used to indicate information about a scheduled dynamic backhaul resource that is used for a backhaul link and that is in the plurality of dynamic backhaul resources.

In an embodiment, the processing unit 810 is configured to determine, based on the information about the scheduled dynamic backhaul resource used for the backhaul link, a dynamic backhaul resource used for an access link.

In an embodiment, the transceiver unit 820 is further configured to send resource configuration information to a second node, where the resource configuration information is used to indicate a time domain position of an access resource set, and the access resource set includes at least one fixed access resource and/or a plurality of dynamic access resources.

In an embodiment, the transceiver unit 820 is configured to send, through different signaling or interfaces, the resource configuration information used to indicate the access resource set and the resource configuration information used to indicate the backhaul resource set.

In an embodiment, the backhaul resource set is configured by using a method that is based on a bitmap or a character string, and the bitmap includes a bit of an unavailable-backhaul-resource indication and a bit of a fixed/dynamic-backhaul-resource indication, and a priority of the unavailable-backhaul-resource indication is higher than that of the fixed/dynamic-backhaul-resource indication.

In an embodiment, the transceiver unit 820 is configured to send the first indication information in a downlink transmission slot or subframe of the backhaul link, where the downlink transmission slot or subframe includes a slot or subframe in which the fixed backhaul resource and the scheduled dynamic access resource that is used for the backhaul link are configured for downlink transmission.

In an embodiment, the first indication information is used to indicate one of the following operations: activation, addition, reduction, replacement, and deactivation. The first indication information is carried on a PDCCH, and the PDCCH is scrambled by using an FS-RNTI.

In an embodiment, the transceiver unit is further configured to: after sending the first indication information to the second node, receive a response message sent by the second node.

In an embodiment, the transceiver unit 820 is configured to send resource configuration information to a second node, where the resource configuration information is used to indicate at least one fixed backhaul resource and at least one dynamic resource.

The transceiver unit 820 is further configured to send first indication information to the second node, where the first indication information is used to indicate information about a scheduled dynamic resource that is used for a backhaul link and that is in the at least one dynamic resource.

In an embodiment, the transceiver unit 820 is further configured to send second indication information to the second node, where the second indication information is used to re-assign a dynamic resource that is used for a backhaul link and that is in the at least one dynamic resource.

In an embodiment, the resource configuration is configured by using a method that is based on a bitmap or a character string.

In an embodiment, the transceiver unit 820 is further configured to send the second indication information to the second node in a downlink transmission slot or subframe of the backhaul link, where the downlink transmission slot or subframe includes a slot or subframe in which the fixed backhaul resource and the scheduled dynamic resource that is used for the backhaul link are configured for downlink transmission.

In an embodiment, the transceiver unit 820 is further configured to: after sending the first indication information or the second indication information, receive a response message sent by the second node.

In hardware implementation, the processing unit may be a processor, a processing circuit, or the like, the transceiver unit may be a transceiver (or a transceiver circuit) or the like, and the transceiver unit may form a communications interface.

In an embodiment, the processor may be configured to perform, for example, but not limited to, baseband related processing, and the transceiver may be configured to perform, for example, but not limited to, radio frequency transmission and receiving. The foregoing components may be separately disposed on chips independent of each other, or at least some or all of the components may be disposed on a same chip. For example, the processor may further be classified into an analog baseband processor and a digital baseband processor. The analog baseband processor and the transceiver may be integrated on a same chip, and the digital baseband processor may be disposed on an independent chip. With continuous development of integrated circuit technologies, more and more components can be integrated on a same chip. For example, the digital baseband processor and a plurality of application processors (for example, but not limited to a graphics processor and a multimedia processor) may be integrated on a same chip. Such a chip may be referred to as a system on chip (system on chip, SOC). Whether the components are independently disposed on different chips or are integrated and disposed on one or more chips usually depends on specific requirements of a product design. Specific implementation forms of the components are not limited in the embodiments of the present invention.

Figure 17:
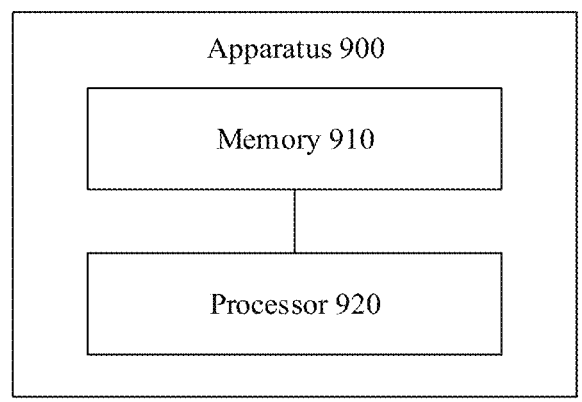
FIG. 17 is still another schematic block diagram of a resource scheduling apparatus according to an embodiment of this application.

FIG. 17 is a schematic block diagram of a resource scheduling apparatus 900 according to an embodiment of this application. The resource scheduling apparatus 900 shown in FIG. 17 includes a memory 910 and a processor 920.

The memory 910 is configured to store a program.

The processor 920 is configured to execute the program stored in the memory 910, and when the program is executed, the processor 920 performs the following operations:

receiving resource configuration information sent by a first node, where the resource configuration information is used to indicate a time domain position of a backhaul resource set, and the backhaul resource set includes a fixed backhaul resource and a plurality of dynamic backhaul resources;

receiving, on the fixed backhaul resource, first indication information sent by the first node, where the first indication information is used to indicate information about scheduled dynamic backhaul resources in the plurality of dynamic backhaul resources; and receiving, on the scheduled dynamic backhaul resources, a signal sent by the first node.

In an embodiment, first downlink control information DCI sent by the first node is received on a first scheduled dynamic backhaul resource, where the first DCI is used to indicate a downlink scheduling parameter of the first scheduled dynamic backhaul resource, and the scheduled dynamic backhaul resources include the first scheduled dynamic backhaul resource.

In an embodiment, information that is sent by the first node and that is about a receive beam for a third scheduled dynamic backhaul resource is received on the fixed backhaul resource, where the scheduled dynamic backhaul resources include the third scheduled dynamic backhaul resource.

In an embodiment, resource configuration information sent by a first node is received, where the resource configuration information is used to indicate a time domain position of a backhaul resource set, and the backhaul resource set includes a fixed backhaul resource and a plurality of dynamic backhaul resources.

Second DCI sent by the first node is received on the fixed backhaul resource, where the second DCI is used to indicate a downlink scheduling parameter of a fourth scheduled dynamic backhaul resource, and the second DCI is used to indicate that a fifth scheduled dynamic backhaul resource is scheduled. The plurality of dynamic backhaul resources include the fourth scheduled dynamic backhaul resource and the fifth scheduled dynamic backhaul resource, and the fixed backhaul resource and the fourth scheduled dynamic backhaul resource are located in a same time unit, or the fixed backhaul resource and the fourth scheduled dynamic backhaul resource are located in adjacent time units.

A signal is received on the fourth scheduled dynamic backhaul resource and the fifth scheduled dynamic backhaul resource.

In an embodiment, third DCI sent by the first node is received on the fifth scheduled dynamic backhaul resource, where the third DCI is used to indicate a downlink scheduling parameter of the fifth scheduled dynamic backhaul resource, and the third DCI is used to indicate that a sixth scheduled dynamic backhaul resource is scheduled. The plurality of dynamic backhaul resources include the sixth scheduled dynamic backhaul resource.

In an embodiment, information that is about a receive beam for the fifth scheduled dynamic backhaul resource and that is sent by the first node is received on the fixed backhaul resource.

Alternatively, information that is about a receive beam for the sixth scheduled dynamic backhaul resource and that is sent by the first node is received on the fifth scheduled dynamic backhaul resource.

The processor 920 is configured to execute the program stored in the memory 910, and when the program is executed, the processor 920 may further perform the following operations:

receiving resource configuration information sent by a first node, where the resource configuration information is used to indicate a time domain position of an access resource set, and the access resource set includes at least one fixed access resource and/or a plurality of dynamic access resources; and receiving first indication information sent by the first node, where the first indication information is used to indicate information about a scheduled dynamic access resource that is used for a backhaul link and that is in the plurality of dynamic access resources.

In an embodiment, a dynamic access resource used for an access link in the plurality of dynamic access resources is determined based on the information about the scheduled dynamic access resource used for the backhaul link.

In an embodiment, resource configuration information sent by the first node is received, where the resource configuration information is used to indicate a time domain position of a backhaul resource set, and the backhaul resource set includes at least one fixed backhaul resource and/or a plurality of dynamic backhaul resources.

In an embodiment, the resource configuration information used to indicate the access resource set and the resource configuration information used to indicate the backhaul resource set are received through different signaling or interfaces. The access resource set is configured by using a method that is based on a bitmap or a character string, and the bitmap includes a bit of an unavailable-access-resource indication and a bit of a fixed/dynamic-access-resource indication, and a priority of the unavailable-access-resource indication is higher than that of the fixed/dynamic-access-resource indication.

In an embodiment, the first indication information is received in a downlink transmission slot or subframe of the backhaul link, where the downlink transmission slot or subframe includes a slot or subframe in which the fixed backhaul resource and the scheduled dynamic access resource that is used for the backhaul link are configured for downlink transmission.

The first indication information is used to indicate one of the following operations: activation, addition, reduction, replacement, and deactivation. The first indication information is carried on a PDCCH, and the PDCCH is scrambled by using an FS-RNTI.

In an embodiment, the processor sends a response message to the first node after receiving the first indication information.

The processor 920 is configured to execute the program stored in the memory 910, and when the program is executed, the processor 920 may further perform the following operations:

receiving resource configuration information sent by a first node, where the resource configuration information is used to indicate a time domain position of a backhaul resource set, and the backhaul resource set includes at least one fixed backhaul resource and/or a plurality of dynamic backhaul resources; and receiving first indication information sent by the first node, where the first indication information is used to indicate information about a scheduled dynamic backhaul resource that is used for a backhaul link and that is in the plurality of dynamic backhaul resources.

In an embodiment, a dynamic backhaul resource used for an access link in the plurality of dynamic backhaul resources is determined based on the information about the scheduled dynamic backhaul resource used for the backhaul link.

In an embodiment, resource configuration information sent by a first node is received, where the resource configuration information is used to indicate a time domain position of an access resource set, and the access resource set includes at least one fixed access resource and/or a plurality of dynamic access resources.

In an embodiment, specifically, the resource configuration information used to indicate the access resource set and the resource configuration information used to indicate the backhaul resource set are received through different signaling or interfaces.

The backhaul resource set is configured by using a method that is based on a bitmap or a character string, and the bitmap includes a bit of an unavailable-backhaul-resource indication and a bit of a fixed/dynamic-backhaul-resource indication, and a priority of the unavailable-backhaul-resource indication is higher than that of the fixed/dynamic-backhaul-resource indication.

In an embodiment, the first indication information is received in a downlink transmission slot or subframe of the backhaul link, where the downlink transmission slot or subframe includes a slot or subframe in which the fixed backhaul resource and the scheduled dynamic backhaul resource that is used for the backhaul link are configured for downlink transmission.

The first indication information is used to indicate one of the following operations: activation, addition, reduction, replacement, and deactivation. The first indication information is carried on a PDCCH, and the PDCCH is scrambled by using an FS-RNTI.

In an embodiment, a response message is sent to the first node after the first indication information is received.

The processor 920 is configured to execute the program stored in the memory 910. When the program is executed, the processor 920 may further perform the methods in the foregoing embodiments. Details are not described again.

It should be understood that the apparatus 900 may correspond to the second node in the foregoing method embodiments, and the processor 920 may perform an operation performed by the second node in the foregoing method embodiments.

Figure 18:
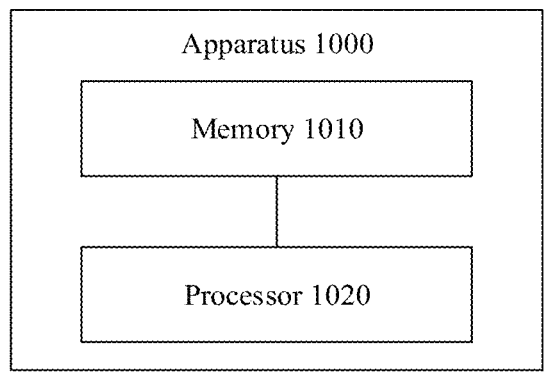
FIG. 18 is still another schematic block diagram of a resource scheduling apparatus according to an embodiment of this application.

FIG. 18 is a schematic block diagram of a resource scheduling apparatus 1000 according to an embodiment of this application. The resource scheduling apparatus 1000 shown in FIG. 18 includes a memory 1010 and a processor 1020.

The memory 1010 is configured to store a program.

The processor 1020 is configured to execute the program stored in the memory 1010, and when the program is executed, the processor 1020 performs the following operations:

sending resource configuration information to a second node, where the resource configuration information is used to indicate a time domain position of a backhaul resource set, and the backhaul resource set includes a fixed backhaul resource and a plurality of dynamic backhaul resources;

sending first indication information to the second node on the fixed backhaul resource, where the first indication information is used to indicate information about scheduled dynamic backhaul resources in the plurality of dynamic backhaul resources; and sending a signal to the second node on the scheduled dynamic backhaul resources.

In an embodiment, first downlink control information DCI is sent to the second node on a first scheduled dynamic backhaul resource, where the first DCI is used to indicate a downlink scheduling parameter of the first scheduled dynamic backhaul resource, and the scheduled dynamic backhaul resources include the first scheduled dynamic backhaul resource.

In an embodiment, the first indication information includes downlink scheduling parameters of the scheduled dynamic backhaul resources.

In an embodiment, each of the scheduled dynamic backhaul resources corresponds to one control resource set, or each of the scheduled dynamic backhaul resources corresponds to one search space set or a subset of one search space set.

In an embodiment, the first indication information further includes a downlink scheduling parameter of a second scheduled dynamic backhaul resource, the scheduled dynamic backhaul resources include the second scheduled dynamic backhaul resource, and the fixed backhaul resource and the second scheduled dynamic backhaul resource are located in a same time unit, or the fixed backhaul resource and the second scheduled dynamic backhaul resource are located in adjacent time units.

In an embodiment, information about a receive beam for a third scheduled dynamic backhaul resource is sent to the second node on the fixed backhaul resource, where the scheduled dynamic backhaul resources include the third scheduled dynamic backhaul resource.

In an embodiment, resource configuration information is sent to a second node, where the resource configuration information is used to indicate a time domain position of a backhaul resource set, and the backhaul resource set includes a fixed backhaul resource and a plurality of dynamic backhaul resources.

Second DCI is sent to the second node on the fixed backhaul resource, where the second DCI is used to indicate a downlink scheduling parameter of a fourth scheduled dynamic backhaul resource, and the second DCI is used to indicate that a fifth scheduled dynamic backhaul resource is scheduled. The plurality of dynamic backhaul resources include the fourth scheduled dynamic backhaul resource and the fifth scheduled dynamic backhaul resource, and the fixed backhaul resource and the fourth scheduled dynamic backhaul resource are located in a same time unit, or the fixed backhaul resource and the fourth scheduled dynamic backhaul resource are located in adjacent time units.

A signal is sent to the second node on the fourth scheduled dynamic backhaul resource and the fifth scheduled dynamic backhaul resource.

In an embodiment, third DCI is sent to the second node on the fifth scheduled dynamic backhaul resource, where the third DCI is used to indicate a downlink scheduling parameter of the fifth scheduled dynamic backhaul resource, and the third DCI is used to indicate that a sixth scheduled dynamic backhaul resource is scheduled. The plurality of dynamic backhaul resources include the sixth scheduled dynamic backhaul resource.

In an embodiment, information that is about a receive beam for the fifth scheduled dynamic backhaul resource is sent to the second node on the fixed backhaul resource.

Alternatively, information that is about a receive beam for the sixth scheduled dynamic backhaul resource is sent to the second node on the fifth scheduled dynamic backhaul resource.

The processor 1020 is configured to execute the program stored in the memory 1010, and when the program is executed, the processor 1020 further performs the following operations:

sending resource configuration information to a second node, where the resource configuration information is used to indicate a time domain position of an access resource set, and the access resource set includes a fixed access resource and a plurality of dynamic access resources; and sending first indication information to the second node, where the first indication information is used to indicate information about a scheduled dynamic access resource that is used for a backhaul link and that is in the plurality of dynamic access resources.

In an embodiment, a dynamic access resource used for an access link is determined based on the information about the scheduled dynamic access resource used for the backhaul link.

In an embodiment, resource configuration information is sent to the second node, where the resource configuration information is used to indicate a time domain position of a backhaul resource set, and the backhaul resource set includes at least one fixed backhaul resource and/or a plurality of dynamic backhaul resources.

In an embodiment, the resource configuration information used to indicate the access resource set and the resource configuration information used to indicate the backhaul resource set are transmitted to the second node through different signaling or interfaces.

In an embodiment, the access resource set is configured by using a method that is based on a bitmap or a character string, and the bitmap includes a bit of an unavailable-access-resource indication and a bit of a fixed/dynamic-access-resource indication, and a priority of the unavailable-access-resource indication is higher than that of the fixed/dynamic-access-resource indication.

In an embodiment, the first indication information is sent in a downlink transmission slot or subframe of the backhaul link, where the downlink transmission slot or subframe includes a slot or subframe in which the fixed backhaul resource and the scheduled dynamic access resource that is used for the backhaul link are configured for downlink transmission.

In an embodiment, the first indication information is used to indicate one of the following operations: activation, addition, reduction, replacement, and deactivation.

In an embodiment, after the first indication information is sent to the second node, a response message sent by the second node is received.

The processor 1020 is configured to execute the program stored in the memory 1010, and when the program is executed, the processor 1020 further performs the following operations:

sending resource configuration information to a second node, where the resource configuration information is used to indicate a time domain position of a backhaul resource set, and the backhaul resource set includes at least one fixed backhaul resource and/or a plurality of dynamic backhaul resources; and sending first indication information to the second node, where the first indication information is used to indicate information about a scheduled dynamic backhaul resource that is used for a backhaul link and that is in the plurality of dynamic backhaul resources.

In an embodiment, a dynamic backhaul resource used for an access link is determined based on the information about the scheduled dynamic backhaul resource used for the backhaul link.

In an embodiment, resource configuration information is sent to a second node, where the resource configuration information is used to indicate a time domain position of an access resource set, and the access resource set includes at least one fixed access resource and/or a plurality of dynamic access resources.

In an embodiment, the resource configuration information used to indicate the access resource set and the resource configuration information used to indicate the backhaul resource set are sent through different signaling or interfaces.

In an embodiment, the backhaul resource set is configured by using a method that is based on a bitmap or a character string, and the bitmap includes a bit of an unavailable-backhaul-resource indication and a bit of a fixed/dynamic-backhaul-resource indication, and a priority of the unavailable-backhaul-resource indication is higher than that of the fixed/dynamic-backhaul-resource indication.

In an embodiment, the first indication information is sent in a downlink transmission slot or subframe of the backhaul link, where the downlink transmission slot or subframe includes a slot or subframe in which the fixed backhaul resource and the scheduled dynamic access resource that is used for the backhaul link are configured for downlink transmission.

In an embodiment, the first indication information is used to indicate one of the following operations: activation, addition, reduction, replacement, and deactivation. The first indication information is carried on a PDCCH, and the PDCCH is scrambled by using an FS-RNTI.

In an embodiment, after the first indication information is sent to the second node, a response message sent by the second node is received.

The processor 1020 is configured to execute the program stored in the memory 1010. When the program is executed, the processor 1020 further performs the methods in the foregoing embodiments. Details are not described again.

It should be understood that the apparatus 1000 may correspond to the first node in the foregoing method embodiments, and the processor 1020 may perform an operation performed by the first node in the foregoing method embodiments.

The memory may be a physically independent unit, or may be integrated with the processor. Alternatively, the apparatus may include only a processor. A memory configured to store a program is located outside the apparatus. The processor is connected to the memory by using a circuit/wire, and is configured to read and execute the program stored in the memory.

If the apparatus includes only a processor, the processor is configured to perform the foregoing methods. In a process of performing these methods, a process of sending the foregoing information and a process of receiving the foregoing information in the foregoing methods may be understood as a process of outputting the foregoing information by the processor and a process of receiving the foregoing input information by the processor. Specifically, when outputting the information, the processor outputs the information to a transceiver, so that the transceiver transmits the information. Still further, after the information is output by the processor, other processing may further need to be performed on the information before the information arrives at the transceiver. Similarly, when the processor receives the input information, the transceiver receives the information and inputs the information into the processor. Still further, after the transceiver receives the information, other processing may need to be performed on the information before the information is input into the processor.

In this case, for operations such as transmission, sending, and receiving related to the processor, if there is no particular statement, or if the operations do not contradict an actual function or internal logic of the operations in related description, the operations may be more generally understood as operations such as input receiving and output of the processor, instead of operations such as transmission, sending, and receiving directly performed by a radio frequency circuit and an antenna.

Based on the methods provided in the embodiments of this application, this application further provides a computer program product. The computer program product includes computer program code; and when the computer program code is run on a computer, the computer is enabled to perform the methods in the foregoing embodiments.

Based on the methods provided in the embodiments of this application, this application further provides a computer-readable medium. The computer-readable medium stores program code; and when the program code is run on a computer, the computer is enabled to perform the methods in the foregoing embodiments.

Based on the methods provided in the embodiments of this application, this application further provides a system, including the foregoing first node and/or second node.

A person of ordinary skill in the art may be aware that, in combination with the examples described in the embodiments disclosed in this specification, units and algorithm operations can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatuses, and methods may be implemented in another manner. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the method described in the embodiments of this application. The storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resource determining method, comprising:
   receiving, by a second node, first resource configuration information from a first node, wherein the first resource configuration information is used to indicate a time domain position of an access resource set of the second node comprising a fixed access resource and a plurality of dynamic access resources; and
   receiving, by the second node, second resource configuration information from the first node, wherein the second resource configuration information is used to indicate a time domain position of an access resource set of a lower-level node of the second node comprising a fixed access resource and a plurality of dynamic access resources.

2. The method according to claim 1, further comprising:
receiving, by the second node, first indication information from the first node, wherein the first indication information is used to indicate a scheduled dynamic access resource that is used for a backhaul link and allocated from the plurality of dynamic access resources of the access resource set of the second node.

3. The method according to claim 2, wherein the second node receives the first indication information in a downlink transmission slot or a subframe of the backhaul link, wherein the downlink transmission slot or the subframe comprises a slot or a subframe in which a fixed backhaul resource and the scheduled dynamic access resource that is used for the backhaul link are configured for downlink transmission.

4. The method according to claim 2, wherein the first indication information is used to indicate one of an activation, an addition, a reduction, a replacement, or a deactivation.

5. The method according to claim 4, wherein the first indication information is carried on a physical downlink control channel (PDCCH), which is scrambled by using a flexible scheduling radio network temporary identity (FS-RNTI).

6. The method according to claim 1, further comprising:
receiving, by the second node, first resource configuration information from the first node, wherein the first resource configuration information is used to indicate a time domain position of a backhaul resource set comprising at least one fixed backhaul resource and/or a plurality of dynamic backhaul resources.

7. The method according to claim 6, wherein the first resource configuration information used to indicate the access resource set and the first resource configuration information used to indicate the backhaul resource set are transmitted through different signaling or interfaces.

8. The method according to claim 1, wherein the access resource set is configured based on a bitmap or a character string, and the bitmap or the character string comprises a bit of an unavailable-access-resource indication and a bit of a fixed/dynamic-access-resource indication.

9. The method according to claim 1, comprising:
sending, by the second node, a response message to the first node in response to first indication information.

10. A resource determining apparatus, comprising:
a transceiver to
receive first resource configuration information from a first node, wherein the first resource configuration information is used to indicate a time domain position of an access resource set of a second node comprising a fixed access resource and a plurality of dynamic access resources, and
receive second resource configuration information from the first node, wherein the second resource configuration information is used to indicate a time domain position of an access resource set of a lower-level node of the second node comprising a fixed access resource and a plurality of dynamic access resources.

11. The apparatus according to claim 10,
wherein the transceiver to further receive first indication information from the first node, wherein the first indication information is used to indicate a scheduled dynamic access resource that is used for a backhaul link and allocated from the plurality of dynamic access resources of the access resource set of the second node.

12. The apparatus according to claim 11, wherein the transceiver is further configured to receive the first indication information in a downlink transmission slot or a subframe of the backhaul link, wherein the downlink transmission slot or the subframe comprises a slot or a subframe in which a fixed backhaul resource and the scheduled dynamic access resource that is used for the backhaul link are configured for downlink transmission.

13. The apparatus according to claim 11, wherein the first indication information is used to indicate one of an activation, an addition, a reduction, a replacement, or a deactivation.

14. The apparatus according to claim 13, wherein the first indication information is carried on a physical downlink control channel (PDCCH), which is scrambled by using a flexible scheduling radio network temporary identity (FS-RNTI).

15. The apparatus according to claim 10, wherein the transceiver is further configured to receive first resource configuration information from the first node, wherein the first resource configuration information is used to indicate a time domain position of a backhaul resource set comprising at least one fixed backhaul resource and/or a plurality of dynamic backhaul resources.

16. The apparatus according to claim 15, wherein the transceiver is further configured to receive, through different signaling or interfaces, the first resource configuration information used to indicate the access resource set and the first resource configuration information used to indicate the backhaul resource set.

17. The apparatus according to claim 10, wherein the access resource set is configured based on a bitmap or a character string, and the bitmap or the character string comprises a bit of an unavailable-access-resource indication and a bit of a fixed/dynamic-access-resource indication.

18. The apparatus according to claim 10, wherein
the transceiver is further configured to send a response message to the first node in response to first indication information.

19. A resource determining apparatus, comprising:
a transceiver to
send first resource configuration information to a second node, wherein the first resource configuration information is used to indicate a time domain position of an access resource set of the second node, and the access resource set of the second node comprises a fixed access resource and a plurality of dynamic access resources, and
send second resource configuration information to the second node, wherein the second resource configuration information is used to indicate a time domain position of an access resource set of a lower-level node of the second node, and the access resource set of the lower-level node of the second node comprises a fixed access resource and a plurality of dynamic access resources.

20. A non-transitory computer-readable medium, comprising a computer program, which when executed by a computer, cause the computer to perform a method, the method comprising:
receiving first resource configuration information from a first node, wherein the first resource configuration information is used to indicate a time domain position of an access resource set of a second node, and the access resource set of the second node comprises a fixed access resource and a plurality of dynamic access resources; and receiving second resource configuration information from the first node, wherein the second resource configuration information is used to indicate a time domain position of an access resource set of a lower-level node of the second node, and the access resource set of the lower-level node of the second node comprises a fixed access resource and a plurality of dynamic access resources.

\* \* \* \* \*